(12) United States Patent
Badrinarayanan et al.

(10) Patent No.: US 11,546,164 B2
(45) Date of Patent: Jan. 3, 2023

(54) VERIFICATION OF BIOMETRIC TEMPLATES FOR PRIVACY PRESERVING AUTHENTICATION

(71) Applicant: Visa International Service Association, San Francisco, CA (US)

(72) Inventors: Saikrishna Badrinarayanan, Los Angeles, CA (US); Peter Rindal, San Francisco, CA (US); Pratyay Mukherjee, San Francisco, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 252 days.

(21) Appl. No.: 17/079,279

(22) Filed: Oct. 23, 2020

(65) Prior Publication Data
US 2022/0131698 A1 Apr. 28, 2022

(51) Int. Cl.
*H04L 9/32* (2006.01)
*H04L 9/08* (2006.01)
*H04L 9/30* (2006.01)

(52) U.S. Cl.
CPC .......... *H04L 9/3231* (2013.01); *H04L 9/0866* (2013.01); *H04L 9/30* (2013.01); *H04L 9/3271* (2013.01)

(58) Field of Classification Search
CPC ....... H04L 9/3231; H04L 9/0866; H04L 9/30; H04L 9/3271
USPC ........................................................ 713/186
See application file for complete search history.

(56) References Cited

U.S. PATENT DOCUMENTS

| 10,574,466 | B1 | 2/2020 | Gopalakrishnan et al. |
| 2007/0180261 | A1 | 8/2007 | Akkermans et al. |
| 2013/0318351 | A1* | 11/2013 | Hirano .................. H04L 9/3073 713/168 |
| 2018/0053014 | A1 | 2/2018 | Sahu et al. |

(Continued)

FOREIGN PATENT DOCUMENTS

| KR | 20180093908 | 8/2018 |
| KR | 20200099290 | 8/2020 |
| WO | WO-2018169470 A1 * | 9/2018 ............. G06F 21/31 |

(Continued)

OTHER PUBLICATIONS

Application No. PCT/US2021/050566, International Search Report and Written Opinion, dated Dec. 10, 2021, 9 pages.

(Continued)

*Primary Examiner* — Mohammad W Reza
*Assistant Examiner* — Moeen Khan
(74) *Attorney, Agent, or Firm* — Kilpatrick Townsend & Stockton LLP

(57) ABSTRACT

Secure protocols for external-facing authentication are provided for both user templates stored on their devices and the biometric measurement captured by external sensors of an access device. The protocols provide different levels of security, ranging from passive security with some leakage to active security with no leakage. A packing technique is also provided. Zero-knowledge techniques are used during enrollment to validate a norm of user templates and knowledge of the plaintext biometric template. One enrolled, the verifier can sign the encrypted template for use in a later matching phase with an access device.

19 Claims, 16 Drawing Sheets

(56) References Cited

U.S. PATENT DOCUMENTS

2018/0241558 A1  8/2018  Takahashi
2020/0228341 A1  7/2020  Mohassel et al.

FOREIGN PATENT DOCUMENTS

WO    WO-2018174063 A1 *  9/2018
WO       2019032301 A1     2/2019

OTHER PUBLICATIONS

Zhou, et al., "PassBio: Privacy-Preserving User-Centric Biometric Authentication", arXiv:1711.04902v1[cs.CR], Nov. 14, 2017, 29 pages.

Lee, et al., "Instant Privacy-Preserving Biometric Authentication for Hamming Distance", .Seoul National University, University of San Diego, and Software R&D Center, Samsung Electronics, South Korea, 28 pages.

\* cited by examiner

Parameters: The functionality $\mathcal{F}$ is parameterized by values $\ell, m, \in \mathbb{N}$, $1 \in \mathbb{Z}_{2m\ell}$, a distance function $\text{CS.Dist}: \mathbb{Z}_{2m}^{\ell} \times \mathbb{Z}_{2m}^{\ell} \to [0, 1]$, a threshold $T \in (0, 1^2)$, and leakage functions $L_{dev}, L_{term}$ both with description $\mathbb{Z}_m^{\ell} \times \mathbb{Z}_m^{\ell} \to \mathbb{Z}$. It interacts with three parties $\mathcal{D}, \mathcal{SP}$ and $\mathcal{T}$ via the following queries.

Queries:

- On receiving a query of the form ("Enrollment", sid, $\vec{u}$, $\mathcal{SP}$) from $\mathcal{D}$: Only if sid is unmarked, check if $\|\vec{u}\| = 1$. If the check succeeds, send ("Enrolled", sid, $\mathcal{D}$) to $\mathcal{SP}$ and $\mathcal{D}$, store (sid, $\vec{u}$, $\mathcal{D}, \mathcal{SP}$), and mark sid as "Enrolled". Otherwise, send ("Failed", sid, $\mathcal{D}$) to $\mathcal{SP}$ and $\mathcal{D}$, and mark sid as "Failed".

- On receiving a query of the form ("Match", sid, ssid, $\mathcal{T}$) from $\mathcal{D}$: Check whether sid is marked and there exists a record of the form (sid, $\vec{u}$, $\mathcal{D}$, $\mathcal{SP}$). If the check fails, send ("Failed", sid, ssid, $\mathcal{D}$) to $\mathcal{T}$ and $\mathcal{D}$. Else:
    (1) send (sid, ssid, $\mathcal{D}$) to $\mathcal{T}$;
    (2) receive (sid, ssid, $\vec{w}$, $\mathcal{D}$) from $\mathcal{T}$;
    (3) if $\langle \vec{u}, \vec{w} \rangle \geq T$, (that is, $\text{CS.Dist}(\vec{u}, \vec{w}) \geq \frac{T}{1^2}$) send (sid, ssid, 1) to $\mathcal{D}$ and $\mathcal{T}$, else send (sid, ssid, 0). Also send $L_{dev}(\vec{u}, \vec{w})$ to $\mathcal{D}$ and $L_{term}(\vec{u}, \vec{w})$ to $\mathcal{T}$.

FIG. 1

Parameters: A Paillier public key $pk = (N, g)$, a value $y \in \mathbb{Z}$, statement $st = (c_1 = [\![x_1; r_1]\!], \ldots, c_n = [\![x_n; r_n]\!])$, and witness $wit = ((x_1, r_1), \ldots, (x_n, r_n))$.

Protocol:

610 • $V$ uniformly samples a prime $\hat{N} < N$.

620 • $V$ samples random $\alpha \leftarrow \mathbb{Z}_{2^\lambda}, \rho_1, \ldots, \rho_n, \beta, \hat{\beta} \leftarrow \mathbb{Z}_N$. Then it sends $P$ the following:

630
- $[\![w_i]\!] \leftarrow \alpha [\![x_i]\!] + [\![\rho_i]\!]$ for all $i \in [n]$,
- $[\![v]\!] \leftarrow (\sum_{i \in [n]} (-2\alpha \rho_i [\![x_i]\!] - \rho_i^2)) + [\![\beta]\!]$,
- $[\![\hat{v}]\!] \leftarrow (\sum_{i \in [n]} c_i' [\![x_i]\!]) + d + [\![\hat{\beta}]\!]$ where $c_i' := (-2\alpha \rho_i \mod \hat{N}), d := (\sum_{i \in [n]} -\rho_i^2 \mod \hat{N})$,
- $\hat{N}$.

640 • $P$ decrypts $[\![w_i]\!], [\![v]\!], [\![\hat{v}]\!]$ and sends the following to $V$:

650
- $z := v + \sum_{i \in [n]} w_i^2 \mod N$,
- $\hat{z} := \hat{v} + \sum_{i \in [n]} w_i^2 \mod \hat{N}$.

660 • $V$ outputs accept if $z = y\alpha^2 + \beta$ and $\hat{z} \equiv_{\hat{N}} y\alpha^2 + \hat{\beta}$. Otherwise $V$ outputs reject.

*FIG. 6*

Parameters: A Paillier public key $pk = (N, g)$, statement $st = (c_1, \ldots, c_n)$ and witness $wit = ((x_1, r_1), \ldots, (x_n, r_n))$.

Protocol:

810 • $P$ samples $s \leftarrow \mathbb{Z}_N$ and sends $[\![s; u]\!] \leftarrow \text{Plr.Enc}(pk, s)$ to $V$.

820 • $V$ sends $e_1, \ldots, e_n \leftarrow \mathbb{Z}_N^*$ to $P$.

830 • $P$ sends $w := s + \sum_i e_i x_i \mod N$, and $z = ug^t \prod_i r_i^{e_i} \mod N^2$ to $V$ where $t$ is defined by $tN + w = s + \sum_i e_i x_i$.

840 • $V$ outputs accept if $[\![w; z]\!] = [\![s; u]\!] \cdot \prod_i c_i^{e_i}$ and otherwise reject.

*FIG. 8*

Algorithms:

- $\text{Encode}_1(u_1, \ldots, u_n)$ : Output $u^* = \sum_{i=1}^{n} 2^{k \cdot (2^{i-1}-1)} u_i \in \mathbb{Z}_{2^{k2^n}}$.
- $\text{Add}_1(u^*, v^*)$ : Output $w^* = (u^* + v^*)$
- $\text{Decode}_1(u^*)$ : Re-order $u^*$ as $u^* = \sum_{i=1}^{n} 2^{k \cdot (2^{i-1}-1)} u_i$, output $(u_1, \ldots, u_n)$.
- $\text{Mult}(u^*, v^*)$ : Output $\widetilde{w} = (u^* \cdot v^*)$
- $\text{Encode}_2(u_1, \ldots, u_n)$ : Output $\widetilde{u} = \sum_{i=1}^{n} 2^{k \cdot 2 \cdot (2^{i-1}-1)} u_i \in \mathbb{Z}_{2^{k2^n}}$.
- $\text{Add}_2(\widetilde{u}, \widetilde{v})$ : Output $\widetilde{w} = (\widetilde{u} + \widetilde{v})$
- $\text{Mask}(\widetilde{w}) \to$ Output $\widetilde{z} = \left(\widetilde{w} + \sum_{j \in \bar{I}} 2^{j \cdot k} \rho_j\right)$ where $I = \{0, 2, 6, (2^n - 2)\}$ and the $\rho_j$'s are picked randomly in $\mathbb{Z}_{2^k}$.
- $\text{Decode}_2(\widetilde{u})$ : Re-order $\widetilde{u} = \left(\sum_{i \in I} 2^{j \cdot k} u_i\right) + \left(\sum_{j \in \bar{I}} 2^{j \cdot k} \rho_j\right)$ where $I = \{0, 2, \ldots, (2^n - 2)\}$. Output the n values $\{u_i\}_{i \in I}$.

Here, $k = (m + d + \lambda)$ and $L = (k \cdot 2^n)$.

*Correctness.* Correctness follows easily by inspection.

*Security.* Given a tuple $(w_1, \ldots, w_n)$ computed as $\text{Decode}_2(\text{Mask}(\widetilde{w}))$, the simulator outputs a hyper-encoding $\widetilde{z}$ as follows:

- Let $I = \{0, 2, \ldots, (2^n - 2)\}$. Set $\{z_i\}_{i \in I} = (w_1, \ldots, w_n)$.
- $\widetilde{z} = \left(\sum_{i \in I} 2^{j \cdot k} z_i\right) + \left(\sum_{j \in \bar{I}} 2^{j \cdot k} \rho_j\right)$ where each $\rho_j$ is picked uniformly at random.

It is easy to observe that $\{\text{Mask}(\widetilde{w})\}$ and $\{\text{Sim}(w_1, \ldots, w_n)\}$ are identically distributed and hence statistically indistinguishable.

*FIG. 9*

Enrollment Phase: The device $\mathcal{D}$ has an input vector $\vec{u} = (u_1, \ldots, u_\ell)$ such that $\|\vec{u}\| = 1$. The enrollment phase proceeds as follows.

- Device $\mathcal{D}$ does the following:
  (1) Compute $u_1^*, \ldots, u_t^*$ as the encoding of $\vec{u}$. That is, $u_i^* = \text{Encode}_1(a_1, \ldots, a_n), \ldots, a_t^* = \text{Encode}_1(u_{\ell-n+1}, \ldots, u_\ell)$ where $t = \lceil \frac{\ell}{n} \rceil$.
  (2) Compute $(\text{esk}, \text{epk}) \leftarrow \text{PHr.Setup}(1^\lambda)$. For all $i \in [t]$, compute $[\![u_i^*]\!] = \text{PHr.Enc}(\text{epk}, u_i^*)$.
  (3) Send $(\text{epk}, \{[\![u_i^*]\!]\}_{i \in [t]})$ to $\mathcal{SP}$.
- Service provider $\mathcal{SP}$ responds back with a message "Enrolled".

Matching Phase: The terminal $\mathcal{T}$ has an input vector $\vec{w} = (w_1, \ldots, w_\ell)$ such that $\|\vec{w}\| = 1$. The matching phase proceeds as follows.

- Round 1: $(\mathcal{D} \to \mathcal{T})$ Device $\mathcal{D}$ sends $(\text{epk}, \{[\![u_i^*]\!]\}_{i \in [t]})$ to $\mathcal{T}$.
- Round 2: $(\mathcal{T} \to \mathcal{D})$ $\mathcal{T}$ does the following:
  (1) Compute $(w_1^*, \ldots, w_t^*) = \text{Encode}_1(\vec{w})$.
  (2) Compute $[\![\tilde{z}]\!] = [\sum_{i=1}^{t} \langle u_i^* \cdot w_i^* \rangle ]$ using the algorithm PHr.Add($\cdot$). Note that $\tilde{z}$ is now a level-2 encoding.
  (3) Pick $n$ random $k$-bit strings $\rho_1, \ldots, \rho_n$ such that $(\rho_1 + \cdots + \rho_n) = 0$. Let $\tilde{\rho} = \text{Encode}_2(\rho_1, \ldots, \rho_n)$.
  (4) Compute and send $[\![\tilde{P}]\!] = [\text{Mask}(\tilde{z} + \tilde{\rho})]$ to $\mathcal{D}$.
- Round 3: $(\mathcal{D} \to \mathcal{T})$ $\mathcal{D}$ does the following:
  (1) Compute $(\text{IP}_1, \ldots, \text{IP}_n) = \text{Decode}_2(\text{PHr.Dec}(\text{esk}, [\![\tilde{P}]\!]))$. Set $\text{IP} = \sum_{i=1}^{n} \text{IP}_i$.
  (2) If $\text{IP} \geq \tau$, $\mathcal{D}$ sends 1 to $\mathcal{T}$. Else, sends 0.
- Output Computation. Both parties output the bit sent in the last round.

*FIG. 10*

Enrollment Phase: The device $\mathcal{D}$ has an input vector $\vec{u} = (u_1, \ldots, u_\ell)$ such that $\|\vec{u}\| = 1$. The enrollment phase proceeds as follows.

- Device $\mathcal{D}$ computes $(\text{esk}, \text{epk}) \leftarrow \text{PLr.Setup}(1^\lambda)$ and sends $(\text{epk}, [\![u_1; \rho_1]\!], \ldots, [\![u_\ell; \rho_\ell]\!])$ to $\mathcal{SP}$.
- Run ZK protocols $\Pi_{\text{epk}}, \Pi_{\text{pot-knwdg}}$ and $\Pi_{\text{as-L2}}$ (with $y = 1$) from Section 8 with $\mathcal{D}$ as prover and $\mathcal{SP}$ as verifier. For the first proof, the statement is epk and witness is the underlying primes $(p, q)$. For the next two proofs, statement is $(\text{epk}, [\![u_1; \rho_1]\!], \ldots, [\![u_\ell; \rho_\ell]\!])$ and witness is $\{u_i, \rho_i\}_{i=1}^\ell$.
- If either proof fails, $\mathcal{SP}$ sends the message "Failed" to $\mathcal{D}$.
- Else, $\mathcal{SP}$ does the following:
  (1) Generate $(\text{sk}, \text{vk}) \leftarrow \text{Gen}(1^\lambda)$.
  (2) Compute $([\![u_1^*]\!], \ldots, [\![u_\ell^*]\!])$ using algorithm PLr.Add$(\cdot)$ where $u_i^*$ is the encoding of $\vec{u}$. That is, $u_i^* = \text{Encode}_1(u_1, \ldots, u_\ell), \ldots, u_\ell^* = \text{Encode}_1(u_{\ell-m+1}, \ldots, u_\ell)$ where $t = \lceil \frac{\ell}{m} \rceil$.
  (3) Send $\sigma = \text{Sign}(\text{sk}, (\text{epk}, [\![u_1^*]\!], \ldots, [\![u_\ell^*]\!]))$ to $\mathcal{D}$ and store vk at the terminal $\mathcal{T}$.

Matching Phase: The terminal $\mathcal{T}$ has an input vector $\vec{w} = (w_1, \ldots, w_\ell)$ such that $\|\vec{w}\| = 1$. The matching phase proceeds as follows.

- Round 1: $(\mathcal{D} \to \mathcal{T})$ Device $\mathcal{D}$ sends $(\sigma, \text{epk}, ([\![u_i^*]\!]]\!]_{i \in [t]}))$ to $\mathcal{T}$.
- Round 2: $(\mathcal{T} \to \mathcal{D})$ $\mathcal{T}$ does the following:
  (1) Output $\bot$ if Verify(vk, (epk, $[\![u_1^*]\!], \ldots, [\![u_\ell^*]\!]), \sigma) \neq 1$.
  (2) Compute $(w_1^*, \ldots, w_\ell^*) = \text{Encode}(\vec{w})$.
  (3) Compute $[\![z]\!] = [\![\sum_{i=1}^t (u_i^* \cdot (a \cdot w_i^*)) + b]\!]$ using the algorithm PLr.Add().
  (4) Pick random $k$-bit strings $\rho_1, \ldots, \rho_n$ such that $\sum_{i \in [n]} \rho_i = 0$. Let $\vec{\rho} = \text{Encode}_2(\rho_1, \ldots, \rho_n)$.
  (5) Compute and send $[\![\vec{X}]\!] = [\![\text{Mask}(\vec{z} + \vec{\rho})]\!]$ to $\mathcal{D}$.
- Round 3: $(\mathcal{D} \to \mathcal{T})$ $\mathcal{D}$ computes $(X_1, \ldots, X_n) = \text{Decode}_2(\text{PLr.Dec}(\text{esk}, [\![\vec{X}]\!]))$, sets $X = \sum_{i=1}^n X_i$, and sends $X$ to $\mathcal{T}$.
- Round 4: $(\mathcal{T} \to \mathcal{D})$ $\mathcal{T}$ does the following:
  (1) Set $\text{IP} = \frac{X - b}{a}$. If $\text{IP}_{\text{Max}} < \text{IP}$, output $\bot$ (indicates that the device cheated).
  (2) If $\mathcal{T} \leq \text{IP} \leq \text{IP}_{\text{Max}}$, send 1 to $\mathcal{D}$. Else, send 0.
- Output Computation. Both parties output the bit sent in the last round.

*FIG. 11*

Enrollment Phase: Same as the enrollment phase in Figure 4 in Section 6.
Matching Phase: The terminal $\mathcal{T}$ has an input vector $\vec{w} = (w_1, \ldots, w_\ell)$ such that $\|\vec{w}\| = 1$. The matching phase proceeds as follows.

- Round 1: $(\mathcal{D} \to \mathcal{T})$ Device $\mathcal{D}$ sends $(\sigma, epk, \{[u_i^*]\}_{i \in [\ell]})$ to $\mathcal{T}$.
- Round 2: $(\mathcal{T} \to \mathcal{D})$ $\mathcal{T}$ does the following:
  (1) Output $\perp$ if Verify($vk$, $(epk, [u_1^*], \ldots, [u_\ell^*]), \sigma) \neq 1$.
  (2) Compute $(w_1^*, \ldots, w_\ell^*) = \text{Encode}(\vec{w})$. Pick random strings $a \in \mathbb{Z}_\Delta, b \in \mathbb{Z}_{(\lambda, \log \|p_{Max} + \lambda)}$, $pad \in \mathbb{Z}_{\log \|p_{Max} + \lambda}$. Let $\overline{pad} = \text{Encode}_2(pad)$ and $\overline{b} = \text{Encode}_2(b)$.
  (3) Compute $[\![z_0]\!] = [\sum_{i=1}^\ell (u_i^* \cdot w_i^*) + pad]$ and $[\![z_1]\!] = [\sum_{i=1}^\ell (u_i^* \cdot (a \cdot w_i^*)) + b]$ using algorithm PH.Add($\cdot$).
  (4) Pick $2n$ random $k$-bit strings $\rho_1, \ldots, \rho_{2n}$ such that $(\rho_1 + \ldots + \rho_n) = 0$, $(\rho_{n+1} + \ldots + \rho_{2n}) = 0$. Let $\overline{\rho_0} = \text{Encode}_2(\rho_1, \ldots, \rho_n)$ and $\overline{\rho_1} = \text{Encode}_2(\rho_{n+1}, \ldots, \rho_{2n})$.
  (5) Compute and send $([\![\vec{X}]\!], [\![\vec{Y}]\!])$ to $\mathcal{D}$ where $[\![\vec{X}]\!] = [\text{Mask}(z_0 + \overline{\rho_0})]$ and $[\![\vec{Y}]\!] = [\text{Mask}(z_1 + \overline{\rho_1})]$.
- Round 3: $(\mathcal{D} \to \mathcal{T})$ $\mathcal{D}$ does the following:
  (1) Compute $(X_1, \ldots, X_n) = \text{Decode}_2(\text{PH.Dec}(esk, [\![\vec{X}]\!]))$, $(Y_1, \ldots, Y_n) = \text{Decode}_2(\text{PH.Dec}(esk, [\![\vec{Y}]\!]))$.
  (2) Set $X = \sum_{i=1}^n X_i$ and $Y = \sum_{i=1}^n Y_i$.
  (3) Generate and send $ot^{rec} \leftarrow \text{OT.Round}_1((X, Y), \rho^{ot})$ to $\mathcal{T}$.
- Round 4: $(\mathcal{T} \to \mathcal{D})$ $\mathcal{T}$ does the following:
  (1) Compute $(\widetilde{C}, lab) = \text{Garble}(C)$ for circuit $C$ described in FIG. 13. Let $(lab_{pad}, lab_a, lab_b)$ denote the labels for inputs $(pad, a, b)$.
  (2) Let $\{lab^0_{X,Y}, lab^1_{X,Y}\}$ denote the set of labels for inputs $(X, Y)$. Generate $ot^{sen} = \text{OT.Round}_2((lab^0_{X,Y}, lab^1_{X,Y}), ot^{rec})$.
  (3) Send $(\widetilde{C}, lab_{pad}, lab_a, lab_b, ot^{sen})$ to $\mathcal{D}$.
- Round 5: $(\mathcal{D} \to \mathcal{T})$ $\mathcal{D}$ does the following:
  (1) compute $lab_{X,Y} = \text{OT.Output}(ot^{sen}, ot^{rec}, \rho^{ot})$.
  (2) Run Eval($\widetilde{C}$, $lab_{pad}, lab_a, lab_b, lab_{X,Y}$) to learn output bit $y$ and label $lab_y$. Send $lab_y$ to $\mathcal{T}$.
- Output Computation. $\mathcal{D}$ outputs the bit $y$, $\mathcal{T}$ decrypts $lab_y$ and outputs the value.

*FIG. 12*

Inputs: $(X, Y, \text{pad}, a, b)$.
Computation:
- Compute $IP = (X - \text{pad})$. If $(a \cdot IP + b) \neq Y$, output $\perp$.
- If $T \leq IP$, output 1. Else, output 0.

*FIG. 13*

| $m$ | $c$ | $\Pi_1$ | | | $\Pi_2$ | | | $\Pi_3$ | | $\Pi_{en}$ | |
|---|---|---|---|---|---|---|---|---|---|---|---|
| | | $\mathcal{T}\to\mathcal{D}$ $m_1$ | | $\mathcal{D}\to\mathcal{T}$ | $\mathcal{T}\to\mathcal{D}$ | $m_1$ | $\mathcal{D}\to\mathcal{T}$ | $\mathcal{T}\to\mathcal{D}$ | $\mathcal{D}\to\mathcal{SP}$ | $\mathcal{SP}\to\mathcal{D}$ |
| 8 | 128 | 516 | 8,464 | 11,536 | 260 | 516 | 11,536 | 2,944 | 66,809 | 124,007 | 66,082 |
| | 256 | 516 | 16,656 | 22,288 | 260 | 516 | 22,288 | 2,944 | 69,561 | 189,543 | 131,618 |
| | 512 | 516 | 33,040 | 44,304 | 260 | 516 | 44,304 | 3,071 | 72,313 | 320,615 | 262,690 |
| | 1024 | 516 | 65,808 | 87,824 | 260 | 516 | 87,824 | 3,076 | 75,065 | 582,760 | 524,834 |
| 16 | 128 | 516 | 8,464 | 13,584 | 260 | 516 | 13,584 | 4,000 | 110,841 | 124,007 | 66,082 |
| | 256 | 516 | 16,656 | 26,896 | 260 | 516 | 26,896 | 4,000 | 113,593 | 189,543 | 131,618 |
| | 512 | 516 | 33,040 | 53,008 | 260 | 516 | 53,008 | 4,132 | 116,313 | 320,615 | 262,690 |
| | 1024 | 516 | 65,808 | 105,232 | 260 | 516 | 105,232 | 4,132 | 119,033 | 582,760 | 524,834 |
| 24 | 128 | 516 | 10,000 | 16,656 | 260 | 516 | 16,656 | 5,056 | 154,393 | 124,007 | 66,082 |
| | 256 | 516 | 19,216 | 33,040 | 260 | 516 | 33,040 | 5,056 | 157,113 | 189,543 | 131,618 |
| | 512 | 516 | 38,160 | 65,808 | 260 | 516 | 65,808 | 5,188 | 159,833 | 320,615 | 262,690 |
| | 1024 | 516 | 75,536 | 131,344 | 260 | 516 | 131,344 | 5,188 | 162,553 | 582,760 | 524,834 |

*FIG. 14*

| m | $\ell$ | $\Pi_1$-Enc | $\Pi_1$ | $\Pi_{en}$-Enc | $\Pi_{en}$ | $\Pi_2$ | $\Pi_3$ |
|---|---|---|---|---|---|---|---|
| 8 | 128 | 318 | 12 | 1,110 | 2,914 | 25 | 71 |
| | 256 | 626 | 19 | 2,198 | 5,018 | 44 | 102 |
| | 512 | 1,118 | 40 | 4,389 | 9,249 | 74 | 171 |
| | 1,024 | 2,263 | 72 | 8,809 | 17,704 | 138 | 289 |
| 16 | 128 | 457 | 15 | 1,082 | 2,927 | 33 | 87 |
| | 256 | 630 | 24 | 2,200 | 5,008 | 49 | 119 |
| | 512 | 1,131 | 45 | 4,367 | 9,439 | 89 | 195 |
| | 1,024 | 2,316 | 88 | 8,855 | 17,849 | 170 | 357 |
| 24 | 128 | 384 | 19 | 1,094 | 2,892 | 28 | 74 |
| | 256 | 742 | 32 | 2,204 | 5,053 | 43 | 105 |
| | 512 | 1,298 | 64 | 4,373 | 9,242 | 73 | 164 |
| | 1,024 | 2,541 | 118 | 8,772 | 17,822 | 123 | 266 |

*FIG. 15*

VERIFICATION OF BIOMETRIC TEMPLATES FOR PRIVACY PRESERVING AUTHENTICATION

BACKGROUND

We use biometrics like fingerprints and facial images to identify ourselves to our mobile devices and log on to applications every day. Such authentication is internal-facing: we provide measurement on the same device where the template is stored. If our personal devices could participate in external-facing authentication too, where biometric measurement is captured by a nearby external sensor, then we could also enjoy a frictionless authentication experience in a variety of physical spaces like grocery stores, convention centers, ATMs, etc. The open setting of a physical space brings forth important privacy concerns though.

Therefore, it is desirable to provide efficient and reliable biometric authentication while maintaining privacy.

BRIEF SUMMARY

Some embodiments of the present disclosure can provide efficient techniques for performing biometric matching to provide access to a resource. For example, in an enrollment phase, a verifier device can confirm that a biometric template stored on a user device satisfies one or more properties (e.g., normalization). The verification can be performed on an encrypted version of the biometric template. The verifier device can then sign the encrypted biometric template, and the user device can store the digital signature. Then, during a matching phase, the user device can provide the digital signature to an access device, which trusts the verifier device. In this manner, the verification of the biometric template may be done once during enrollment, and may not need to be done during the matching phase, e.g., to determine whether to authorize access to a resource.

Some embodiments of the present disclosure can provide accurate techniques for verifying a biometric template satisfies a normalization property. The verifying can be done using an encryption of the biometric template. For example, a verifier device can use two different normalization checks with one check involving mod N calculations and another check involving mod $\hat{N}$ calculations. Performing the two checks can confirm that the elements of the vector comprising the biometric template do not wrap around the N bits allocated for the cryptographic settings used. If an element did wrap around, it may satisfy the normalization property for one check but not for both checks. Active attacks can be prevented by using both checks.

In some implementations using the two checks, to confirm the normalization of the biometric vector equals a specified value y and that the biometric vector values are less than a maximum bound, a verifier V can send a challenge to the user device (prover P). The challenge can include random values combined with each of the encrypted biometric vector values, thereby providing a masked encrypted biometric vector w. The challenge can also include a first cancellation value v that is determined using mod N calculations and may include a sum of the encrypted biometric vector values and a first random value $\beta$. The challenge can also include a second cancellation value $\hat{v}$ that is determined using mod $\hat{N}$ calculations and may include a different sum including the encrypted biometric vector values and a second random value $\hat{\beta}$. The challenge can be encrypted, e.g., using a public key of the prover P. Each of the masked encrypted biometric vector w, first cancellation value v, and the second cancellation value $\hat{v}$ can also include a third random value $\alpha$.

The prover P can decrypt w, v, and $\hat{v}$. Prover P can determine a first challenge response z, including the first cancellation value v and a sum of a first function of the w values mod N. Prover P can also determine a second challenge response $\hat{z}$, including the second cancellation value $\hat{v}$ and the sum of a second function of the w values mod $\hat{N}$. The verifier can check that $z=y\alpha^2+\beta$ and $\hat{z}=y\alpha^2+\hat{\beta}$, and otherwise reject the enrollment (e.g., not providing a digital signature). In this manner, the challenge response may not be accepted if any of the biometric values overflow N or $\hat{N}$.

Some embodiments of the present disclosure can provide efficient techniques for confirming that a user device stores the actual biometric vector x that was used to generate the encrypted biometric vector c. A verifier device V can receive, from a user device (P) an encrypted biometric c (also called a witness) that is generated using the biometric vector x and a random vector r. The prover P can send an encrypted commitment value to the verifier V, where the commitment value includes two separate random values s and u. The verifier V can send a random challenge vector e to the prover P. The prover P determines a first challenge response w using the first random value s and an inner product of e and x mod N. The prover P can determine a second challenge response z using the second random value u, P's public key, the random vector r, and the random challenge vector e. The prover P can send w and z to the verifier V. The verifier can encrypt a product of w and z, where the encrypted product should equal the encrypted commitment value combined with a function of the encrypted biometric vector c and the random challenge vector e. Otherwise, the verifier device can reject the encrypted biometric vector c for enrollment with the user device.

For some implementations, for templates of length 256 with elements of size 16 bits each, our fastest protocol takes merely 0.024 seconds to compute a match, but even the slowest one takes no more than 0.12 seconds. The communication overhead of our protocols is very small too. The passive and actively secure protocols (with some leakage) need to exchange just 16.5 KB and 27.8 KB of data, respectively. The first message can be reusable and, if sent in advance, can reduce the overhead down to just 0.5 KB and 0.8 KB, respectively.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 1 shows the ideal functionality $\mathcal{F}$ for biometric authentication.

FIG. 6 shows a zero-knowledge (ZK) protocol $\Pi_{zk\text{-}L2}$ for verifying that an encrypted biometric template satisfies the L2-norm according to embodiments of the present disclosure.

FIG. 8 shows a zero-knowledge (ZK) protocol $\Pi$ptxt-knwldg for batch proving knowledge of plaintexts according to embodiments of the present disclosure.

FIG. 9 shows an example construction for a packing scheme according to embodiments of the present disclosure.

FIG. 10 is a three round biometric authentication protocol that is secure against any semi-honest adversary.

FIG. 11 is a four round biometric authentication protocol that is secure against any adversary that can maliciously corrupt the device or jointly corrupt the terminal and authority in a semi-honest manner according to embodiments of the present disclosure.

FIG. 12 is a five round biometric authentication protocol that is secure against any adversary that can maliciously corrupt the device or jointly corrupt the terminal and authority in a semi-honest manner with no leakage to any party according to embodiments of the present disclosure.

FIG. 13 show a circuit C to be garbled from FIG. 12.

FIG. 14 shows communication overhead in bytes for various protocols. m denotes the bit count of the template elements. $\ell$ denotes the number of elements in the template. $m_1$ denotes the size of the first message of the protocol which is reusable. D→T denote the remaining communication from D to T. T→D denote the total communication from T to D.

FIG. 15 shows running times in milliseconds of various protocols with element bit count m and vector length $\ell$.

TERMS

Figure 2:
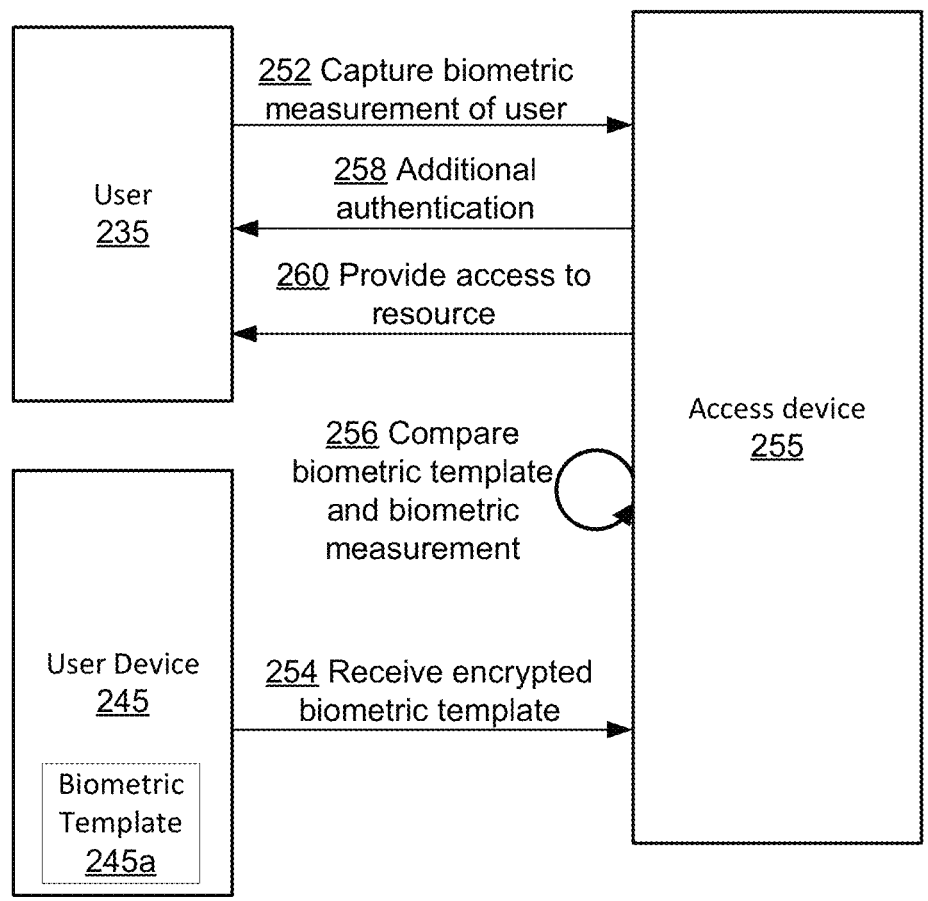
FIG. 2 shows processes for accessing a resource that may be improved using embodiments of the present disclosure.

Prior to discussing embodiments of the invention, some terms can be described in further detail.

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

A "user device" may be any suitable device that is operated by a user. Suitable user devices can be portable and can communicate with external entities such as access devices. Examples of user devices include mobile phones, laptop computers, smartwatches, access cards, smart cards, etc.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity.

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. AN access device may be in any suitable form. Some examples of access devices include POS or point of sale devices (e.g., POS terminals), cellular phones, PDAs, personal computers (PCs), table PCs, handheld specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. Other examples of access devices include devices (e.g., locks, gates, access control boxes, etc.) that control physical access to locations (e.g., venues, transit stations, homes, offices, buildings, etc.) as well as software devices that control access to data or information. In embodiments, the access device may be configured to charge or recharge a user device via contact or contactless modes of operation.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

DETAILED DESCRIPTION

This disclosure provides efficient and accurate protocols for secure external-facing authentication of user devices (e.g., mobile devices) using biometric measurements. A biometric template can be verified to satisfy one or more properties and enrolled for use later in an authentication process (phase). As part of a separate enrollment or in a same sessions as a matching phase, a biometric template can be verified (e.g., by a verifier device) to satisfy one or more specific properties, e.g., normalization. The verification can use new techniques for zero-knowledge proofs (e.g., to confirm an active attack is not using a biometric template with too large of vector values). Additionally, packing techniques can enable efficient communications.

When the verification of the biometric template occurs during an enrollment phase, the interaction can include three entities in: a user device $\mathcal{D}$, a terminal $\mathcal{T}$ (also called an access device) having an attached sensor, and a service provider $\mathcal{SP}$ (also called a verifier device). Embodiments can include two phases in authentication: an enrollment phase where a user's biometric template is registered with a service provider, and a matching phase where the user device and a terminal interact with each other to compare biometric data, e.g., to provide access to a resource. Embodiments can represent biometric templates as vectors and compute the inner-product between them (in a secure manner).

Some embodiment use zero-knowledge proofs to provide security against active attacks, which can include malformed ciphertexts, invalid biometric templates, etc. For example, a malformed encrypted biometric can be generated from an invalid biometric vector with values larger than a specified amount. This disclosure presents several efficient zero-knowledge protocols. One protocol uses a proof for the well-formedness of templates, represented as vectors. Some embodiments can verify that a vector has a certain norm (e.g., L2 norm), without leaking any information about the biometric template to the verifier device. Existing protocols [23] for this have an overhead of $\kappa n$ for a statistical security parameter $\kappa$, say 40. We present new techniques to reduce the overhead to (roughly) n, thus achieving close to 40× speedup.

Another protocol is a zero-knowledge proof-of-knowledge of the plaintext values in a set of n Paillier ciphertexts. One can use techniques to prove knowledge of each plaintext value individually, but this would make the communication complexity linear in n. This disclosure provides a new batched version of their protocol where the prover sends the same number of messages as the basic protocol. For example, after applying a Fiat-Shamir heuristic, some embodiments can provide a protocol with a constant communication complexity (independent of n).

Additionally, some embodiments can use a Paillier encryption scheme [26] to encrypt templates and use its homomorphic properties to operate on them. Typically, a single Paillier ciphertext can contain 2048 or 3072 bits of plaintext data but for biometric tasks, the size of a plaintext value is typically very small. An optimization technique for Paillier encryption can allow batching encryptions of several plaintexts (of relatively small size) into one single ciphertext thereby reducing the computation and communication overhead of the basic encryption scheme considerably.

The packing technique is significantly different from [20, 25] due to the support for multiplying two packed values. To get some insight, suppose we have two vectors $u = (u_1, \ldots, u_\ell)$ and $\vec{v} = (v_1, \ldots, v_\ell)$, and we pack n out of $\ell$ elements into one ciphertext somehow. If we only care about summing up these vectors component-wise, we just need to make sure that there is some extra room or padding between the packed elements to capture the overflow. The amount of padding can depend on the number of additions to be performed. However, multiplying two ciphertexts packed in a simple manner would produce terms where the desired products (of the form $u_i v_i$) are mixed with cross-products (of the form $u_i v_j$, $i \neq j$); so the packing scheme can be more sparse. Furthermore, the cross-products could leak extra information when packed ciphertexts are decrypted, so they need to be masked properly. Some embodiments provide new encoding scheme that takes care of these problems (Section V), and can results in 8× savings in the semi-honest protocol and 6× savings in the malicious ones.

Various example protocols can exploit the new packing and proof techniques to build a suite of efficient protocols for biometric matching (e.g., based on the cosine similarity metric or other similarity metric) with trade-offs between security and efficiency. Example protocol I can provide security against semi-honest attacks, and leak the inner product (between the biometric template and captured biometric) to the user device. Example protocol II can provide security against malicious devices and semi-honest service-provider/terminal, and leak the inner product to the terminal. Example protocol III can provide security in the same setting as the above but leak no information.

Any of the protocols might perform a verification of whether the biometric template is malformed, e.g., normalized. For example, in the enrollment phase, a provider can sign an encrypted template provided by a user device. The user device can hide the template (by encryption) but convince the service provider that it is well-formed using a zero-knowledge proof. The signed encrypted template can be sent in a message (e.g., a first message) sent by the device in a matching phase with a terminal. The signature convinces the terminal that the template is well-formed without having to engage in another proof session. Since an encrypted template leaks no information to the terminal, the first message of the matching protocol can be sent even before the terminal had a chance to record a measurement.

Protocol I, II, and III can have three, four and five rounds of communication, respectively, in the matching phase. A round consists of a message sent from the device to the terminal or vice versa. If the first message is sent early on, then the matching phase in all the three protocols can have one fewer round.

Apart from zero-knowledge proofs, some embodiments can use cryptographic tools like message authentication codes, oblivious transfer, and garbled circuits to achieve security under active attacks in the second and third protocols. The first protocol may rely on the security of Paillier encryption.

Results are provided for the three protocols on a single commodity laptop. We use 3072-bit Paillier, estimated to have 112 bits of computational security, and a statistical security parameter of 40 bits. We consider various template lengths $\ell \in E$ {128, 256, 512, 1024} combined with different bit lengths $m \in \{8, 16, 24\}$ for each template element. We discuss here some performance numbers for $\ell = 256$ and $m = 16$. Further details are provided later.

For Protocol I, enrollment takes 0.6 seconds while the matching phase requires just 0.024 seconds. This can be explained by the fact that Paillier encryption requires a large exponentiation while decryption and homomorphic operations are relatively efficient. The first message of matching phase (encrypted template) is only 16 KB as opposed to 128 KB, thanks to packing. Thus, packing helps to achieve an improvement of 8× here. The rest of the protocol only requires the terminal to communicate 516 bytes. As a result, Protocol I has very low communication overhead.

Despite considering malicious devices, protocols II and III require only 5 seconds for enrollment, due to the disclosed use of efficient zero-knowledge proofs. The matching phase of protocol II takes just 0.05 seconds. The first message here is of size 27 KB as opposed to 162 KB, a saving of 6× due to packing. The rest of the protocol consumes only 0.8 KB.

The most secure protocol, protocol III, is also quite fast. It takes only 0.12 seconds to compute a match. The communication overhead is on the higher side though: a total of 142 KB is exchanged as opposed to 28 KB for protocol II, due to the use of garbled circuits. With some assistance from the service provider in a preprocessing phase, this can be brought down to as little as 20 KB.

Other embodiments can use other types of homomorphic encryption schemes besides Pailler encryption, such as learning with errors (LWE)-based additive homomorphic encryption schemes.

I. Introduction

Biometric authentication has become a part of our daily lives. We use biometrics like fingerprints and facial images to identify ourselves to our mobile devices and log into mobile applications everyday [1-3, 5]. When we set up a device (enrollment phase) that supports biometric authentication, we provide several biometric measurements so that it can generate a high quality template. After that, we authenticate by providing a fresh biometric measurement. If the measurement matches with the stored template, the authentication succeeds (matching phase). Such authentication can be considered as internal-facing: biometric data is collected for matching on the same device where the template is stored.

The ability of mobile devices to store and process biometric data securely could be utilized for external-facing authentication too, where a sensor placed outside of the device (i.e. external sensor) collects biometric data for matching. Consider a large service provider with several physical locations in a region. A user can enroll her template with the provider through its app on her mobile device. Then, sensors placed at the provider locations can capture her biometric data and match it against the template stored on her device. If the match is successful, then she could get a certain level of access, allowed to accomplish a certain task, etc., based on her account with the provider.

Places like amusement parks, convention centers, theaters, etc., could use this type of biometric matching at the entrance to quickly and conveniently identify people who have bought tickets earlier through their app. Grocery stores could use it to identify the right payment credentials and enable a smooth checkout. ATM machines could use it to identify the account to withdraw money from. Apartments could use it to only allow authorized people in.

An important benefit of this approach is that the biometric templates of the user population are not collected and stored in some giant database, whose breach would be disastrous [6, 8]. Instead, the templates stay on the devices of the users to which they belong.

In the settings discussed above, there is value in making the user experience seamless. Users may not need to reach out for their devices and interact with them every time the service provider tries to authenticate them at its locations. Once a user demonstrates her trust in a provider by connecting with an access device of the provider and participating in the matching process at a location, the user device can automatically connect with another provider access device any time a match is needed at that location (and perhaps at other locations too). Google's Nearby Connections API [4], for instance, could be used for this purpose. It uses both Bluetooth and WiFi Direct to connect devices.

Though a seamless experience seems quite useful and appealing, it constrains how a secure matching protocol can be designed due to privacy concerns. Let us take the example of an amusement park where people have lined up at the entrance. A sensor installed on the terminal (access device) would automatically connect to several user devices in proximity (if these devices are enrolled). If the sensor takes a biometric measurement of Alice (e.g., by capturing her picture), it cannot just share the measurement with all the connected devices because it does not know which of them belongs to Alice.

Also, it may be undesirable for the devices to share their templates with the sensor. This is undesirable for at least two reasons. First, a template may be a lot more representative of an individual than a measurement collected by the sensor. Second, there may be people in the vicinity of the sensor who do not wish to enter the park but their devices are connected. These devices have no reason to just send the template to the sensor.

To summarize, in some implementations, neither the sensor should share the measurement collected with the devices in plaintext nor the devices should share the templates with the sensor in plaintext. Thus, a matching protocol between sensor and devices is desired that can work with encrypted data and that can leak as little information as possible about the sensitive biometric information involved.

While preventing information leakage is certainly important, attackers could also try to subvert the matching protocol. An attacker Bob could steal Alice's device, which stores her template, and try to trick the sensor into believing that it captured Alice's biometric, when the biometric is actually Bob's. In other words, Bob attempts to force the matching protocol to succeed when it should not, which would enable him to impersonate Alice. At an ATM machine, for example, he would be able to withdraw Alice's money. Such an attack can be considered an active attack. Such an attack could use a new template that is not normalized or the stored encrypted biometric template could be changed.

Another design aspect is that of efficiency, best exemplified by places like amusement parks where hundreds of people wait in line to enter. Any secure matching protocol for such use-cases should be both computation and communication efficient. The protocol should return the match outcome as quickly as possible. In some implementations, it could start before a person gets to the front of the line, i.e., before a biometric measurement is taken. Furthermore, the protocol can involve a small amount of data exchange because the connection could be low-bandwidth like Bluetooth or data usage could be expensive. On the other hand, enrollment of biometric templates could be on the slower side because it will happen infrequently.

There exists an extensive literature on secure protocols for biometric matching for various modalities (fingerprint, iris, face, etc.) and distance measures (Hamming distance, Euclidean distance, etc.). Some are based on the idea of deriving a cryptographic key from noisy biometric measurements [10, 11, 16, 22] One shortcoming of this approach is the difficulty in deriving a consistent key despite potential errors in the biometric measurement. Another line of work uses techniques from secure multi-party computation to evaluate the traditional matching algorithms on encrypted data [9, 17, 20, 21, 25, 27, 28]. Some embodiments of the present disclosure lie in this second category.

However, to the best of our knowledge, all prior work is in the semi-honest model and does not consider active attacks. Instead, they are often motivated by the identification setting, where a measurement is compared with a database of templates, as opposed to the authentication setting. Authentication is a 1:1 type of task where a measurement is compared against a template to determine if they belong to the same person. Identification, on the other hand, is a 1:N type of task where a measurement is matched against a potentially large set of N templates to determine who the measurement belongs to. For identification, a focus is on trying to batch process as many comparisons as possible instead of optimizing a single comparison operation. Embodiments of the present disclosure can also could have several simultaneous authentication attempts from different users.

II. Preliminaries

Some cryptographic concepts and notation is useful for understanding certain aspects of the disclosure. As for notation, the security parameter is denoted by $\lambda$. Biometric values can be represented using vectors, e.g., the device's biometric template can be represented as a vector $\overleftarrow{u} = (u_1, \ldots, u_\ell)$ and the terminal's biometric template is represented as a vector $w = (w_1, \ldots, w_\ell)$. Here, for all $i \in [\ell]$, $u_i, w_i \in \mathbb{Z}_{2^m}$ (i.e., $u_i, w_i$ are m-bit numbers). We use $\llbracket x \rrbracket$ to denote an encryption of x. Sometimes, we use $\llbracket x; r \rrbracket$ to denote that message x is encrypted using randomness r.

A. Cosine Similarity

One similarity metric for determining whether the captured biometric (i.e., from the sensor) matches the biometric template is a cosine similarity, which can be defined as follows. For vectors u, w, the Cosine Similarity between them is a value between 0 and 1 defined as follows:

$$C.S.\ Dist(\overleftarrow{u}, \overleftarrow{w}) = \frac{\langle u, w \rangle}{\|u\| \cdot \|w\|}.$$

Note that if the L2-norm of both vectors $\|u\|$, $\|w\|$ is $\zeta$, CS. Dist(u, w) = $\langle u, w \rangle / \zeta^2$. To check if CS. Dist($\overleftarrow{u}, \overleftarrow{w}$) ≥ T' for some T'∈[0,1], it is sufficient to check that $\langle u, w \rangle \geq T$ where $T = T' \cdot 1^2$.

We formally define zero knowledge proofs, digital signatures, oblivious transfer and garbled circuits in section X. Other example similarity metrics include Hamming or Euclidean distances.

B. Paillier Encryption

The additively homomorphic encryption scheme by Paillier [26] (Plr.Setup, Plr.Enc, Plr.Add, Plr.Dec) can be defined as follows:

Plr.Setup($\lambda$) =: (epk, esk): Choose random primes p and q of length $\lambda$. Set N=pq, g=(N+1), d=lcm(p-1, q-1). Compute $\mu = L(g^d \mod N^2)^{-1} \mod N$ where L(•) is defined as $$L(x) = \frac{x-1}{N}.$$

Output public key epk=(N, g) and secret key esk=(d,$\mu$).

Plr.Enc($\lambda$, x, epk) =: $\llbracket x;r \rrbracket$: Given plaintext $x \in \mathbb{Z}_N$, output ciphertext $\llbracket x;r \rrbracket = g^x r^N \mod N^2$ where r is chosen randomly in $\mathbb{Z}_N^*$.

Plr.Add($\lambda$, x, y) =: x+y: Given ciphertexts x and y, output ciphertext x+y=x·y mod $N^2$.

Plr.Dec($\lambda$, c, esk) =: x: Given ciphertext c and secret key esk, output $x = L(c^d \mod N^2) \cdot \mu \mod N$.

We describe the correctness and security properties satisfied by this scheme in section X.

C. Biometric Authentication

In this section, we describe examples for secure biometric authentication. We use the ideal-real world paradigm to capture the security goals.

FIG. 1 shows the ideal functionality $\mathcal{F}$ for biometric authentication. It has two query types. The first allows a user to register a biometric template $\overleftarrow{u}$ via her device $\mathcal{D}$ with a service provide $\mathcal{SP}$ in an 'enrollment' phase. Subsequently, the device can engage in a 'matching' session with a terminal $\mathcal{T}$ using her registered template. The terminal provides a measurement $\overleftarrow{w}$. If $\overleftarrow{u}$ and $\overleftarrow{w}$ are close enough, then $\mathcal{F}$ reports that there was a match.

In addition, the functionality explicitly allows a pair of leakage functions to be defined.

Such leakage functions can be used because some protocols reveal more information than just the predicate of whether there was a match or not. For example, some protocols can reveal the inner product between $\overleftarrow{w}$ and $\overleftarrow{u}$ to one of the parties.

For a real world model, a protocol $\pi$ for biometric authentication can comprise two phases: an enrollment phase and a matching phase. The enrollment phase is between a device $\mathcal{D}$ and a service provider $\mathcal{SP}$. Once $\mathcal{D}$ is enrolled, it can participate in a matching session with a terminal $\mathcal{T}$. Typically, the enrollment phase will be run once for a device, while the matching phase will be run many times, possibly with different terminals.

For a threat model, we consider semi-honest (honest-but-curious) service providers and terminals, but account for the real possibility that they may collude with each other to learn more information about the biometric templates of users (beyond the fact that there was a match or not, and any leakage). In other words, embodiment can consider a simulator for the joint view of a semi-honest $\mathcal{SP}$ and $\mathcal{T}$.

On the other hand, we consider both semi-honest and malicious devices. A semi-honest device would try to learn more information about the measurements than it is supposed to. A malicious device would go further: it could try to enroll an invalid template ($\|\vec{u}\|\neq 1$), make the matching succeed even when the measurement is not close ($\langle \vec{u},\vec{w}\rangle <T$), etc.

Service providers could be malicious too but attempting to change the outcome of matching is not very useful for them (like it is for devices). If a paying member of an organization is refused entry to one of its locations, for instance, due to a biometric match failure, she could just ask for a refund. If a grocery store attempts to make the matching succeed with someone's device who is not checking out, the person could dispute the charge on her credit card.

Some embodiments can consider a protocol π to be secure if, for every adversary $\mathcal{A}$ in the real world (of the type described above), there exists a simulator $\mathcal{S}$ in the ideal world such that the joint distribution of the output of honest parties and view of $\mathcal{A}$ in the real world is computationally indistinguishable from the joint distribution of the output of honest parties and $\mathcal{A}$ in the ideal world.

III. Scenarios for Using Biometrics Between Two Devices

Biometrics can be used in a variety of external facing scenarios, where the device capturing a biometric measurement is not the device that stores the biometric template. Such scenarios can occur in a variety of situations where it is desirable to confirm a location of the user (e.g., that the user is at a door to enter a building) as determined by an access device at that location, while also confirming that the user's device does belong to the user. For instance, the access device can includes a sensors (e.g., a camera) that captures a photographic image of the user. Embodiments can enable such authentication using biometrics without exposing the biometric template so that others cannot use it to gain improper access to the user's device or other devices.

A. General Use of Biometric in Matching Phase

FIG. 2 shows processes for accessing a resource that may be improved using embodiments of the present disclosure. As examples, the resource may be access to a secured building or area, an ATM, a point-of-sale device, or any other device for which a biometric authentication may be useful for providing access. Access to the resource may be controlled by an access device 255 that has a biometric sensor. Such an access device could store biometric templates of all users with authorization to enter the secured area. However, there may be a large number of users, and storing many biometric templates together may make the access device a target for hackers. Thus it may be beneficial to have each user store their own biometric template.

In step 252, the access device 255 may use a biometric capture device (such as a camera or fingerprint sensor), also referred to as a biometric sensor, to capture a biometric measurement of the user 235. The capture is shown as an arrow depicting the transfer of biometric information from user 235 to access device 255. The biometric capture device could be triggered in a variety of ways. For example, the user's presence could automatically trigger the capture device. In other implementations, the user can be required to affirmatively select a button or other user interface element to trigger the capture. In this manner, instruction can be provided to the user for positioning to provide a high quality measurement.

As another example, the access device 255 can emit a beacon signal (e.g., via Bluetooth), which can be detected by user devices in the vicinity (e.g., user device 245). After detecting the beacon signal, the user device can send a command to the access device to capture a biometric (e.g., a photo) of the user. As another example, the access device can capture the biometric periodically.

In step 254, the access device 255 may receive a biometric template 245a from a user device 245. The user device 245 may be, for example, a mobile device such as a smart phone. The biometric template 245a may be encrypted and have been stored on the user device 245 from a prior enrollment step (in this example an internal enrollment). In this enrollment, the user device 245 may capture biometric information of the user 235.

As described in later section, an external enrollment process can involve a verifier device to confirm that the biometric template satisfies one or more properties, e.g., a norm of a biometric vector. The user information may then be sampled and stored on the user device 245 as a biometric template, potentially along with a digital signature of the verifier device. In other implementations, the access device 255 can also perform the verification that the biometric template 245a satisfies the one or more properties. The biometric template 245a may be stored on a secure element of the user device 245. The user device 245 and the access device 255 may communicate in a variety of ways. For example, the devices may communicate over a wireless connection such as Wi-Fi, Bluetooth, and near-field communication (NFC).

In step 256, the access device 255 may then compare the biometric template 245a to the biometric measurement using a similarity function to compute a similarity metric. If the similarity metric exceeds a predetermined threshold, then the access device may verify the user. Alternatively, the access device 255 may send the biometric measurement to the user device 245. The user device 245 may then compare the biometric template 245a to the biometric measurement using a similarity function.

In step 258, the access device 255 may perform additional authentication and/or authorization steps. For example, the access device 255 may request that the user 235 enter a personal identification number (PIN) or a password for further authentication. The access device 255 may also check recent usage of an account of the user. For example, there may be recent usage that indicates potential fraud. The access device 255 may communicate with additional computer devices, such as an authentication computer and/or an authorization computer, to perform the additional authentication and/or authorization steps.

In step 260, once the user account is verified using the biometric technique and any authentication and possible authorization has been approved, the access device 255 may notify the user 235 and provide a resource to the user 235. For example, the resource may be access to the secured building. More generally, the resource may be, for example, a computer resource (e.g., stored data or a networked computer account), a physical resource (e.g., a tangible object or a physical location), or other electronic resource or communication between computers (e.g., a communication signal corresponding to an account for performing a transaction). Additional examples of a resource may include a good or service, a computer account or file, or a payment account. In such situations, an authorizing computer (entity) can perform a further determination of whether the user is authorized to access the resource. For example, a user may be authenticated, but not have registered or does not have sufficient funds to access the resource. After authentication, a user or the user device can be prompted to provide payment credential, which can be confirmed by an authorization entity that authorizes access to the resource, as may be controlled by a resource provider in communication with the access device 255.

In the setting of external-facing authentication where a seamless experience is desirable, facial recognition is one type of biometric that can be used. For the matching, the cosine similarity metric is one example similarity metric that can be used (e.g. CosFace [31], SphereFace [24], FaceNet [29]).

B. Cooperating Devices Using Homomorphic Encryption

To implement the biometric authentication described in FIG. 2, some embodiments can use homomorphic encryption so that the captured biometric can be compared to the encrypted biometric template, so that the access device does not need to have the biometric template in plaintext format. Accordingly, the comparison is performed while both are encrypted so as not divulge either. As part of the comparison, a similarity metric is confirmed to be below a threshold to ensure there is a match between the two biometrics; an exact match would generally not occur due to measurement differences.

Figure 3:
FIG. 3 shows a flow diagram of a method 300 of authenticating a user with biometric information.

FIG. 3 shows a flow diagram of a method 300 of authenticating a user with biometric information. The user may be interacting with an access device to gain access to some resource. For example, the resource may be a secured building, a computing device, or a payment account. A user device 305 can correspond to a first device, and access device 315 can correspond to a second device having a biometric sensor. Method 300 may be triggered by user input at user device 305, e.g., initiating an authentication process with an application executing on the user device 305. As another example, method 300 may be triggered via input at access device 315, which can then send a message to user device to initiate the authentication process. The input at access device 315 may be provided by a different user or the same user of user device 305, e.g., by a user walking by a sensor of access device 315 to trigger the authentication process.

In step 302, user device 305 can generate a public key and an encrypted biometric template. The biometric template may have been encrypted using a private key associated with the public key, following a homomorphic encryption scheme. The user device 305 may also generate one or more encrypted masks by encrypting one or more randomly selected values (also referred to as mask values, e.g., when not randomly selected), which may be later used to mask a similarity metric. In some embodiments, the user device 305 may generate an indicator that the biometric template that was encrypted is in proper format. For example, the user device 305 may also generate a proof-of-knowledge indicating that the plaintext biometric template is normalized (e.g., a vector with a total length 1). In other embodiments, such a proof can be used in an enrollment process with a service provider.

In step 304, the user device 305 can send the public key and the encrypted biometric template to an access device 315. The user device 305 may also send the indicator (e.g., the proof-of-knowledge) and/or the one or more encrypted masks.

In step 306, the access device 315 can receive the public key and the encrypted biometric template from the user device 305. The access device may also receive the indicator (e.g., the proof-of-knowledge or a digital signature confirming the biometric template is well formed). In some embodiments, the access device 315 may then evaluate the proof-of-knowledge, using the encrypted biometric template, to confirm that the plaintext biometric template is normalized. In other embodiments, the digital signature of the encrypted biometric template can be verified using a public key of the verifier device that generated the digital signature, as described in more detail in the next section. If the access device 315 does not receive an expected indicator that the plaintext biometric template is in proper format, the access device 315 may abort the process. In other embodiments, the access device 315 may assume the plaintext biometric template is in the proper format. The access device 315 may also receive the one or more encrypted masks.

In step 308, the access device 315 may obtain a biometric measurement of the user using one or more biometric sensors. For example, the access device 315 may use a fingerprint reader to capture a finger print of the user. In another example, the access device 315 may use a camera to capture a facial scan of the user. The access device 315 may then store the biometric measurement as a vector, and may normalize the biometric measurement vector.

In step 310, the access device 315 can compute an encrypted similarity metric using a similarity measure. For example, the similarity measure may be cosine similarity, and the similarity metric may be an inner product. By encrypting the biometric template with a homomorphic encryption scheme, the access device 315 can perform computations on the encrypted information as if it were plaintext, without needing to decrypt it. The access device 315 may use the public key when computing the similarity metric, e.g., by encrypting the captured biometric for comparing to the encrypted biometric template. The access device 315 may use the one or more encrypted masks to mask the encrypted similarity metric. The access device 315 may also use one or more random values to mask the encrypted similarity metric.

In step 312, in some embodiments, the access device 315 can optionally compute an encrypted code. The encrypted code may be an authentication function of the encrypted similarity metric and one or more randomly selected values. For example, the authentication function may be a linear function of the encrypted similarity metric and the randomly selected values. The encrypted code may be a one-time message authentication code (MAC). The encrypted code may be computed with the public key, using properties of homomorphic encryption. The encrypted code can be used to increase the security of the authentication process, if higher security is desired.

In step 314, the access device 315 can send a message to the user device 305. The message may include the encrypted similarity metric. In some embodiments, the message may also include the encrypted code. The message may be sent via any suitable wired or wireless protocol, e.g., via Bluetooth or WiFi.

In step 316, the user device 305 can receive the message from the access device 315. The message can be received via any suitable wired or wireless protocol. The message can include a flag indicating it is part of the initiated authentication process.

In step 318, the user device 305 can decrypt the encrypted similarity metric and can optionally decrypt the encrypted code (if received). The decrypted similarity metric may be masked. For example, the access device 315 may have added a random value to the similarity metric. In this way, the user device 305 may not learn the value of the decrypted similarity metric. The decrypted similarity metric may alternatively be masked by the one or more encrypted masks generated by the user device 305. This may prevent the access device 315 from learning the value of the decrypted similarity metric.

In step 320, the user device 305 may send a response message to the access device 315. The response message may indicate (1) whether the decrypted similarity metric exceeds a threshold. If the similarity metric exceeds the threshold the biometric measurement may be said to match the biometric template, wherein matching indicates that the biometric measurement and the biometric template likely came from the same user. In that case, the access device 315 may verify the user. If the similarity metric is less than the threshold, the access device may abort the process.

The response message may also indicate (2) whether the decrypted code matches a test code. The test code may be computed with the same authentication function used in step 310 to compute the encrypted code. The test code may be computed with the decrypted similarity metric and the one or more randomly selected values. If the test code and decrypted code match, it may indicate that the user device did not modify the similarity metric when decrypting it. The user device 305 does not have access to the randomly selected values, so it may not be able to send a fraudulent decrypted similarity metric that will still generate the correct test code. If the test code and decrypted code do not match, the access device may abort the process.

In various embodiments, the response message may include the decrypted similarity metric and/or the decrypted code, thereby having the response message indicate (1) and/or (2), even if the final determination is made by the second device. In other embodiments, the response message may provide a more direct indication, e.g., when a garbled circuit is implemented and used at the first device.

In step 322, the access device 315 may receive the response message from the user device 305. If the access device 315 receives the decrypted code in the response message, the access device 315 may compute the test code and compare the test code to the decrypted code. In other embodiments, a garbled circuit may be used to compute the test code and compare the test code to the decrypted code. The access device 315 may generate the garbled circuit, then send it to the user device 305 to be evaluated. Then the response message may include an output of the garbled circuit.

If the access device 315 receives the decrypted similarity metric in the response message, the access device 315 may compare the decrypted similarity metric to the threshold directly. In other embodiments, the decrypted similarity metric may be masked. The access device 315 may also receive a proof-of-knowledge indicating whether the similarity metric exceeds the threshold. In other embodiments, a garbled circuit may be used to determine whether the decrypted similarity metric exceeds the threshold. The access device 315 may generate the garbled circuit, then send it to the user device 305 to be evaluated. Then the response message may include an output of the garbled circuit.

In step 324, the access device 315 may allow the user to access the resource. Prior to allowing the user to access the resource, the access device 315 may perform additional authentication and/or authorization steps. For example, the access device may request that the user enter a personal identification number (PIN) or a password for further authentication. The access device 315 may communicate with additional computer devices, such as an authentication computer and/or an authorization computer, to perform the additional authentication and/or authorization steps. In some implementations, the access device 315 may be a resource provider computer or allow access to a resource that resides on the resource provider.

The resource may generally be, for example, a computer resource (e.g., stored data or a networked computer account), a physical resource (e.g., a tangible object or a physical location), or other electronic resource or communication between computers (e.g., a communication signal corresponding to an account for performing a transaction). Additional examples of a resource may include a good or service, a physical building, a computer account or file, or a payment account. For example, the access device 315 may allow the user to access a physical building by unlocking a door. In another example, the access device 315 may allow the user to access an electronic payment by providing access to a payment process.

Embodiments of the present disclosure may modify this method to provide increased data security, for example, by preventing the access device and or the user device from receiving the decrypted similarity metric.

Further examples of different protocols described in U.S. Patent Publication 2020/0228341, which is incorporated by reference in its entirety, may provide different levels of security and security guarantees. Each protocol may be done with any similarity measure appropriate to the biometric data being captured.

C. Use of Verifier for Enrollment

In some embodiments, a verifier device (e.g., a service provider) can perform an enrollment phase with the user device. In the enrollment, the verifier device can verify that the biometric template satisfies one or more properties, e.g., a norm. The norm can be defined in various ways, e.g., a sum of the values of the biometric vector $x_i$ multiplied by themselves can be required to equal a specified value (e.g., 1). Different norms can be used, e.g., L1 (absolute value) or L2 (square of value). The examples herein use the L2 norm.

The verification can be performed using encryption so that the verifier device does not obtain the biometric template. Once the one or more properties are verified, the verifier device can digitally sign the encrypted biometric template and provide to the user device, so that the user device can provide to an access device as proof that the biometric template is well formed.

In this manner, before a matching phase is done to provide access to a resource, which would be done for each access, the user device can enroll its biometric template with a central server. The central server would be a trusted authority, and so its signature would prove to the individual access devices that the biometric is well formed. The access device can verify the signature using the public key of the verifier device (e.g., a central server).

As for the matching phase, such a comparison of two biometric measurements from two devices can use a normalization of the biometric vectors so that the measured values are on a same scale. A verifier device can determine that the biometric template is normalized to the proper amount (e.g., a public value y). Such a verification process is difficult because it should not leak the actual biometric, and determine there is a proper bound on any particular biometric vector value. If any of the biometric vector values are greater than the bound (e.g., defined using N, a security parameter in a public key), then the verification process could be open to an active attack. For example, the user device 305 could send a false template that is very large, for example, with a norm much greater than 1. The false template may lead to a similarity metric that exceeds the threshold even if the template does not match the measurement allowing the user to fraudulently gain access to the resource. Such a false template could fool the verifier device if the square of a biometric value wraps around a maximum bit size, thereby causing the inner product to still appear to be the public value y), but this would only be true due to the finite number space constraint imposed by practical implementation (e.g., using 128 or 256 bit, or even 3,000 bit encryption).

Some embodiments of the present disclosure perform two checks using different modulus calculations (mod N and mod $\hat{N}$). If the square of a biometric vector value wraps around the allocated bit size (e.g., defined by N), both checks will not provide the same public value y.

Figure 4:
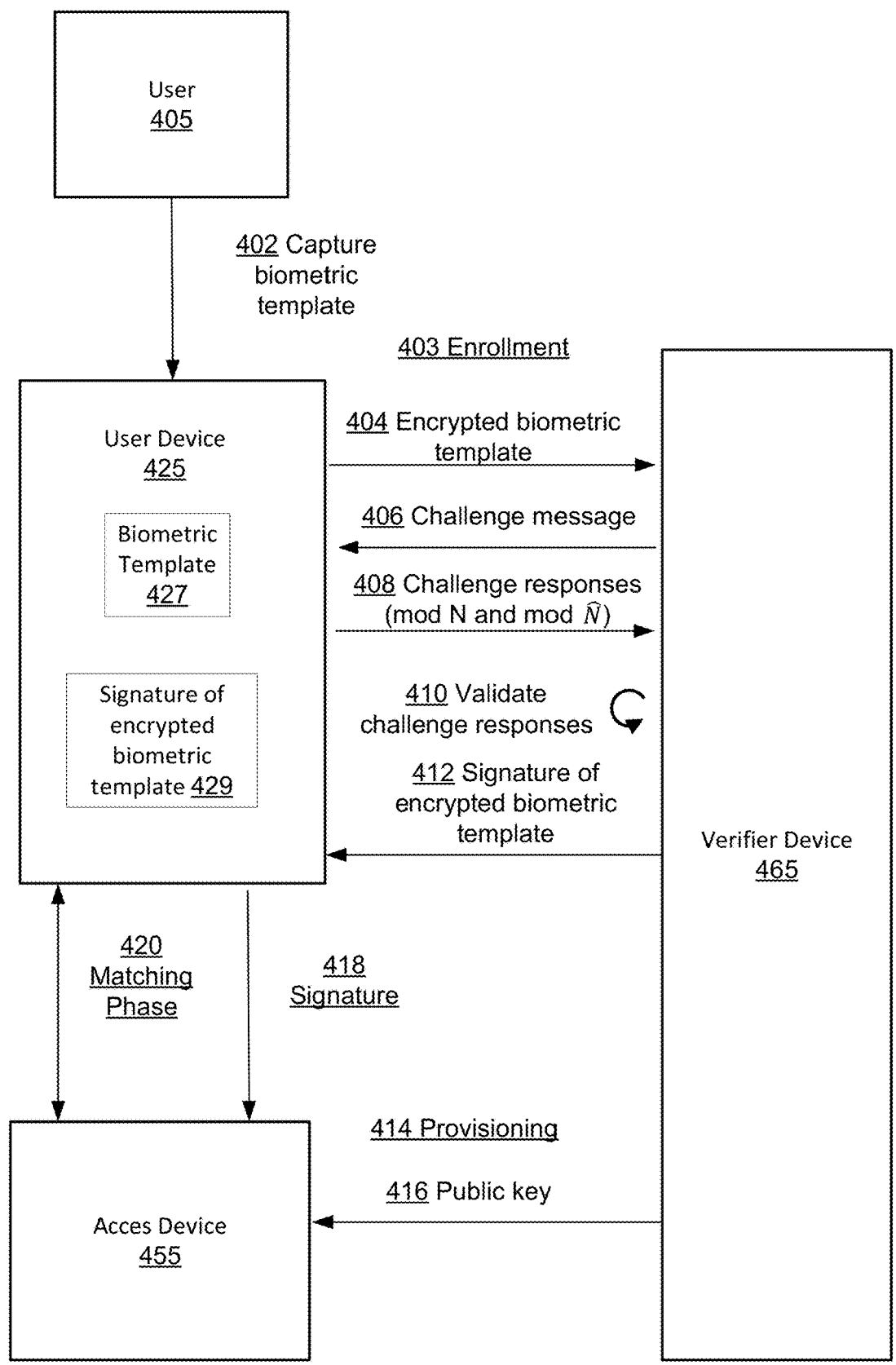
FIG. 4 shows processes for enrollment with a verifier device and matching using an access device according to embodiments of the present disclosure.

FIG. 4 shows processes for enrollment with a verifier device 465 and matching using an access device 455 according to embodiments of the present disclosure. The verifier device 465 and the access device 455 can be the same device. The verifier device 465 can verify the norm of the biometric template stored on user device 425, e.g., by performing two checks using different modulus calculations. In some implementations, the verifier device 465 might only perform a lesser accurate single check, but still provide a signature so that the matching phase is more efficient.

In step 402, user device 425 can capture a biometric template 427 from user 405, e.g., as described herein. The user can then initiate an enrollment phase 403 with a service provider, depicted as verifier device 465. Such a service provider could be associated with a particular store, merchant, venue, computer network provider, and the like. After capturing biometric template 427, user device 425 can encrypt it, e.g., using a public key of a public/private key pair. The cryptographic technique can be homomorphic such that operations on the encrypted values provides the same result once decrypted, as when the operations are performed on the plaintext values.

In step 404, user device 425 sends the encrypted biometric template (e.g., often denoted as a vector c in this disclosure) to verifier device 465. The user device 425 can also send the public key to verifier device 465, e.g., if the verifier device 465 is new and has not been in communication with user device 425 before. The public key can include a number N corresponding to a size parameter to be used for the cryptographic operations.

In step 406, verifier device 465 can generate a challenge message and send the challenge message to user device 425. In some implementations, verifier device 465 can mask the encrypted biometric vector c to obtain a masked encrypted biometric vector w. The masking can prevent the user device 425 from cheating on the challenge response to make it seem like the biometric template does satisfy the norm, when it does not. Verifier device 465 can also generate a first cancellation value determined using mod N calculations and a second cancellation value using mod N calculations (possibly also using mod N calculations). The cancellation values can help offset the cross terms caused by the masking, when the user device generates a norm of the masked encrypted biometric vector.

In step 408, user device 425 determines two challenge responses and sends to verifier device 465. Each challenge response can be determined for each cancellation value. Both challenge responses can be determined using the masked encrypted biometric vector w.

In step 410, verifier device 465 can validate the challenge responses, e.g., by determining that the responses indicate a same norm is achieved. For example, the verifier device can determine that the challenge responses equal the public value y along with any masking values or functions. For example, the masking values can include a multiplicative masking values times the public value y and/or an offset value (e.g., by addition or subtraction). Such masking values (e.g., $\alpha$ and $\beta$) can be chosen as random values, e.g., across a uniform distribution.

In step 412, when the verifier device 465 determines the encrypted biometric template c is well formed, verifier device 465 can sign c using a private key of the verifier device 465 to generate a signature 429. Verifier device 465 can send signature 429 to user device 425, which can store signature 429 for use during a matching phase.

In step 416, verifier device 465 can send a public key (corresponding to the public key used to sign c) to access device 455. This can be done during a provisioning phase. Such a provisioning can be done at specified times, e.g., periodically and/or just before an event. For example, all access devices at entrances to a venue can be provisioned one hours before a concert starts. Access device 455 can use the public key to verify the signature that is to be received from user device 425.

In step 418, user device 425 can send signature 429 to access device 455. User device 425 can send the signature at various times, e.g., when a beacon signal is detected. The beacon signal can include an identifier that user device 425 can use to determine whether to request access to a resource, e.g., if user device 425 stores a token (e.g., a ticket) corresponding to the identifier. The identifier can be a general one, e.g., a standard check out terminal, so that user device 425 always responds, or at least as long as a payment application has been installed. Signature 429 can be sent before or after a matching phase has started or is done.

At 420, a matching phase can confirm that a capture biometric (i.e., a measurement from a user that should be user 405) matches biometric template 427. As examples, the matching can be performed as described for FIGS. 2 and 3 and later sections. If the biometrics match, access device 455 can provide access to a requested resource. In other embodiments, the verification that biometric template is properly normalized can be done by access device 455 before, during, or after the matching phase.

Verifier device 465 can perform additional checks during enrollment phase 403. For example, verifier device 465 can check that biometric template 427 matches the encrypted biometric template c sent to verifier device 465. Another check can be that the public key from the user device is well-formed.

IV. Example Verification of Biometric Template

In this section, we describe two honest-verifier zero knowledge proofs, which may be used for the Paillier encryption scheme or other encryption schemes. Recall that a Paillier ciphertext $[\![ x ]\!]$ is given by $g^x r^N \mod N^2$, where the public parameters are N=pq and $g \in \mathbb{Z}_{N^2}$, and private randomness is $r \in \mathbb{Z}_N^*$. Sometimes, we use notation $[\![ x; r ]\!]$ to explicitly denote that randomness r is used to generate the ciphertext. For simplicity, when randomness is used, the notation $[\![ x ]\!]$ implicitly includes the use of the random values r. The public key of the of the user device can include N and g.

Embodiments can assume public key well-formedness. Hazay et al. [18, 19] construct an honest-verifier zero knowledge protocol to show that a public key epk of the Paillier scheme was correctly generated. We denote this protocol by $\Pi_{epk}$ and refer to section 3.3 in the full version of [19] for the construction and proof.

A. Verifying Normalization Against Active Attack

As described above, the user device may generate a proof-of-knowledge indicating that the plaintext biometric template is normalized (e.g., a vector with a total length y, such as 1). The proof can be sent over with the encrypted biometric template and the public key. A verifier device (also called a service provider) can confirm the plaintext biometric template is normalized via a cryptographic process. The verifier device can then provide a digital signature, e.g., of the encrypted biometric template. The verifier device can be a trusted authority (e.g., trusted by the access device). In this manner, the user device does not need to spend the extra computational effort at the time of authentication to generate the proof. The verification can protect against active attacks by an attacker who has stolen the user's device and created a false biometric template.

Also, discuss above are problems that can arise from the finite number space used to perform the encryption. That is, a maximum number of bits is used for each number. Due to such an inherent property of the systems, an inner product might have the desired norm y but only due to a vector value having it square wrap around N due to the finite storage space. Such a remainder (modulus N) might fool a verifier than the biometric indeed has a norm of y. But some embodiments can perform two checks to confirm that the norm is indeed equal to y over all numbers, even though a finite set of integers is used (i.e., a finite bit size for storing the values involved).

One of the checks uses mod $\hat{N}$ calculations to confirm the norm equals the specific value, depicted as y herein. Thus, the two checks can confirm that the norm is satisfied using two different modulus calculations. Since numbers would wrap around differently for the two different modulus calculations, an attacker could not fool the verifier device for both checks. The second modulus $\hat{N}$ can be chosen at random, so an attacker would not be able to duplicate any false wrap around behavior.

Figure 5:
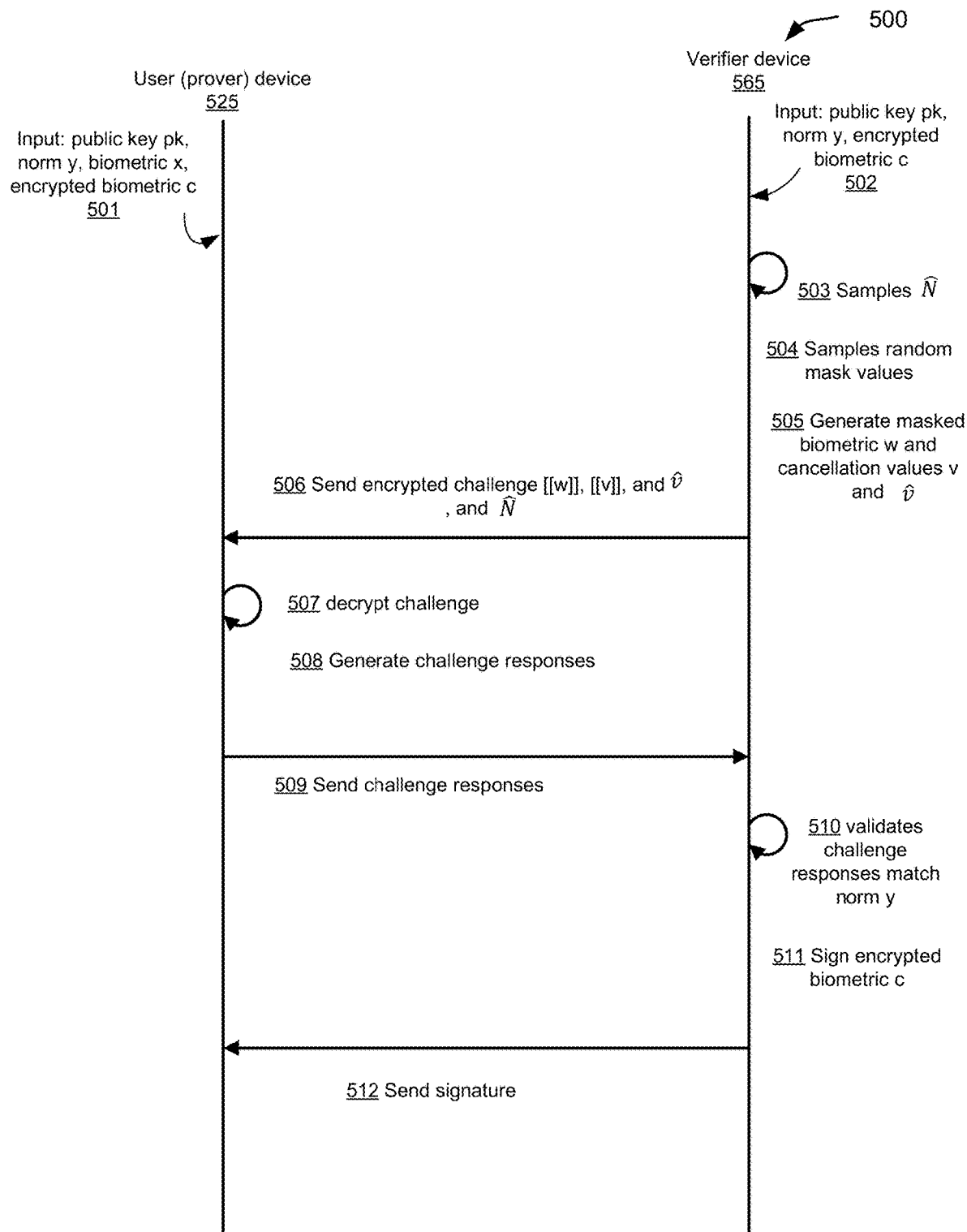
FIG. 5 shows a flow diagram of a method 500 for verifying an encrypted biometric template according to embodiments of the present disclosure.

FIG. 5 shows a flow diagram of a method 500 for verifying an encrypted biometric template according to embodiments of the present disclosure. In particular, verifier device 565 can verify a biometric template stored on user device 525 satisfies a normalization property. Method 500 can be performed in a similar manner as parts of the process in FIG. 4.

In step 501, user device 525 can generate, select, store, or otherwise obtain a set of parameters. The parameters can include: a public key pk of the user device, which can be defined as pk=(N,g); the public value y used as the norm; the biometric template vector x (also called a witness) that can include a random value r for each biometric value; and the encrypted biometric template c (also called a statement) that is depicted as [[x]] or [[x;r]]. Additional parameters can be a maximum value σ for an vector value $x_i$, such that completeness holds. The maximum value a can depend on N, the number of elements n in the biometric template vector, and a security parameter λ, e.g., 40. N can be considered a first modulus N that is a component of a public key of the user device.

In step 502, verifier device 565 obtains the public key pk, the norm y, and the encrypted biometric template c. All or some of these parameters can be obtained from user device 525. Steps 503-505 can be performed by verifier device 565 to generate a challenge.

In step 503, verifier device 565 selects a random number $\hat{N}$. This value can be selected from a uniform distribution and can be a prime number. $\hat{N}$ can be selected to be less than a maximum, which can be set based on N (used for the public key pk), the size n of the biometric, the maximum value σ, and the security parameter λ. $\hat{N}$ can be considered a second modulus.

In step 504, verifier device 565 determines mask values. The mask values can include mask vector values ρ for the biometric vector x. These mask values can mask the encrypted biometric vector x, so that the user device 525 cannot cheat to provide a false challenge response. Other mask values can include β and $\hat{\beta}$ for the two cancellation values (v, $\hat{v}$) that use mod N and mod $\hat{N}$ calculations respectively. Verifier device 565 can also select a random message authentication code (MAC) as another mask value to prevent a malicious user device (prover) from cheating.

In step 505, verifier device 565 generates a masked encrypted biometric vector [[w]] using one or more mask values. Each value of the encrypted biometric vector w can be generated by applying a respective masking function to a corresponding value of the encrypted biometric vector c. The respective masking functions can have a same functional form but different values, e.g., different values of a vector. The masking function can be linear (example shown in FIG. 6) or non-linear. In some implementations, mask vector p can be used to generate w, e.g., by additive masking of each value of the encrypted biometric vector c. Verifier device 565 can also generate a first cancellation value v and a second cancellation value $\hat{v}$. The cancellation values can be encrypted using the public key of user device 525. Each cancellation value can be masked using a corresponding mask value, e.g., β and $\hat{\beta}$. The cancellation values can include cross terms that would result when taking the norm of the masked biometric vector w.

The second cancellation value $\hat{v}$ can have the second modulus $\hat{N}$ applied to the mask values, so that the two checks test for different wrap around functionality. Note that all the calculations are subject to mod N as that is the maximum bit size allocated for the cryptographic operations.

The mask values can be encrypted before masking the encrypted biometric vector c so that the result is an encrypted version [[w]]. Similarly, the mask values β and $\hat{\beta}$ can be encrypted before being used in the determination of the cancellation values.

In step 506, verifier device 565 sends a challenge to user device 525. The challenge can comprise the masked encrypted biometric vector [[w]] and $\hat{N}$, as well as the encrypted first cancellation value [[v]] and the encrypted second cancellation value [[$\hat{v}$]], if determined.

In step 507, user device 525 decrypts the challenge to obtain the masked biometric vector w. The decrypted values for the cancellation values can also be obtained. User device 525 can use the user secret key (also referred to as a user private key) corresponding to the public key pk used to encrypt the biometric vector x to obtain c.

In step 508, user device 525 generates challenge responses. A first challenge response z can be generated using the first cancellation value v and the masked biometric vector w. The first challenge response z can be generated using the first cancellation value v and a first function (e.g., corresponding to the type of norm used, such as L2 norm) of the encrypted biometric vector w, where the first function includes the first modulus N. The first function can result in one or more first cross terms, where a portion of the first cancellation value v cancels out the one or more first cross terms.

A second challenge response $\hat{z}$ can be generated using the second cancellation value $\hat{v}$ and the masked biometric vector w, as well as the second modulus $\hat{N}$. The second challenge response $\hat{z}$ can be generated using the second cancellation value $\hat{v}$ and a second function, of the encrypted biometric vector w, where the second function includes the second modulus $\hat{N}$. The second function can also corresponding to the norm and be the same as the first function except that the second modulus $\hat{N}$ is used.

In step 509, user device 525 sends the challenge responses z and $\hat{z}$ to verifier device 565.

In step 510, verifier device 565 validates the challenge responses z and $\hat{z}$. Depending on how the masking is performed the challenge responses should equal a masked y mod N or mod $\hat{N}$ respectively. For example, the following relations can be checked: $z = y\alpha^2 + \beta$ and $\hat{z} = y\alpha^2 + \hat{\beta}$.

In step 511, verifier device 565 signs the encrypted biometric vector c, if the challenge responses are validated. A verifier private key of the verifier device 565 can be used to generate the signature. A corresponding verifier public key can be sent to an access device (e.g., as in FIG. 4) so that the access device can verify the signature, thereby verifying that the encrypted biometric c is well formed.

In step 511, verifier device 565 sends the signature to user device 525, which can store the signature for providing to an access device, as described herein.

FIG. 6 shows a zero-knowledge (ZK) protocol $\Pi_{zk\text{-}L2}$ for verifying that an encrypted biometric template satisfies the L2-norm according to embodiments of the present disclosure.

FIG. 6 provides further details for an example embodiment of techniques described in FIGS. 4 and 5. FIG. 6 presents an honest-verifier zero knowledge protocol which, given n Paillier ciphertexts $[\![x_1]\!], \ldots [\![x_n]\!]$, proves that the L2 norm of vector $\vec{x} := (x_1, \ldots x_n)$ is equal to some public value y over the integers.

The example parameters are shown to include the user public key pk, the norm y, the biometric vector x, and the encrypted biometric vector c, which is encrypted using the public key pk. As shown, $c_1$ equals the cypher text of $x_1$ and random value $r_1$. If an entity knew the witness, then the entity would instantly know whether the norm is satisfied. The statement is what is used to convince the verifier that the biometric does have the proper norm.

In step 610, the verifier determines $\hat{N}$ by sampling uniformly up to N. A constraint of $\hat{N}$ being a prime number can be enforced by continuing to select numbers until a number is prime. An example value for N is 3000 bits.

In step 620, the verifier samples a random number $\alpha$, which can act as a MAC key. The value $\alpha$ can be used as a random authenticating value, which can allow checking whether the other party is providing a false value, i.e. not according to the prescribed operations. The $\rho$ values, $\beta$, and $\hat{\beta}$ are mask values. The values can hide $\alpha$.

In step 630, the verifier generates the challenge and sends the challenge to the prover P (user device). As shown, a masked encrypted biometric vector $[\![w]\!]$ is determined, as well as an encrypted first cancellation value $[\![v]\!]$ and an encrypted second cancellation value $[\![\hat{v}]\!]$. The value $\alpha$ multiplies the $[\![x]\!]$ values, e.g., as part of an authentication of $[\![x]\!]$. Then $[\![x]\!]$ is masked with a $\rho$ value, as shown an encryption of $\rho$, to provide $[\![w]\!]$. The particular $\rho_i$ value can act as an offset random value of the random vector $\rho$.

The cancellation values are used to cancel our cross terms when the L2 norm is determined by the prover. For simplicity, the random r values are not shown with the $[\![x]\!]$ values. Thus, $[\![x]\!]$ refers to the elements of the encrypted biometric vector (statement) c. First terms of the encrypted first cancellation value $[\![v]\!]$ include the random authenticating value $\alpha$ times a value $\rho_i$ of the random vector $\rho$. Other first terms include $\rho_i^2$ and a random value $\beta$, which can act as a mask value.

In the determination of the encrypted second cancellation value $[\![\hat{v}]\!]$, $\hat{N}$ is used in the determination of the first coefficient C, specifically for the multiplication coefficients of $[\![x]\!]$, and in the determination of the second value d; both are examples of second terms used to determine the encrypted second cancellation value $[\![\hat{v}]\!]$. These mod $\hat{N}$ operations are used to check whether a wrap around has occurred for any value of x, as then at least one of the challenge responses will not match the norm y. For example, performing the mod N operation would cause the cross terms to not cancel out in step 650. Accordingly, at least one of the second terms for determining the encrypted second cancellation value $|\hat{v}|$ are subjected to mod $\hat{N}$ before aggregating.

In step 640, the prover P decrypts the encrypted values $[\![w]\!], [\![v]\!]$, and $[\![\hat{v}]\!]$ using a secret key corresponding to the public key pk. After decryption, prover P has w, v, and $\hat{v}$.

In step 650, the prover generates the two challenge responses using w, v, $\hat{v}$, and $\hat{N}$. The first challenge response can be considered a masked version (e.g., a one-time pad encryption) of the L2 norm. The first term of the first cancellation value v cancels out the cross terms resulting from the squares of the w values, thereby leaving $y\alpha^2$ plus the second term (i.e., mask value $\beta$) of the first cancellation value v. A similar cancellation occurs for the second cancellation value $\hat{v}$.

The values of $\alpha$, $\beta$, and $\hat{\beta}$ hide (mask) the value of y, so that the even though the prover knows the biometric template x, the prover does not know y.

In step 660, the verifier validates the two challenge responses if they match the norm y (including any mask values), or otherwise can reject the enrollment. As shown, the first challenge response z equals $\alpha^2$ (e.g., when using the L2-norm) times the L2 norm of the biometric vector x plus the mask value $\beta$. The second challenge response $\hat{z}$ equals $\alpha^2$ (e.g., when using the L2-norm) times the L2 norm of the biometric vector x plus the mask value $\hat{\beta}$ mod $\hat{N}$. The cancellation values will cancel out the cross terms only if the biometric vector values x are within the correct range, due to the modulus operations.

Accordingly, embodiments can use two key techniques to check that the biometric vector x has the proper norm y. The first is a ZK proof that the L2 norm equals y modulo N (note that this not over integers, otherwise we would be done). This combines the use of a semi-honest multiplication protocol and an algebraic MAC to prevent a malicious prover from cheating in the following way (all operations in this protocol happens in $\mathbb{Z}_N$): First, the verifier masks and MACs each ciphertext $[\![x_i]\!]$ as $[\![w_i]\!] \leftarrow [\![x_i]\!] \alpha + \text{Plr.Enc}(pk, \rho_i)$ where $\alpha$, $\rho_i$ (uniformly random in $\mathbb{Z}_N$) are the MAC key and mask respectively. This is then revealed to the prover who can compute $w_i^2 = (x_i^2 \alpha^2 + 2\alpha \rho_i x_i + \rho_i^2)$. Observe that this contains the desired value $x_i^2$. We can isolate this value by requiring the verifier to also send $[\![v_i]\!] \leftarrow \Sigma_i(-2\alpha \rho_i [\![x_i]\!] - \rho_i^2) + \text{Plr.Enc}(pk, \beta)$ for a mask $\beta$ (uniformly random in $\mathbb{Z}_N$). The prover can then obtain a MACed version of the L2 norm as follows:

$$z = \sum_i (x_i^2\alpha^2 + 2\alpha\rho_i x_i + \rho_i^2) + \sum_i (-2\alpha\rho_i x_i - \rho_i^2 + \beta)$$
$$= \sum_i x_i^2\alpha^2 + \beta$$

Finally, the prover can simply send z to the verifier who checks that $\Sigma_i x_i^2 = y$ by checking that $z = y\alpha^2 + \beta$.

The technique above proved that the L2-norm is equal to y over $\mathbb{Z}_N$. However, we desire this equality to hold over the integers. We achieve this by adding a second instance of this protocol except that we will now logically perform the check modulo N' where y<<N'<<N and chosen by V after the $x_i$ are fixed.

If these two checks pass, it implies that $$\sum_i x_i^2 = y \bmod N \quad \exists\, t \in \mathbb{Z}^*, \sum_i x_i^2 = y + Nt$$

$$\sum_i x_i^2 = y \bmod N' \quad \exists\, s \in \mathbb{Z}^*, \sum_i x_i^2 = y + N's$$

Rewriting the implication we obtain Nt=N's. This means the prover must choose t to be a multiple of N'. However, since N' is prime and chosen after all the $x_i$ are fixed, the prover can only do this with negligible probability.

Our protocol is formally proved in section X.E, which proves the following lemma: Let $c_1 = [\![x_1]\!]$, $c_n = [\![x_n]\!]$ be Paillier ciphertexts under a public key pk and y be a positive integer. Assuming the security of Paillier encryption, $\Pi_{zk-L2}$ in FIG. 6 is a honest-verifier zero knowledge protocol to show that $y = \Sigma_{i \in [n]} x_i^2$ (over the integers).

Consider a more generic proof strategy where we instead prove each $x_i$ is small therefore $\Sigma_i x_i^2$ can not be more than N. Even when using the optimized approximate range check of Lindell [23], this strategy would require sending $O(n\lambda)$ Paillier ciphertexts. In contrast, our optimized approach only involves $O(n)$ ciphertexts. In practice this results in a speed up of at least 40 times.

B. Knowledge of Plaintexts

In some embodiments, the verifier device can efficiently verify that the ciphertexts are well formed, e.g., by verifying that the user device has knowledge of the plaintext of the biometric template. Such a check can protect against attackers that take someone else's ciphertext and tries to use it. Having to prove knowledge of the plaintext prevents an attacker you from doing this because they do not know the plaintext biometric. Some implementations can do this check efficiently for a vector by aggregating over all elements in the vector, and thus incurring only similar overhead as checking for a single element.

In particular, some embodiments present a honest-verifier zero knowledge protocol to prove knowledge of the plaintexts and randomness underlying n Paillier ciphertexts $[\![x_1]\!] \ldots, [\![x_n]\!]$. Cramer et al. [14] designed a $\Sigma$-protocol for proving knowledge of both the message and randomness for a single ciphertext $[\![x;r]\!]$. Here we provide a new batched version of their protocol that allows us to simultaneously prove the knowledge of n message-randomness pairs $(x_1, r_1), \ldots, (x_n, r_n)$ given n ciphertexts $[\![x_1;r_1]\!], \ldots, x_n;r_n$ while only requiring the same amount of communication from the prover. We achieve this generalization by leveraging the linear structure of their protocol.

Figure 7:
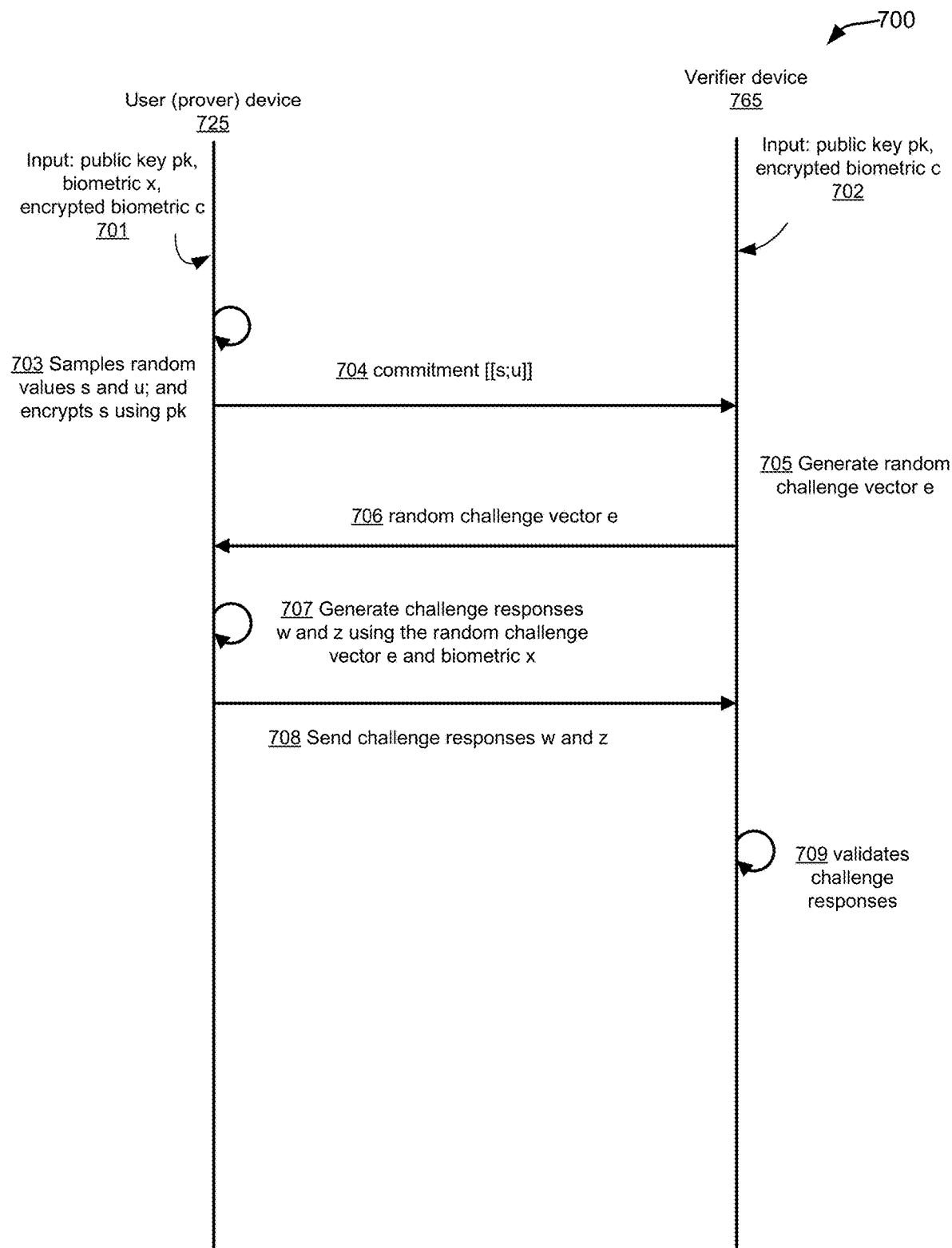
FIG. 7 shows a flow diagram of a method 700 for verifying that an encrypted biometric template corresponds to a plaintext biometric template according to embodiments of the present disclosure.

FIG. 7 shows a flow diagram of a method 700 for verifying that an encrypted biometric template corresponds to a plaintext biometric template according to embodiments of the present disclosure. The user device 725 and the verifier device 765 can be the same as described herein. Method 700 can be done before or after checking the norm (e.g., method 500).

In step 701, user device 725 can generate, select, store, or otherwise obtain a set of parameters. The parameters can include: a public key pk of the user device, which can be defined as pk=(N,g); the biometric template vector x (also called a witness) that can include a random value r for each biometric value; and the encrypted biometric template c (also called a statement) that is depicted as $[\![x]\!]$ or $[\![x;r]\!]$.

In step 702, verifier device 565 obtains the public key pk and the encrypted biometric template c. All or some of these parameters can be obtained from user device 525.

In step 703, the user device (prover) 725 samples a random value s and a random coin u (to be used in encryption). The prover then encrypts s using the public key pk and the random coin u. The encrypted value is denoted as $[\![s;u]\!]$, which can be considered an encrypted commitment value, where the commitment includes two separate random values s and u.

In step 704, the user device 725 sends $[\![s;u]\!]$. In step 705, the verifier device 765 generates a random challenge vector e, with the same length as the encrypted biometric c. In step 706, the verifier device 765 sends the random challenge vector e to the user device.

In step 707, the user device 725 generate challenge responses w and z using the random challenge vector e and biometric x. In some implementations, given a random challenge e, the prover has to respond back with w=(s+ex) mod N and $z=ug^t r^e$ where t satisfies some linear equation with respect to (s, w, e, x). As e and x are vectors, the inner product ex is a sum over terms in the vectors. And $r^e$ is a product of each of the terms for r and e. In step 708, the user device 725 sends the challenge responses w and z to the verifier device 765.

In step 709, the verifier validates the challenge response (also referred to as just responses). The verifier can check that the ciphertext $[\![w;z]\!]$ obtained by encrypting message w with randomness z (using the public key pk) is equal to the product of $[\![s;u]\!]$ and $[\![x;r]\!]^e$, with the second term also being denoted as $c^e$. The ciphertext $[\![w;z]\!]$ can be referred to as an intermediate result or an encrypted response. The linearity (over the exponent) in these operations allows aggregation of n proofs by just having the verifier send n random challenges and the prover responding with just a single (w, z) that internally adds up the respective $e_i, x_i$ terms.

We also prove the following lemma for the protocol there: Let $c_1, \ldots, c_n$ be Paillier ciphertexts under a public key pk. Assuming the security of Paillier encryption, the protocol $\Pi_{ptxt-knwldg}$ in FIG. 8 is an honest-verifier zero knowledge proof-of-knowledge of $\{(x_i, r_i)\}_{i \in [n]}$ s.t. $c_i$=Plr.Enc(pk, $x_i; r_i$) for all i.

FIG. 8 shows a zero-knowledge (ZK) protocol $\Pi$ptxt-knwldg for batch proving knowledge of plaintexts according to embodiments of the present disclosure. As for FIG. 6, the values $c_1$ through $c_n$ are the encrypted biometric. Each of the ciphertexts is an encryption of one of the x values with a randomness term r. If one knows r, then the ciphertext can be generated. Both parties have the ciphertext, and the prover wants to prove that they know the plaintext x is and they know what randomness was used to encrypt it.

In step 810, the prover P samples a random value s. The random coin u is implicitly samples as part of the encryption procedure. The brackets are used to denote the ciphertexts. Thus, the plaintext s is encrypted using the randomness u.

In step 820, the verifier samples a random challenge vector e and sends it to the prover. The only way you can send back the correct response to the random challenge vector e is if the prover knew the plain text.

In step 830, the prover generates challenge responses w and z. The challenge responses are aggregated over x and r respectively, and so only two values are needed for the entire biometric vector x. As shown, the first challenge response w equals s plus the summation of e's and x's. For z, the aggregation is over the product of the $r^e$ terms. The generator g has an exponent t that is defined as shown.

This aggregation allows for an efficient protocol that allows for checking the entire vector with minimal extra work, or no additional rounds. And the aggregation still preserves the security key guarantees.

The random value s is used to hide the values of the x from the verifier. And the random coin u is used to hide the values of the r values. Thus, s and u will mask the secret values.

In step 840, the verifier checks that the challenge responses w and z are consistent with the encrypted s (i.e., [[s;u]]), with the encrypted biometric vector c, and the random challenge vector e. The check encrypts the first challenge response w (considered value to be encrypted) with the randomness z, which is the second challenge response. If the challenge responses match, then the verifier can proceed with the enrollment, e.g., proceeding to check the norm (as in FIGS. 5 and 6) or proceed with the signature of the encrypted biometric, e.g., if the norm has already been verified.

V. Packing

Packing is an optimization that allows a device to condense the ciphertext, which can allow fewer communications and improve performance. The packing can allow input of multiple $x_i$ values into one ciphertext. The description bellows provides various examples for packing.

Recall that Paillier is an additively homomorphic encryption scheme with a plaintext space $\mathbb{Z}_{pq}$ where p, q are large primes. A typical size of p, q is 1024 bits each, which means that a single Paillier ciphertext can contain 2048 bits of plaintext data. The security level would then be similar to RSA with a 2048 bit key. However, in several applications, the size of a plaintext value is very small. For instance, it can be only 8 or 16 bits. We cannot make the ciphertext smaller due to security constraints, so encrypting each plaintext value separately results in a huge communication overhead.

In this section, we introduce a packing technique for Paillier encryption that allows one to batch encryptions of several plaintexts (of relatively small size) into one single ciphertext, thereby reducing the communication overhead of the basic encryption scheme. Encoding, decoding, addition and multiplication algorithms can effectively achieve this task. Each of these algorithms can be applied to plaintext data. Further details on packing can be found in U.S. patent application Ser. No. 16/664,530, which is incorporated by reference in its entirety.

For notation, let m denote the size in bits of each plaintext value to be encrypted. Let n be the number of plaintext values to be encoded together into one ciphertext. Let L denote the size in bits of each ciphertext (which is 2048 in the case of Paillier). Let d denote the length in bits of the padding applied to each plaintext value. We elaborate more on d later in the section. We also consider two levels for the encodings. At level-1, we have plaintext encodings where no multiplication operation has been performed. We can multiply two level-1 encodings to produce a level-2 encoding. We also refer to a level-2 encoding as a hyper—encoding. Two level-2 encodings cannot be multiplied together but can be added. This emulates the linear homomorphism of Paillier encryption.

A. Algorithms, Properties & Use

We now describe the algorithms for packing and their properties. An (m, n, L, d) packing scheme can comprise the following algorithms. (A is an implicit input).

Some embodiments can provide two ways to encode/decode denoted by ($Encode_1$, $Decode_1$) and ($Encode_2$, $Decode_2$). Encode algorithms, $Encode_1$ and $Encode_2$, take m-bit strings $u_1, \ldots, u_n$ as input. $Encode_1$ outputs a level-1 encoding u*, while $Encode_2$ outputs a level-2 encoding ũ (hyper—encoded value). The encodings are L-bit strings. Decode algorithms, $Decode_1$ and $Decode_2$, take an L-bit string as input and output n number of m-bit strings.

Some embodiments can provide are two addition algorithms, one for each type of encoding. $Add_1$ adds two level-1 encoded values u*, v* to produce another (level-1) value w*. $Add_2$ is similar but operates on level-2 encodings.

Some embodiments can have one multiplication algorithm Mult. It takes two level-1 encodings u*, v* and outputs a level-2 encoding w̃.

Some embodiments can have one randomized algorithm Mask, which can transform one level-2 encoding into another.

Informally, correctness requires that decoding an encoded value at either level must produce the same output as performing the corresponding (component-wise) addition and multiplication operations on the underlying vector of plaintext values. For the mask procedure, we require the following: for any ũ, Mask(ũ), $Decode_2$(ũ)=$Decode_2$(Mask(ũ)).

For security, informally, we require that the distribution produced by the output of the masking algorithm is statistically indistinguishable from one produced by a simulator that is given only the decoding of this output. Formally, for all λ, there exist a PPT algorithm Sim such that for all hyper—encoding w̃, the following two ensembles are statistically indistinguishable:

{Mask(w̃)} and {$Sim$($Decode_2$(Mask(w̃)))}.

Using packing in Paillier, some embodiments can use the packing scheme to "pack" a number of plaintexts together into one ciphertext. In particular, embodiments can pack n plaintexts $\vec{u}=u_1, \ldots, u_n$ together. We will use $Encode_1$ to generate a level-1 encoding u* first. Then we encrypt u* to produce a Paillier ciphertext ⟦u*⟧. If addition is the only operation performed on the ciphertext, the underlying encoding remains at level-1. Say, after one addition of two ciphertexts ⟦u*⟧ and ⟦v*⟧, we obtain ⟦w*⟧. From correctness, we have that $Decode_1$(w*)=: $\overleftarrow{w}$ where $w_i=u_i+v_i$ for all i∈[n].

For multiplication with a known value, the product will produce a level-2 encoding. In particular, to multiply ⟦u*⟧ by plaintext one needs to first encode $\vec{v}$ into v* (i.e. v*:=$Encode_1$($\vec{v}$)) and then use Paillier scalar multiplication to produce ⟦w̃⟧ such that $Decode_2$(w̃)=$u_1 v_1 + \ldots u_n v_n$. Furthermore, we need to use the masking algorithm after each multiplication for security reasons to produce ⟦z̃⟧ where z̃←Mask(w̃), and so $Decode_2$(z̃)=$Decode_2$(w̃). As guaranteed by the security property, a masked value does not have any additional information beyond its decoding, so it is now "safe" to decrypt ⟦2⟧ before decoding.

Regarding linear procedures, we note that certain operations are performed on the ciphertexts homomorphically. Since Paillier encryption supports only additive homomorphism we need to guarantee that those procedures are linear, in that only addition of ciphertexts and multiplying a ciphertext with a plaintext are required to homomorphically perform the operations. Looking ahead, our construction ensures that all procedures $Add_1$, $Add_2$, Mult, Mask are linear and can be supported over Paillier ciphertexts. The masking algorithm can sample random coins. However, this does not need the ciphertext. Embodiments may only need to add the random coins to the encoding that is encrypted, which can be done using additive homomorphism.

B. Example Construction

FIG. 9 shows an example construction for a packing scheme according to embodiments of the present disclosure. Below is a detailed overview.

1. Level-1 encoding

Consider n plaintexts $u_1, \ldots, u_n \in \mathbb{Z}_{2^m}$ that we wish to encode together and later encrypt into one ciphertext. The naive way to encode would be to create a plaintext $u^* = \sum_{i=1}^{n} 2^{(i-1)(m+d)} u_i \in \mathbb{Z}_{2^{n(m+d)}}$ where there are d empty padding bits between every consecutive pair of values that are encoded. Let k denote the size of each block in the encoding, i.e., k=(m+d).

2. Level-1 Addition

For level-1 addition, given two such encoded values $u^*$, $v^*$, adding them directly gives the encoded version of their sum. That is, $$u^* + v^* = \sum_{i=1}^{n} 2^{(i-1)(m+d)}(u_i + v_i) \in \mathbb{Z}_{2^{n(m+d)}}$$

as long as d is large enough to prevent overflows. The d padding bits are present to ensure that if $(u_i+v_i) \geq 2^m$, this overflow will still be stored in the same block (within the padding bits) and not spill into the block used for storing $(u_{i+1}+v_{i+1})$. In the case of just one addition, d=1 will suffice. Similarly, multiplying $u^*$ by a single value $x \in \mathbb{Z}_{2^m}$ also works directly. That is, $$xu^* = \sum_{i=1}^{n} 2^{(i-1)(m+d)}(xu_i).$$

Some embodiments can ensure that d is large enough so that $x \cdot u_i \leq (2^k - 1)$. In this case, d=m suffices. More generally, d must be large enough to prevent overflows when performing a combination of these operations. We will elaborate on the choice of d later.

3. Multiplication

Multiplying two level-1 encodings component wise does not work directly as in the above operations. Consider a scenario where you generate an encoding $u^*$ of $\vec{u}$ and then wish to multiply its components with the corresponding components of an encoding $v^*$ of $\vec{v}$. Looking ahead, this scenario arises when one party encrypts $u^*$ and sends it to another party who wishes to perform multiplications homomorphically between the vectors $\vec{u}$ and $\vec{v}$. For example, if we have n=2 then $$v^* u^* = 2^{0 \cdot k} c_1 u_1 + 2^{1 \cdot k}(v_1 u_2 + v_2 u_1) + 2^{2 \cdot k} v_2 u_2.$$

So, we do not get $2^{0 \cdot k} v_1 u_1 + 2^{1 \cdot k} v_2 u_2$ as desired. However, observe that the values of interest $(v_1 u_1, v_2 u_2)$ are stored in the result, just with $v_2 u_2$ at a different block position than in the input encoding. It is easy to verify that for any n, $$v^* u^* = v_1 u_1 + 2^k(\ldots) + 2^{2 \cdot k}(\ldots) + \ldots + 2^{(2n-2) \cdot k} v_n u_n.$$

$v_1 u_1$ and $v_n u_n$ can still be recovered from the first and last blocks. However, the other (…) blocks will not be pure, i.e., they will be mixed with products of the form $u_i v_j$ for $i \neq j$.

We now show a new encoding strategy which allows us to recover all of the products $v_i u_j$ from various positions of $v^* u^*$. For n=3, we now encode $u_1, u_2, u_3$ as $$u^* = u_1 + 2^k u_2 + 2^{3 \cdot k} u_3$$

Note that the block at position 2 (the term $2^{2 \cdot k}$) is set to zero. If we then multiply two encodings $v^*$ and $u^*$, we obtain:

$$v_1 u_1 + 2^k(v_1 u_2 + v_2 u_1) + 2^{2 \cdot k} v_2 u_2 + 2^{3 \cdot k}(v_1 u_3 + v_3 u_1) + 2^{4 \cdot k}(v_2 u_3 + v_3 u_2) + 2^{5 \cdot k}(0) + 2^{6 \cdot k} v_3 u_3.$$

Observe that the desired products can now be recovered from block positions 0, 2 and 6. Generalizing this to any arbitrary n, the crucial idea is to inductively place each $u_i$, $v_i$ at a block position such that the product term $u_i v_i$ gets placed in a block that does not have any other products. This is achieved by encoding $u_i$ at block position $(2^{i-1} - 1)$. To be more clear, we now encode $u_1, u_2, \ldots, u_n$ as $u^* = u_1 + 2^k u_2 + \ldots + 2^{k \cdot (2^{n-1}-1)} u_n$. That is, $$Encode_1(u_1, \ldots, u_n) = u^* = \sum_{i=1}^{n} 2^{k \cdot (2^{i-1}-1)} u_i \in \mathbb{Z}_{2^{k 2^n}}$$

If we multiply two such encodings, the blocks at positions $0, 2, 6, \ldots, (2^n - 2)$ will have the desired component-wise product terms.

Here, k denotes the size of each block, i.e. k=(m+d). We must pick a large enough d to ensure that none of the blocks overflow. Each block contains a sum of at most n terms each of which is a product of two m bit values. Therefore, d=m+log n+1 to perform one such component-wise multiplication.

4. Masking

In the above multiplication computation, the resultant level-2 encoding $\tilde{w} = Mult(u^*, v^*)$ also has cross-product terms such as $u_1 v_2$, $v_2 u_1$, etc. (or a sum of such terms) in the clear which would be revealed during decoding, thereby leaking more information than just component-wise multiplication. We overcome this issue by the use of algorithm Mask which takes a hyper—encoding $\tilde{w}$ as input and adds a uniformly random value of size $(m+d+\lambda)$ bits to each of the blocks that may have cross-product terms. Before we describe the exact details of how this is done, the first thing to note is that to account for this, when computing a level-1 encoding (which is later multiplied to produce this hyper—encoding $\tilde{w}$), we now increase the size of each block by $\lambda$ bits. That is, we now set k to be $m+d+\lambda$.

Let l denote the set of block positions in $\tilde{w}$ which have the values we care about. From the previous multiplication scenario, these would correspond to the actual component wise products in $\tilde{w}$. For example, $I = \{0, 2, 6, \ldots, (2^n-2)\}$. (We note that more compact packings are possible but it is difficult to succinctly describe them.) The algorithm Mask adds a random value of length $k=m+d+\lambda$ to each block not in I. Concretely, given a hyper—encoding $\tilde{w}$, Mask($\bullet$) does the following: Compute $$\tilde{z} = \tilde{w} + \sum_{j \in I} 2^{j \cdot k} \rho_j$$

where $\rho_j$ is a uniformly random value in $\mathbb{Z}_{2^k}$.

To ensure that adding a $\rho_i$ term in a block does not corrupt the value in other blocks, we require that the addition does not overflow the $(m+d+\lambda)$ bits of the given block. Recall we guarantee that $(m+d)$ is large enough to hold the sum of the terms. Therefore, the probability of an overflow is at most the probability that the most significant $\lambda$ bits of $\rho_i$ are all ones, which is negligible.

Observe that in a sequence of operations that involve, for example, a multiplication of two level-1 encodings followed by additions with other hyper—encodings, it is sufficient to perform the masking only once over the final hyper—encoding before decoding it.

5. Level-2 Encoding & Addition

From the above overview, the level-2 encoding and addition follow naturally:

$$\tilde{u} = Encode_2(u_1, \ldots, u_n) = \sum_{i=1}^{n} 2^{k \cdot 2 \cdot (2^{i-1}-1)} u_i \in \mathbb{Z}_{2^{k2^n}},$$

$$Add_2(\tilde{u}, \tilde{v}) = (\tilde{u} + \tilde{v}) = \sum_{i=1}^{n} 2^{k \cdot 2 \cdot (2^{i-1}-1)} (\tilde{u}_i + \tilde{v}_i) \in \mathbb{Z}_{2^{k2^n}}.$$

6. Choice of Parameters

Give m and L (the size of each value and that of overall encoding, respectively), we need to set the values of n and d (number of elements that can be packed together and the length of padding, respectively) by ensuring that $(k \cdot 2^n) \leq L$ where $k=(m+d+\lambda)$. The choice of d depends on the operations performed.

In the rest of this disclosure, for ease of exposition, we invoke algorithms $Add_1$, $Add_2$, Mult on encodings, using regular "+", "·" symbols. We refer to level-1 encodings with an asterisk in the superscript (as in u*) and a hyper—encoding with a tilde (as in $\tilde{u}$).

VI. Example Protocol 1—all Parties Semi-Honest

In this section, we build a secure biometric authentication protocol with a three round matching phase based on the additively homomorphic encryption scheme by Paillier [26], which is based on the decisional composite residuosity assumption. Our construction is secure against a semi-honest adversary that either corrupts a device or jointly corrupts the service provider and the terminal. At the end of the matching phase, the inner product between the device and terminal vectors is leaked to the device. Protocol I does not use norm check in the enrollment phase as the parties are assumed to be honest. Protocol I does perform a check that the public key is well formed, Formally, in section X.B we prove the following theorem:
Theorem 1 Assuming the security of Paillier encryption, $\Pi_1$ in FIG. 10 is a three round biometric authentication protocol that is secure against any semi-honest adversary with $L_{dev}(\vec{u},\vec{w})=\langle \vec{u},\vec{w} \rangle$ and $L_{term}(\vec{u},\vec{w})=\perp$.

For the construction, let (Plr.Setup, Plr.Enc, Plr.Add, Plr.Dec) denote the Paillier encryption scheme and ($Encode_1$, $Encode_2$, $Add_1$, $Add_2$, Mult, Mask, $Decode_1$, $Decode_2$) denote the (m, n, L, d) packing scheme described in section V. We describe the construction of our three round secure protocol in FIG. 10.

In the enrollment phase, the device $\mathcal{D}$ encodes its input vector $\vec{u}=(u_1, \ldots, u_\ell)$ to produce $$t = \left\lceil \frac{\ell}{n} \right\rceil$$

encodings $(u_1^*, \ldots, u_t^*)$. It encrypts these encodings using the Paillier encryption scheme and sends the ciphertexts $\{[\![u_i^*]\!]\}_{i \in [t]}$ to the service provider $\mathcal{SP}$. Since we only consider a semi-honest adversary, $\mathcal{SP}$ is guaranteed that $[\![u^*]\!]$ indeed well-formed and has L2-norm of 1.

The matching phase begins with $\mathcal{D}$ sending the same ciphertexts $\{u_i^*\}_{i \in [t]}$ to terminal $\mathcal{T}$. $\mathcal{T}$ encodes its input vector $\vec{w}$ to produce encodings $(w_1^*, \ldots, w_t^*)$. Then, for each $i \in [t]$, $\mathcal{T}$ homomorphically multiplies encodings $(u_i^*, w_i^*)$ to produce a level-2 encoding of the product. It then homomorphically adds all these ciphertexts to produce an encryption $[\![\tilde{z}]\!]$ of the level-2 encoding of the inner product IP=$\langle \vec{u}, \vec{w} \rangle$. To ensure that the level-2 encoding $\tilde{z}$ doesn't leak any additional information, we rely on the security of the masking algorithm: $\mathcal{T}$ homomorphically masks $\tilde{z}$ and sends $[\![Mask(\tilde{z})]\!]$. Note that the masking procedure can be performed homomorphically: the underlying randomness is sampled externally and can then be added homomorphically. $\mathcal{D}$ can then decrypt this ciphertext and decode the resulting hyper—encoding to learn IP. It then checks if IP>T to learn the output which is shared with $\mathcal{T}$. Observe that this protocol leaks IP to $\mathcal{D}$.

There is a subtle issue in the above protocol. Recall that while the security of the masking scheme prevents the decoding from leaking information about cross-product terms, $\mathcal{D}$ still ends up learning each component-wise term $(u_i \cdot w_i)$ of IP rather than just the inner product on performing the decoding. To prevent this, $\mathcal{T}$ adds a secret sharing of 0, i.e., adds a random value $\rho_i$ to each component in such a way that $\Sigma_{i \in [n]} \rho_i = 0$. Therefore, each term of the decoded still looks uniformly random while they sum up to IP. We defer a formal proof to section X.B.

We now briefly discuss the choice of the parameters used for packing. Recall from section V that we need to pick the number of values n to encode based on the constraint that $k \cdot 2^n \leq L$, where L is the length of one Paillier ciphertext, $k=(m+d+\lambda)$, and m is the length of each feature $u_i$, $w_i$ that are initially encoded. In this protocol, using any encoding $u_i^*$ or $w_i^*$, we perform one multiplication with another encoding followed by (t−1) additions with such encodings. So, d should be $(m+\log n+\log t+2)$. Therefore, we need to satisfy the constraint that $2^n \cdot (2m+\log n+\log \lceil \ell/n \rceil+\lambda+2) \leq L$ to determine how many elements n to pack together. This depends on the specific values of $(\lambda, m, L, \ell)$ that we consider and we refer to section IX for more details on our choice and implementation results.

VII. Example Protocol 2—Malicious Device

In this section, we build a secure biometric authentication protocol with a four round matching phase. Our protocol is based on digital signatures, Paillier encryption [26] and honest-verifier zero knowledge proofs. Protocol 2 can use packing. We use proofs for three specific languages related to the encryption scheme in the enrollment phase (i) Proving that the public key was correctly generated (ii) batch proving knowledge of plaintexts given a set of ciphertexts and (iii) proving knowledge of the L2-norm of a vector given a set of ciphertexts encrypting it. We describe these zero knowledge proofs in section IV. They are based on the security of the Paillier encryption scheme. At the end of the matching phase, the inner product between the device and terminal vectors is leaked to the terminal. Formally, we prove the following theorem:

Theorem 2 Assuming the security of Paillier encryption and digital signatures, $\Pi_2$ in FIG. 11 is a four round biometric authentication protocol that is secure against any adversary that can maliciously corrupt the device or jointly corrupt the terminal and authority in a semi-honest manner with $L_{dev}(\vec{u}, \vec{w})=\perp$ and $L_{term}(\vec{u},\vec{w})=\langle \vec{u},\vec{w} \rangle$.

Paillier encryption is based on the decisional composite residuosity (DCR) assumption while digital signatures can be based on any one way function (which is implied by DCR). We refer to section X.C for the formal security proof of Theorem 2.

For the construction, let (Gen, Sign, Verify) be a signature scheme. Let $IP_{Max}=2^{2m}\ell$ denote the maximum possible value of the inner product $\langle \vec{u},\vec{w} \rangle$ where $\vec{u},\vec{w}$ are the biometric input vectors of the device and terminal, respectively, with norm 1.

Unlike the previous protocol, here, a corrupt $\mathcal{D}$ can behave maliciously. In the enrollment phase, $\mathcal{D}$ sends encryptions) $[\![u_1]\!], \ldots, [\![u_\ell]\!]$) of its input vector $\vec{u}$ without encoding them. Using the zero knowledge protocols, $\mathcal{D}$ also proves that these ciphertexts were honestly generated and the L2-norm of $\vec{u}$ is 1. If the proofs verify successfully, $\mathcal{SP}$ now converts these into encryptions $[\![u_1^*]\!], \ldots, [\![u_r^*]\!]$ of encodings and sends it to $\mathcal{D}$ along with a signature on them.

$\mathcal{D}$ initiates the matching phase by sending these ciphertexts $[\![u_r^*]\!], \ldots, [\![u_r^*]\!]$ along with the signature in the first round. $\mathcal{T}$ verifies the signature to ensure that the underlying vector $\vec{u}$ was indeed enrolled earlier. As before, $\mathcal{T}$ encodes its input vector $\vec{w}$ to produce encodings $(w_1^*, \ldots, w_t^*)$. Unlike the previous protocol, since we do not want to leak the inner product $IP=\langle \vec{u},\vec{w} \rangle$ to $\mathcal{D}$, $\mathcal{T}$ does not compute $[\![\tilde{z}]\!]$ where $\tilde{z}$ is a level-2 encoding of IP. Instead, $\tilde{z}$ is now an encoding of (a·IP+b) where a and b are random values. As before, $\mathcal{T}$ adds random $\rho_i$ values before masking and sends $[\![Mask(\tilde{z}+\tilde{p})]\!]$) in the second round. D can recover (a·IP+b) which is sent back to $\mathcal{T}$ in the third round. This allows $\mathcal{T}$ to learn IP as it knows (a, b). It then checks if IP>T to learn the output which is shared with $\mathcal{D}$ in the last round. Observe that this protocol leaks IP to $\mathcal{D}$.

We now discuss how to prevent a malicious $\mathcal{D}$ from cheating in the third round. Suppose it sends X'≠(aIP+b). We modify $\mathcal{T}$'s strategy as follows: let $$IP' = \frac{X' - b}{a}.$$

output $\perp$ if IP' is larger than the maximum possible value $IP_{Max}$ of the inner product (for any two norm-$\zeta$ vectors $\vec{u}, \vec{w}$). Since (a, b) are uniformly random, with overwhelming probability, a cheating $\mathcal{D}$ will be unable to pick X'≠(aIP+b) with both of the following conditions: (i) IP'<$IP_{Max}$ (ii) (a) IP≤T and IP'>T (OR) (ii) (b) IP'≤T and IP>T.

As for parameter selection, using any encoding $u_i^*$ or $w_i^*$, we first perform one multiplication with another encoding, a multiplication with a constant a of length λ, followed by (t−1) additions of such encodings and then adding it to a level-2 encoding of b. So, d should be (m+log n+log t+λ+3). Therefore, we need to satisfy the constraint that $2^n·(2m+\log n+\log \lceil \ell/n \rceil+2\lambda+3)\leq L$ to determine how many elements n to pack together.

VIII. Example Protocol 3—Malicious Device and No Leakage

In this section, we build a secure biometric authentication protocol with a five round matching phase. Our protocol is based on digital signatures, garbled circuits, two-message oblivious transfer (OT), Paillier encryption [26] and honest-verifier zero knowledge proofs. We use proofs for specific languages related to the encryption scheme as in section VII. The protocol leaks no extra information to any party. Formally, we prove the following theorem:

Theorem 3 Assuming the Security of Paillier Encryption, Digital Signatures, Garbled Circuits and Two Message Oblivious Transfer, $\Pi_3$ in FIG. 12 is a Five Round Biometric Authentication Protocol that is Secure Against any Adversary that can Maliciously Corrupt the Device or Jointly Corrupt the Terminal and Authority in a Semi-Honest Manner with No Leakage to any Party.

Paillier encryption and two message OT (either in CRS or random oracle model) can be instantiated based on the DCR assumption while digital signatures and garbled circuits can be based on any one way function (which is implied by DCR). We refer to section X.D for the formal security proof.

For the construction, let (Garble, Eval) denote a garbling scheme for circuits and let $(OT.Round_1, OT.Round_2, OT.Output)$ be a two-message oblivious transfer protocol. We describe our five round protocol in FIG. 12.

We build on the previous protocol to additionally ensure that the inner product IP is not leaked to the terminal $\mathcal{T}$. Recall from the previous protocol that the value X=(aIP+b) was directly sent by $\mathcal{D}$ to $\mathcal{T}$ which allowed T to recover IP and compare it with the threshold. Here, instead, we perform this comparison inside a garbled circuit. One way to do so would be for $\mathcal{T}$ to generate a garbled circuit that $\mathcal{D}$ can evaluate using input X. The circuit would internally compute IP=(X−b)/a. However, performing a division inside a garbled circuit is not very efficient. To build a more efficient protocol, we could do the following: in the second round, $\mathcal{T}$ sends encryptions of (hyper—encodings of) X=IP and Y=(a·IP+b). $\mathcal{D}$ can recover and feed both as inputs to the garbled circuit so that it only performs one multiplication to check that Y=(a·X+b).

While the random choice of (a, b) once again ensures that a malicious $\mathcal{D}$ can't cheat by providing wrong inputs (X, Y) to the circuit, notice that we now leak X=IP to $\mathcal{D}$! To solve this problem, $\mathcal{T}$ encrypts IP via a one-time pad to generate X=(IP+pad), thereby hiding IP from $\mathcal{D}$. That is, $\mathcal{D}$ now receives encryptions of hyper—encodings of X=(IP+pad) and Y=(a·IP+b), and labels corresponding to inputs (pad, a, b). The circuit first removes the one-time pad to recover IP and then checks that Y=(a·IP+b) as before. We use oblivious transfer (OT) to enable $\mathcal{D}$ to obtain the labels to evaluate the garbled circuit. The enrollment phase is same as the previous protocol with the only addition being $\mathcal{SP}$ also runs the setup of the OT protocol.

The analysis of the choice of parameters used for packing is almost identical to that in section VII.

IX. Implementation Results

We implement our protocols and report on their performance. The implementation was written in C++ and utilizes the GMP library for Paillier operations and the oblivious transfer implementation of Chou and Orlandi [13].

All evaluations were performed on a single commodity laptop with an i5-8365U processor and 16 GB of memory. All network traffic was routed over local host with a measured latency of 0.2 milliseconds on a 10 Gbps network card. To account for network latency and bandwidth restrictions, additional running time would need to be added. The Paillier scheme is implemented using a security level analogous to 3072 bit RSA, which is estimated to achieve 112 bits of computational security. Where relevant, we use a statistical security parameter of 40 bits.

We consider various template lengths $\ell \in \{128, 256, 512, 1024\}$ combined with different bit lengths m$\in\{8, 16, 24\}$ for each template element, i.e. templates are elements in $\mathbb{Z}_{2^m}^\ell$. We note that this bit length is of the input size while the inner product itself can be of bit length $2m+\log_2 \ell$. We consider the three protocols $\Pi_1$ (FIG. 10), $\Pi_2$ (FIG. 11), $\theta_3$ (FIG. 12) as presented above where the enrollment phase for $\Pi_2$, $\Pi_3$ is separated as $\Pi_{en}$.

$\Pi_1$-Enc in FIG. 15 denotes the time for $\mathcal{D}$ to locally generate an encryption of a template for $\Pi_1$ (enrollment phase), a one-time operation. $\Pi_1$ in the next column denotes the time to perform the matching phase of $\Pi_1$. We assume that the terminal $\mathcal{T}$ possesses the measurement in template form. As can be seen, this phase is significantly faster than the one-time enrollment phase. For example, encrypting a template with $\ell$=256, m=16 requires 0.6 seconds while the matching phase requires 0.024 seconds. This is because Paillier encryption requires computing a large exponentiation $r^N$ mod $N^2$ where N is 3072 bits in our case. In contrast, decryption and homomorphic operations are relatively efficient. When designing our protocols this is one of the reasons why $\mathcal{D}$ always encrypts their long term template as opposed to having $\mathcal{T}$ encrypting each measurement with its own Paillier key. Moreover, we found that simply generating the plaintext template using SphereFace [24] required more time than $\Pi_1$.

As seen in FIG. 14, $\Pi_1$ has very low communication overhead. The $m_1$ column of $\Pi_1$ denotes the size in bytes of the first message which $\mathcal{D}$ sends to the terminal. For example, this message is of size 16 KB for $\ell$=256, m=16. For this set of parameters we achieve a packing factor of 8×. That is, without our packing technique the encrypted template would be 128 KB. An important property of our protocols is that this message can be reused in the case that several comparisons with the same $\mathcal{D}$ are performed. After $\mathcal{T}$ receives this first message, each subsequent $\Pi_1$ sessions only requires $\mathcal{T}$ sending 516 bytes, regardless of $\ell$, m.

Next we consider the overhead for a possibly malicious $\mathcal{D}$ to enroll a new template (common for $\Pi_2$ and $\Pi_3$). We report the running time of this protocol in two parts. $\Pi_{en}$-Enc is the time for $\mathcal{D}$ to locally encrypt their template and $\Pi_{en}$ is the time required to run the (rest of) enrollment protocols which contains several zero knowledge proofs that the template is well formed. As can be seen in FIG. 15, simply encrypting the template (with one element per ciphertext) requires about half the time as the rest of the enrollment protocol. This demonstrates that our custom designed zero knowledge protocols are quite efficient. For example, with $\ell$=256, m=16 encrypting the template requires 2.2 seconds while the protocol requires 5.0 seconds. We note that this protocol can trivially be parallelized but we did not consider this optimization. While the enrollment protocol requires a non-negligible amount of time, this protocol only has to be performed once during a setup phase and therefore is extremely practical. The communication overhead of this protocol is shown in FIG. 14 and requires between 0.2 and 1 MB of total communication depending on $\ell$, m.

For the matching phase of $\Pi_2$, we observe very practical performance. The running time of $\Pi_2$ with $\ell$=256, m=16 is just 0.05 seconds. The protocol consists of three messages where $\mathcal{D}$ sends the first which can be reused. For $\ell$=256, m=16, this first message is of size 27 KB while the next per session messages are of size 516 and 260 bytes respectively. For these parameters we achieve a packing factor of 6 x, reducing the first message size from 162 KB. Moreover, when we consider the amortized setting where the first message is reused, this protocol requires only 0.8 KB per authentication.

Finally, we consider the protocol $\Pi_3$ which strengthens $\Pi_2$ so that the inner product is not revealed to $\mathcal{T}$. This is achieved with the addition of more Paillier operations along with a small garbled circuit evaluation. In terms of running time, we observe that the protocol requires 0.12 seconds for $\ell$=256, m=16 where the majority of that is spent doing Paillier operations. The main overhead of $\Pi_3$ compared to $\Pi_2$ is the added communication overhead incurred by sending the garbled circuit. For $\ell$=256, m=16, we observe a total communication of 142 KB compared to 28 KB for $\Pi_2$. This difference becomes more stark in the amortized setting where the first message is reused many times. In this case $\Pi_3$ requires 116 KB compared to 0.8 KB for $\nabla_2$. However, given that 142 KB is a very small amount communication for modern devices we argue that $\Pi_3$ achieves very practical overheads. For example, 4G wireless networks can send up to 100 Mbps while the new 5G networks will be able to send up to 10 Gbps. Alternatively, locally area networks such as Android Nearby are able to provide comparable high throughput communication channels.

In cases when the bandwidth of $\mathcal{D}$ is extremely constrained, we observe that a large majority of the communication overhead can be preprocessed with the assistance of $\mathcal{SP}$. In particular, using well known techniques $\mathcal{SP}$ can generate the garbled circuit and send it to $\mathcal{D}$ along with performing OT (extension) protocol on random inputs. During the online phase, $\mathcal{D}$ can instruct $\mathcal{SP}$ to send $\mathcal{T}$ the garbled circuit seed and OT messages from the preprocessing. $\mathcal{SP}$ can also send the encrypted template of $\mathcal{D}$. Then, $\mathcal{D}$ and $\mathcal{T}$ can derandomize the OTs and complete the protocol. This would result in $\Pi_3$ requiring approximately $2(2m+\log_2 n+\lambda)_\kappa$ bits of communication between $\mathcal{T}$ and $\mathcal{D}$. For $\ell=256$, m=16, this would result in approximately 20 KB of online communication. Applying the sample idea to $\Pi_1$ and $\Pi_2$ results in removing the need for $\mathcal{D}$ to send the first message because $\mathcal{SP}$ would send it on her behalf. It is easy to show that this achieves the same level of security since we already assume that $\mathcal{SP}$ and $\mathcal{T}$ can collude and are both semi-honest.

One could also consider implementing our protocol using LWE-based additive homomorphic encryption. These schemes typically support the packing of several values into a ciphertext such that the ciphertext can be operated on as a vector of elements. However, our choice of Paillier results in less communication which is a key performance metric. LWE ciphertexts typically have to be large due to security consideration. For example, with a vector length of n=256 and m=16-bit features the resulting communication for protocol $\Pi_1$ is about 17 KB while this implemented using LWE results in 96 KB. However, we do note that the running time of the LWE solution is faster at just 10 milliseconds compared to our protocol requiring 45 milliseconds. The LWE parameters in question also supports up to n=2048 length vectors with no added overhead. This means that if the input vectors are of sufficient length then the LWE approach could give better communication and running time. The final advantage of our approach is that Paillier more easily translates to the malicious setting. ZK-proofs of LWE ciphertexts add additional overhead which could impact the practicality of $\Pi_2$, $\Pi_3$. We leave a more detailed comparison of LWE and Paillier in the context of our protocols for future work X. Example Cryptographic Primitives and Proofs In this section, we formally define some of the primitives and proofs we use.

A. Primitives

1. Paillier Encryption

The additively homomorphic encryption scheme by Paillier [26] (Plr.Setup, Plr.Enc, Plr.Add, Plr.Dec) satisfies the following correctness and security properties. We refer to [26] for the proofs.

For correctness, for any (epk, esk)←Plr.Setup($\lambda$):

1) For any message x, we have with overwhelmingly large probability $Plr.Dec(esk, Plr.Enc(epk, x))=x.$ 2) For any two messages $x_0$ and $x_1$ with $[\![x_b]\!]$=Plr.Enc(epk, $x_b$) for b∈{0,1}, we have $Plr.Dec(esk, Plr.Add([\![x_0]\!], [\![x_1]\!]))=x_0+x_1.$ For semantic security, for all PPT algorithms $\mathcal{A}$ and any two messages $x_0$ and $x_1$, we have $|Pr[\mathcal{A}(epk,(x_0,x_1),\mathcal{A}_{x_0}\mathcal{A})=1]-Pr[\mathcal{A}(epk,(x_0,x_1),[\![x_1]\!])=1]|\leq negl(\lambda),$ where (epk, esk)=Plr.Setup($\lambda$) and $[\![x_b]\!]$=Plr.Enc(epk, $[\![x_b]\!]$) for b∈{0,1}.

Also for semantic security, Informally, circuit privacy requires that the ciphertext generated by a set of homomorphic operations does not reveal anything about the (linear) circuit that it evaluates, beyond the output value of that circuit, even to an adversary who generated the public and secret keys. We refer to [12] for a formal definition and note that this property is easily achieved by the Paillier encryption scheme.

2. Zero Knowledge Proofs

An interactive protocol between a prover P and a verifier V for deciding a language L is an honest-verifier zero-knowledge proof of knowledge protocol if it satisfies the following properties. Below, we define $\langle P(\bullet), V(\bullet)\rangle$ to be the output of $V(\bullet)$ at the end of the protocol execution.

For completeness, for every security parameter $\lambda\in\mathbb{N}$, and any (x, w)∈$R_L$, $Pr[\langle P(x,w),V(x)\rangle=1]=1-negl(\lambda).$ where the probability is over the randomness of P and V.

For soundness, for any PPT cheating prover P*, it holds that if $x^*\notin L$ then $Pr[\langle P^*(x^*),V(x^*)\rangle=1]=negl(\lambda).$ where the probability is over the random coins of V.

For proof of knowledge, for any PPT cheating prover P*, there exists a PPT extractor ZK. Ext such that for all x: $Pr[\langle P^*(x^*), V(x^*)\rangle=1\wedge(w\leftarrow ZK.Ext^{P^*}(x^*)$ s.t.$(x^*, w^*)\notin R_L)]=negl(\lambda).$ where the probability is over the random coins of V and ZK. Ext.

For zero knowledge, for any (semi-) honest verifier V*, there exists a PPT simulator Sim such that for all x∈L: the view of V* when interacting with an honest prover P on input (x, w) is computationally indistinguishable from its view when interacting with Sim on input x alone.

3. Digital Signatures

A digital signature scheme consists of the following three algorithms (Gen, Sign, Verify). For Gen($1^\lambda$)→(sk, vk), a randomized algorithm that takes the security parameter $\lambda$ as input, and generates a verification-key vk and a signing key sk. For Sign(sk, m)=: $\sigma$. A randomized algorithm that takes a mesage m and signing key sk as input and outputs a signature $\sigma$. For Verify(vk, (m,$\sigma$))=: 1/0. A deterministic algorithm that takes a verification key vk and a candidate message-signature pair (m,$\sigma$) as input, and outputs 1 for a valid signature and 0 otherwise.

The following correctness and security properties should be satisfied. For correctness, for all $\lambda\in\mathbb{N}$, all (vk, sk)←Gen($1^\lambda$), any message m, Verify(vk, m, Sign(sk, m))=1. For unforgeability, a signature scheme is unforgeable if for any PPT adversary $\mathcal{A}$, the following game outputs 1 with negligible probability (in security parameter). To initialize, Run (vk, sk)←Gen($1^\lambda$). Give vk to $\mathcal{A}$. Initiate a list L:=∅. For signing queries, on query m, return $\sigma$←Sign(sk, m). Run this step as many times as $\mathcal{A}$ desires. Then, insert m into the list L. For output, receive output ($m^a$, $\sigma^a$) from $\mathcal{A}$. Return 1 if and only if Verify(vk, ($m^a$, $\sigma^a$))=1 and $m^a\notin L$, and 0 otherwise.

4. Two-Message Oblivious Transfer

A two-message oblivious transfer (OT) protocol is a tuple (OT.Round$_1$, OT.Round$_2$, OT.Output) defined as follows. For OT.Round$_1$ ($\beta$), a PPT algorithm that, given a bit $\beta\in\{0,1\}$, outputs a message $m_1$ and a secret state st. For OT.Round$_2$(($\mu_0,\mu_1$), $m_1$), a PPT algorithm that, given a pair of strings ($\mu_0,\mu_1$)∈$\{0,1\}^{2\lambda}$ and a message $m_1$, outputs a message $m_2$. For OT.Output(st, $\beta$, $m_2$), a deterministic algorithm that, given a secret state st, a bit $\beta\in\{0,1\}$ and a message $m_2$, outputs a string $\mu'\in\{0,1\}^\lambda$.

The following correctness and security properties can be satisfied. For correctness, for any $\lambda\in\mathbb{N}$, any bit $\beta\in\{0,1\}$, any pair of strings $(\mu_0, \mu_1) \in \{0,1\}^{2\lambda}$: let $(m_1, st)=$OT.Round$_1$ $(\beta)$, $m_2=$OT.Round$_2((\mu_0, \mu_1), msg_1)$, $=$OT.Output$(st, \beta, m_2)$. We have $\mu'=\mu_\beta$ with overwhelmingly large probability in $\lambda$. For receiver privacy, for any $\lambda \in \mathbb{N}$, for any PPT adversary $\mathcal{A}$: we have $\Pr[\mathcal{A}(\text{OT.Round}_1(0))=0]-\Pr[\mathbb{N}(\text{OT.Round}_1(1))=0]\leq \text{negl}(\lambda)$, where the probability is defined over the random coins of OT.Round$_1$ algorithm. For sender privacy, for any $\lambda \in \mathbb{N}$, any $\beta \in \{0,1\}$, any $(\mu_0, \mu_1) \in \{0,1\}^{2\lambda}$, any PPT adversary $\mathcal{A}$, there exists a PPT simulator OT.Round$_2$.Sim such that the following holds: Let $m_1 \leftarrow \mathcal{A}(\beta)$. Then, $$|\Pr[\mathcal{A}(\beta, m_2)=0]-\Pr[\mathcal{A}(\beta, \widehat{m}_2)=0]|\leq \text{negl}(\lambda),$$

where $m_2=OT.\text{Round}_2((\mu_0, \mu_1), m_1)$, $\widehat{m}_2=OT.\text{Round}_2.Sim(\mu_\beta, m_1)$.

The protocol can be in the CRS model (in which case we would also have an algorithm OT.Setup(•) to generate the CRS) or in the Random oracle model.

5. Garbled Circuits

A garbling scheme for a class of circuits $\mathcal{C}$ with n-bit inputs consists of the following polynomial-time algorithms. For Garble($C \in \mathcal{C}$), a probabilistic algorithm that takes a circuit $C \in \mathcal{C}$ as input and outputs a garbled circuit $\tilde{C}$ and a set of labels $\vec{\ell}=\{\ell_{j,0}, \ell_{j,1}\}_{j\in[n]}$. For Eval$((x_1, \ldots, x_n) \in \{0,1\}^n, \{\ell_{j,x_j}\}_{j\in[n]}, \tilde{C})$, a deterministic algorithm that takes as input a string $(x_1, \ldots, x_n) \in \{0,1\}^n$, a set of labels $\{\ell_{j,x_j}\}_{j\in[n]}$ and a garbled circuit $\tilde{C}$, and outputs a bit $y \in \{0,1\}$.

The following correctness and security properties can be satisfied. For correctness, for any circuit $C \in \mathcal{C}$, any string $(x_1, \ldots, x_n) \in \{0,1\}^n$, let $(\tilde{C}, \{\ell_{j,0}, \ell_{j,1}\}_{j\in[n]})=\text{Garble}(C)$. We have Eval$((x_1, \ldots, x_n), \{\ell_{j,x_j}\}_{j\in[n]}, \tilde{C})=C(x_1, \ldots, x_n)$. For security, there exists a PPT algorithm Garble.Sim(•) such that for any circuit $C \in \mathcal{C}$, any string $(x_1, \ldots, x_n) \in \{0,1\}^n$, the ensembles $(\tilde{C}, \{\ell_{j,x_j}\}_{j\in[n]})$ and Garble.Sim $(1^\lambda, C(x))$ are computationally indistinguishable where $(\tilde{C}, \{\ell_{j,x_j}\}_{j\in[n]}) \leftarrow \text{Garble}(C\text{ C})$.

B. Protocol 1: Proof

1. Corrupt Device

Consider a semi-honest adversary $\mathcal{A}$ that corrupts the device $\mathcal{D}$. We now describe the simulator Sim. Let Mask.Sim denote the simulator for the packing scheme. In the enrollment phase, before the phase begins, Sim gets as input $\vec{u}=(u_1, \ldots, u_\ell)$—the input vector of the adversarial device. Upon receiving (epk, esk, $\{\vec{u_i^*}\}_{i\in[t]}$) from $\mathcal{A}$, Sim sends message "Enrolled".

In a matching phase, before the phase begins, Sim gets the output bit y and the leakage $L_{dev}(\bullet)=$IP from the ideal functionality. Sim does the following:

Round 1: Receive (epk, $\{[\![u_i^*]\!]\}_{i\in[t]}$) from $\mathcal{A}$.
Round 2:
  1) Pick n random strings IP$_1, \ldots,$ IP$_n$ such that (IP$_1+ \ldots +$IP$_n$)=IP.
  2) Compute and send $[\![\widetilde{IP}]\!]=$Mask.Sim(IP$_1, \ldots,$ IP$_n$) to $\mathcal{A}$.

We show that the above simulation strategy is successful via a series of computationally indistinguishable hybrids where the first hybrid Hyb$_0$ corresponds to the real world and the last hybrid Hyb$_2$ corresponds to the ideal world.

Hyb$_0$: Real world. In this hybrid, consider a simulator SimHyb that plays the role of the honest service provider and terminal as in the real world.

yb$_1$: Switch Ciphertexts. In this hybrid, SimHyb runs the matching phase as follows: Pick n random strings IP$_1, \ldots,$ IP$_n$ such that (IP$_1+ \ldots +$IP$_n$)=IP; Compute $[\![\tilde{z}]\!]$ using the algorithm Plr.Enc where $\tilde{z}=$Encode$_2$(IP$_1, \ldots,$ IP$_n$); pick n random strings $\rho_1, \ldots, \rho_n$ such that $(\rho_1+ \ldots +\rho_n)=0$ and $\forall i, \rho_i \in \mathbb{Z}_{2^k}$. Let $\tilde{\rho}=$Encode$_2(\rho_1, \ldots, \rho_n)$; Compute and send $[\![\widetilde{IP}]\!]=$Mask$(\tilde{z}+\tilde{\rho})$ to $\mathcal{D}$.

Hyb$_2$: Masking Simulator. In this hybrid, SimHyb runs the simulator Mask.Sim of the packing scheme to compute $[\![\widetilde{IP}]\!]$ in round 2 instead of running the honest masking algorithm. This hybrid corresponds to the ideal world.

We now show that every pair of successive hybrids is computationally indistinguishable. Lemma 3: Assuming the circuit privacy of Paillier encryption, Hyb$_0$ is computationally indistinguishable from Hyb$_1$.

Proof. The only difference between the adversary's view in both worlds is the way the ciphertext $[\![\tilde{z}]\!]$ is computed. In the real world, $\mathcal{T}$ computes $[\![\tilde{z}]\!]$ by performing the homomorphic operations using its input vector $\vec{w}$ while in the ideal world, Sim uses random (IP$_1, \ldots,$ IP$_n$) such that (IP$_1+ \ldots +$IP$_n$)=IP and sets $\tilde{z}=$Encode$_2($IP$_1, \ldots,$ IP$_n$). Since the $\rho_i$ values all add up to 0, observe that in both cases, Decode(Plr.Dec(esk, $[\![IP^*]\!]$)) produces a tuple (IP$_1, \ldots,$ IP$_n$) such that $\Sigma_{i=1}^n$ IP$_i=$IP. Therefore, if there exists an adversary $\mathcal{A}$ that can distinguish between the two worlds with non-negligible probability, we can design a reduction $\mathcal{A}_{Plr}$ that can break the circuit privacy of the Paillier encryption scheme which is a contradiction.

Lemma 4 Assuming the security of the packing scheme, Hyb$_1$ is statistically indistinguishable from Hyb$_2$. Proof. The only difference between the two hybrids is that in Hyb$_1$, SimHyb computes the ciphertext $[\![\widetilde{IP}]\!]$ by homomorphically evaluating the honest masking algorithm Mask while in Hyb$_2$, SimHyb homomorphically computes the encoding output by the simulator Mask.Sim. We note that the operations (after sampling the randomness) can be performed homomorphically using Paillier encryption. Thus, from the security property of the packing scheme, the two hybrids are statistically indistinguishable.

2. Corrupt Provider, Terminal

Consider a semi-honest adversary $\mathcal{A}$ that jointly corrupts the service provider $\mathcal{SP}$ and terminal $\mathcal{T}$. We now describe the simulator Sim. In the enrollment phase, Sim sets vector $\vec{u}=(u_1, \ldots, u_\ell)$ uniformly at random and interacts with $\mathcal{A}$ in the Enrollment phase as done by $\mathcal{D}$ in the real world. That is:

1. Compute $u_1^*, \ldots, u_t^*$ as the encoding of $\vec{u}$.
2. Compute (esk, epk)$\leftarrow$Plr.Setup($1^\lambda$). $\forall i \in [t]$, compute $u_i^*=$Plr.Enc(epk, $[\![u_i^*]\!]$).
3. Send (epk, $\{[\![u_i^*]\!]\}_{i\in[t]}$) to $\mathcal{A}$.

In the matching phase, before the phase begins, Sim gets input $(\vec{w}, \rho, y)$ where $\vec{w}$ is $\mathcal{A}$'s input, $\rho$ is $\mathcal{A}$'s randomness, y is the output bit. Sim does the following: Round 1: Send (epk, $\{[\![u_i^*]\!]\}_{i\in[t]}$) to $\mathcal{A}$; Round 2: Receive $[\![IP^*]\!]$ from $\mathcal{A}$; Round 3: Send bit y to $\mathcal{A}$.

We now show that the above simulation strategy is successful. Lemma 5: Assuming the semantic security of Paillier encryption, the real world is computationally indistinguishable from the ideal world. Proof Observe that the only difference between the two worlds is the way the ciphertexts $\{[\![u_i^*]\!]\}_{i\in[t]}$ are computed. In the real world, $\mathcal{D}$ computes them using its input vector $\vec{u}$ while in the ideal world Sim computes them as an encryption of a uniformly random vector. The adversary $\mathcal{A}$ only gets the public key epk and does not learn the secret key esk of the encryption scheme. Therefore, if there exists an adversary $\mathcal{A}$ that can distinguish between the two worlds with non-negligible probability, we can design a reduction $\mathcal{A}_{Plr}$ that can break the semantic security of the Paillier encryption scheme which is a contradiction.

C. Protocol 2: Proof

1. Corrupt Device

Consider a malicious adversary $\mathcal{A}$ that corrupts the device $\mathcal{D}$. We now describe the simulator Sim. Let ZK.Ext denote the extractor for the zero knowledge protocol $\Pi_{ptxt\text{-}knwldg}$. Let Mask.Sim denote the simulator for the packing scheme.

In enrollment phase, Sim does the following.

Receive (epk, $[\![u_1]\!]$, ..., $[\![u_\ell]\!]$) from $\mathcal{A}$.

Run zero knowledge protocols $\Pi_{epk}$, $\Pi_{ptxt}$–knwldg and $\Pi_{zk\text{-}L2}$ as the verifier with $\mathcal{A}$ as the prover with statement epk for the first proof and statement (epk, $[\![u_1]\!]$, ..., $[\![u_\ell]\!]$) for the next two proofs. Also, run the extractor ZK.Ext on protocol $\Pi_{ptxt\text{-}knwldg}$ to extract witness $\{u_i, \rho_i\}_{i=1}^{\ell}$.

If either of the proofs fail or the extractor ZK.Ext fails, send the message "Failed" to $\mathcal{A}$ and query the ideal functionality $\mathcal{F}$ as part of enrollment with a vector of norm larger than 1, thereby instructing it to deliver the message "Failed" to the honest service provider.

Else, do the following:

(a) Generate (sk, vk)$\leftarrow$Gen($1^\lambda$).

(b) Compute ($[\![u_1^*]\!]$, ..., $[\![u_t^*]\!]$) using Plr.Add($\cdot$) where $u_1^*, \ldots, u_t^*$ is the level-1 encoding of $\vec{u}$=$(u_1, \ldots, u_\ell)$.

(c) Send $\sigma$=Sign(sk, (epk, $[\![u_1^*]\!]$, ..., $[\![u_t^*]\!]$)) to $\mathcal{A}$.

(d) Query the ideal functionality $\mathcal{F}$ as part of enrollment with vector $\vec{u}$ extracted from ZK.Ext.

In the matching phase, Sim can do the following.

Output from ideal functionality $\mathcal{F}$: Query $\mathcal{F}$ with a new sub-session for the matching phase to receive output bit y.

Round 1: Receive ($\sigma$, $\{[\![u_i^*]\!]\}_{i\in[t]}$) from $\mathcal{A}$.

Round 2:

(a) Output™ if Verify(vk, (epk, $[\![u_1^*]\!]$, ..., $[\![u_t^*]\!]$), $\sigma$)$\neq$1.

(b) Output "Special Abort" if Verify(vk, (epk, $[\![u_1^*]\!]$, ..., $[\![u_t^*]\!]$), $\sigma$)=1 (AND) $[\![u_1^*]\!]$, ..., $[\![u_t^*]\!]$, $\sigma$) is not the tuple sent to $\mathcal{A}$ in the Enrollment phase.

(c) Pick a random value IP satisfying the following: IP<T if y=0 and T$\leq$IP$\leq$IP$_{Max}$ if y=1.

(d) Pick random strings a$\in \mathbb{Z}_\lambda$, b$\in \mathbb{Z}_{(\lambda \cdot \log IP_{Max}+\lambda)}$.

(e) Pick n random strings $X_1, \ldots, X_n$ such that $(X_1+ \ldots +X_n)=(a\cdot IP+b)$.

(f) Compute and send $[\![\hat{X}]\!] = [\![$Mask.Sim$(X_1, \ldots, X_n)]\!]$) to $\mathcal{A}$.

Round 3: Receive X from $\mathcal{A}$.

Round 4:

(a) Set $IP' = \frac{X-b}{a}$.

(b) If IP$_{Max}$<IP', instruct $\mathcal{F}$ to output $\bot$ to the honest terminal.

(c) If T$\leq$IP$\leq$IP$_{Max}$, send 1 to $\mathcal{A}$. Else, send 0. Instruct $\mathcal{F}$ to deliver output to the honest terminal.

We show that the above simulation strategy is successful via a series of computationally indistinguishable hybrids where the first hybrid Hyb$_0$ corresponds to the real world and the last hybrid Hyb$_5$ corresponds to the ideal world.

Hyb$_0$: Real world. In this hybrid, consider a simulator SimHyb that plays the role of the honest service provider and terminal as in the real world.

Hyb$_1$: Run the Extractor. In this hybrid, SimHyb runs the extractor ZK.Ext for the zero knowledge protocol $\Pi_{ptxt\text{-}knwldg}$ as done by Sim in the ideal world to extract witness $\vec{u}=(u_1, \ldots, u\ell)$. It also queries the ideal functionality in the enrollment phase as done by Sim.

Hyb$_2$: Special Abort for signature forgery. In this hybrid, in round 2 of the matching phase, SimHyb outputs "Special Abort" if Verify(vk, (epk, $[\![u_1^*]\!]$, ..., $[\![u_t^*]\!]$), $\sigma$)=1 (AND) (epk, $[\![u_1^*]\!]$, ..., $u_t^* \mathcal{F}$, $\sigma$) is not the tuple sent to $\mathcal{A}$ in the Enrollment phase, as done by Sim in the ideal world.

Hyb$_3$: Switch Ciphertexts. In this hybrid, SimHyb computes the ciphertexts in the matching phase as follows:

Pick a random value IP satisfying the following: IP<T if y=0 and T$\leq$IP$\leq$IP$_{Max}$ if y=1.

Pick random strings a$\in \mathbb{Z}_\lambda$, b$\in \mathbb{Z}_{(\lambda \cdot \log IP_{Max}+\lambda)}$.

Pick n random strings $X_1, \ldots, X_n$ such that $(X_1+ \ldots +X_n)=(a\cdot IP+b)$.

Compute $[\![\tilde{z}]\!]$ using algorithm Plr.Enc where $\tilde{z}$=Encode$_2(X_1, \ldots, X_n)$.

Pick n random strings $\rho_1, \ldots, \rho_n$ such that $(\rho_1+ \ldots +\rho_n)=0$ and $\forall i, \rho_i \in \mathbb{Z}_{2^k}$. Let $\tilde{\rho}$=Encode$_2(\rho_1, \ldots, \rho_n)$.

Compute and send $[\![\tilde{X}]\!] = [\![$Mask$(\tilde{z}+\tilde{\rho})]\!]$ to $\mathcal{D}$.

Hyb$_4$: Masking Simulator. In this hybrid, SimHyb runs the simulator Mask.Sim of the packing scheme to compute $[\![\tilde{X}]\!]$ in round 2 instead of running the honest masking algorithm.

Hyb$_5$: Ideal world. In this hybrid, SimHyb instructs the ideal functionality to either deliver output $\bot$ or the real output to the honest terminal as done by Sim in round 4. This hybrid corresponds to the ideal world.

We now show that every pair of successive hybrids is computationally indistinguishable. Lemma 6: Assuming the proof of knowledge property for protocol $\Pi_{ptxt\text{-}knwldg}$ and soundness of protocols $\Pi_{epk}$, $\Pi_{zk\text{-}L2}$, Hyb$_0$ is computationally indistinguishable from Hyb$_1$. Proof. The difference between the two hybrids is that in Hyb$_1$, SimHyb also runs the extractor NIZK.Ext on the proofs given by the adversary for protocol $\Pi_{ptxt\text{-}knwldg}$ to compute its input vector $\vec{u}$ and checks that the L2-norm of $\vec{u}$ is $\zeta$. From the soundness of protocols $\Pi_{epk}$, $\Pi_{zk\text{-}L2}$, we know that if the proofs verify successfully, it must indeed be the case that the public key was correctly generated and that the L2-norm of the underlying vector is $\zeta$ if the ciphertexts were correctly generated. Thus, the only difference between the two hybrids is if the adversary can produce a proof for protocol $\Pi_{ptxt-knwldg}$ such that, with non-negligible probability, the proof verifies successfully, but SimHyb fails to extract $\vec{u}$ and hence SimHyb aborts. However, we can show that if there exists an adversary $\mathcal{A}$ that can cause this to happen with non-negligible probability, we can design a reduction $\mathcal{A}_{zk}$ that breaks the argument of knowledge property of protocol $\Pi_{ptxt-knwldg}$ with non-negligible probability which is a contradiction.

Lemma 7: Assuming the unforgeability of the signature scheme, $Hyb_1$ is computationally indistinguishable from $Hyb_2$. Proof. The difference between the two hybrids is that in $Hyb_2$, in round 2 of the matching phase, SimHyb outputs "Special Abort". Observe that this happens if in round 1, $\mathcal{A}$ sends a tuple (epk, $u_1^*, \ldots, u_t^*, \sigma$) such that this was not the tuple sent to $\mathcal{A}$ in the enrollment phase and Verify (vk, (epk, $[\![ u_1^* ]\!], \ldots, [\![ u_t^* ]\!]$), $\sigma$)=1. However, if there exists an adversary $\mathcal{A}$ that can cause this event to happen with non-negligible probability, we can use $\mathcal{A}$ to design a reduction $\mathcal{A}_{sign}$ that breaks the unforgeability of the signature scheme with non-negligible probability which is a contradiction.

Lemma 8: Assuming the circuit privacy of Paillier encryption, $Hyb_2$ is computationally indistinguishable from $Hyb_3$. Proof. This is identical to the proof of Lemma 3.

Lemma 9: Assuming the security of the packing scheme, $Hyb_3$ is statistically indistinguishable from $Hyb_4$. Proof. This is identical to the proof of Lemma 4.

Lemma 10: $Hyb_4$ is statistically indistinguishable from $Hyb_5$. Proof. The difference between the two hybrids is that in $Hyb_5$, the honest terminal gets its output via the ideal functionality. In more detail, SimHyb instructs the ideal functionality to deliver either the actual output bit y or $\bot$ based on its computation in round 4 of the matching phase. First, note that the strings a, b are picked by SimHyb uniformly at random in round 2, and the adversary only learns X=(a·IP+b). Observe that in both hybrids, if the adversary sends a string X' in round 3 such that $$IP_{Max} \leq \frac{(X'-b)}{a},$$

the honest terminal outputs $\bot$. The only difference between the two hybrids is if the adversary can send a string X'≠X in round 3 such that either of the following happens:

$$\frac{(X'-b)}{a} \leq T \text{ but } T \leq \frac{(X-b)}{a} \leq IP_{Max} \quad \text{(i)}$$

(OR)

$$T \leq \frac{(X'-b)}{a} \leq IP_{Max} \text{ but } \frac{(X-b)}{a} \leq T. \quad \text{(ii)}$$

This is because in $Hyb_4$, the honest terminal's output is based on the value of $$\frac{(X'-b)}{a}$$

whereas in $Hyb_5$, it only depends on the value of $$IP = \frac{(X-b)}{a}.$$

However, since a, b are picked uniformly at random, the probability that the adversary can send a string X'≠X in round 3 such that either of the two conditions happen is negligible and this completes the proof 2. Corrupt Provider, Terminal Consider a semi-honest adversary $\mathcal{A}$ that jointly corrupts the service provider $\mathcal{SP}$ and terminal $\mathcal{T}$. We now describe the simulator Sim. Let ZK.Sim, ZK.Sim$_1$, ZK.Sim$_2$ denote simulators for the zero knowledge protocols $\Pi_{epk}$, $\Pi_{ptxt-knwldg}$ and $\Pi_{zk-L2}$ respectively.

In the enrollment phase, Sim does the following: Pick vector $\vec{u}=(u_1, \ldots, u_\ell)$ uniformly at random; Compute (esk, epk)←Plr.Setup($1^\lambda$) and send (epk, $u_1, \ldots, u_\ell$) to $\mathcal{A}$; Run the simulators ZK.Sim, ZK.Sim$_1$, ZK.Sim$_2$ for the zero knowledge protocols $\Pi_{epk}$, $\Pi_{ptxt-knwldg}$ and $\Pi_{zk-L2}$ from Section 8 where $\mathcal{A}$ is the verifier. For the first proof, the statement is epk and for the next two proofs, the statement is (epk, $[\![ u_1 ]\!], \ldots, [\![ u_\ell ]\!]$); and Receive $\sigma$ from $\mathcal{A}$.

In the matching phase, before the phase begins, Sim gets input $(\vec{w}, \rho, y, L_{term}(\bullet)=IP=\langle \vec{u}, \vec{w} \rangle)$ where $\vec{w}$ is $\mathcal{A}$'s input, $\rho$ is $\mathcal{A}$'s randomness, y is the output bit and $L_{term}(\bullet)$ is the leakage. Sim does the following:

Round 1: Send ($\sigma$, epk, $\{ [\![ u_i^* ]\!] \}_{i \in [t]}$) to $\mathcal{A}$.

Round 2: Receive $[\![ \tilde{X} ]\!]$ from $\mathcal{A}$.

Round 3:

(a) Extract strings (a, b) from the adversary's randomness $\rho$.

(b) Send X=(a·IP+b) to $\mathcal{A}$ where IP=$L_{term}(\bullet)$.

We show that the above simulation strategy is successful via a series of computationally indistinguishable hybrids where the first hybrid $Hyb_0$ corresponds to the real world and the last hybrid $Hyb_3$ corresponds to the ideal world. $Hyb_0$: Real world. In this hybrid, consider a simulator SimHyb that plays the role of the honest device as in the real world. $Hyb_1$: Simulate Proofs. In this hybrid, SimHyb runs the simulators ZK.Sim, ZK.Sim$_1$, ZK.Sim$_2$ for the zero knowledge protocols $\Pi_{epk}$, $\Pi_{ptxt-knwldg}$ and $\Pi_{zk-L2}$ as done by Sim in the enrollment phase of the ideal world. $Hyb_2$: Change computation of X. In this hybrid, in round 3 of the matching phase, SimHyb no longer decrypts $\tilde{X}$ to compute X. Instead, it computes X=(a·IP+b) as done by Sim in the ideal world where (a, b) is extracted from the adversary' randomness $\rho$ and IP=$L_{term}(\bullet)$. $Hyb_3$: Switch Ciphertexts. In this hybrid, SimHyb picks input vector $\vec{u}$ uniformly at random as done by Sim. This hybrid corresponds to the ideal world.

We now show that every pair of successive hybrids is computationally indistinguishable. Lemma 11: Assuming the zero knowledge property for protocols $\Pi_{epk}$, $\Pi_{ptxt-knwldg}$ and $\Pi_{zk-L2}$, $Hyb_0$ is computationally indistinguishable from $Hyb_1$. Proof. The only difference between the two hybrids is that in $Hyb_0$, the proofs of protocols $\Pi_{epk}$, $\Pi_{ptxt-knwldg}$ and $\Pi_{zk-L2}$ are computed by SimHyb by following the honest prover's strategy while in $Hyb_1$, they are generated using the simulators ZK.Sim$_1$, ZK.Sim$_2$. Thus, if there exists an adversary $\mathcal{A}$ that can distinguish between these two hybrids with non-negligible probability, we can design a reduction $\mathcal{A}_{zk}$ that can break the zero knowledge property of either $\Pi_{epk}$, $\Pi_{ptxt-knwldg}$ or $\Pi_{zk-L2}$ which is a contradiction.

Lemma 12: $Hyb_1$ is identical to $Hyb_2$. Proof In $Hyb_2$, SimHyb computes and sends X=(a·IP+b) where (a, b) is extracted from the adversary's randomness $\rho$ and IP= $L_{term}(\bullet)=\langle \vec{u}, \vec{w} \rangle$. In $Hyb_1$, SimHyb decrypts $[\![ X^* ]\!]$ to compute X. Since $\mathcal{A}$ is honest, notice that even in Hyb$_1$, X is in fact equal to (a·IP+b). Hence, the two hybrids are identically distributed.

Lemma 13: Assuming the semantic security of Paillier encryption, Hyb$_2$ is computationally indistinguishable from Hyb$_3$. Proof. This is identical to the proof of Lemma 5.

D. Protocol 3: Proof

1. Corrupt Device

Consider a malicious adversary $\mathcal{A}$ that corrupts the device $\mathcal{D}$. We now describe the simulator Sim. Let ZK.Ext denote the extractor for the zero knowledge protocol $\Pi_{ptxt-knwldg}$. Let Mask.Sim denote the simulator for the packing scheme.

Enrollment Phase. This is identical to the enrollment phase in Section D.1. For completeness, we describe it here. Sim does the following.

Receive (epk, $u_1, \ldots, u_\ell$) from $\mathcal{A}$.

Run zero knowledge protocols $\Pi_{epk}$, $\Pi_{ptxt-knwldg}$ and $\Pi_{zk-L2}$ as the verifier with $\mathcal{A}$ as the prover with statement epk for the first proof and statement (epk, [[ $u_1$ ]], ..., [[ $u_\ell$ ]]) for the next two proofs. Also, run the extractor ZK.Ext on protocol $\Pi_{ptxt-knwldg}$ to extract witness $\{u_i, \rho_i\}_{i=1}^{\ell}$.

If either of the proofs fail or the extractor ZK.Ext fails, send the message "Failed" to $\mathcal{A}$ and query the ideal functionality $\mathcal{F}$ as part of enrollment with a vector of norm larger than $\zeta$, thereby instructing it to deliver the message "Failed" to the honest service provider.

Else, do the following:

(a) Compute (sk, vk)←Gen($1^\lambda$).

(b) Compute ([[ $u_1^*$ ]], ... [[ $u_t^* \tilde{c}$ ) using the algorithm Plr.Add(•) where $u_1^*, \ldots, u_t^*$ is the encoding of $\vec{u}$=([[ $u_1$ ]], ..., [[ $u_\ell$ ]]).

(c) Send ($\sigma$=Sign(sk, (epk, [[ $u_1^*$ ]], ..., [[ $u_t^*$ ]]))) to $\mathcal{A}$.

(d) Query the ideal functionality $\mathcal{F}$ as part of enrollment with vector $\vec{u}$ extracted from ZK.Ext.

Matching Phase: Sim does the following.

Output from ideal functionality $\mathcal{F}$: Query $\mathcal{F}$ with a new sub-session for the matching phase to receive output bit y.

Round 1: Receive ($\sigma$, $\{[[ u_i^* ]]\}_{i \in [t]}$) from $\mathcal{A}$.

Round 2:

1) Output $\perp$ if Verify(vk, (epk, [[ $u_1^*$ ]], ..., $\mathcal{A} u_t^*$), $\sigma$)≠1.

2) Output "Special Abort" if Verify(vk, (epk, [[ $u_1^*$ ]], ..., [[ $u_t^*$ ]]), $\sigma$)=1 (AND) ([[ $u_1^*$ ]], ..., $\mathcal{A} u_t^* \mathcal{A}$, $\sigma$) is not the tuple sent to $\mathcal{A}$ in the Enrollment phase.

3) Pick a random value IP satisfying the following: IP<T if y=0 and T≤IP≤IP$_{Max}$ if Y=$^1$.

4) Pick random strings a$\in \mathbb{Z}_\lambda$, b$\in \mathbb{Z}_{(\lambda \cdot \log IP_{Max}+\lambda)}$, pad$\in \mathbb{Z}_{\log IP_{Max}+\lambda}$.

5) Pick 2n random strings $X_1, \ldots, X_n, Y_1, \ldots, Y_n$ such that $(X_1 + \ldots + X_n)$=(IP+pad) and $(Y_1 + \ldots + Y_n)$=(a·IP+b).

6) Compute $\mathcal{T} \tilde{X} \tilde{c}$ =$\mathcal{T}$ Mask.Sim($X_1, \ldots, X_n$, $\tilde{c}$) and $\mathcal{T} \tilde{Y} \tilde{c}$ =$\mathcal{T}$ Mask.Sim($Y_1, \ldots, Y_n$)$\tilde{c}$ to $\mathcal{A}$.

Round 3: Receive ot$^{rec}$ from $\mathcal{A}$.

Round 4: ($\mathcal{T} \to \mathcal{D}$) $\mathcal{T}$ does the following:

1) Compute ($\tilde{C}$, lab)=Garble.Sim(y).

2) Let (lab$_{pad}$, lab$_a$, lab$_b$) denote the simulated labels for inputs (pad, a, b) to the garbled circuit.

3) Let lab$_{X,Y}$ denote the simulated labels for values (X, Y) that are input by $\mathcal{A}$ to evaluate the circuit. Compute ot$^{sen}$=OT.Round$_2$. Sim(lab$_{X,Y}$, ot$^{rec}$).

4) Send ($\tilde{C}$, lab$_{pad}$, lab$_a$, lab$_b$, ot$^{sen}$) to $\mathcal{A}$.

Round 5:

1) Receive label lab$_y$ from $\mathcal{A}$.

2) If lab$_y$ corresponds to the label for output bit y of simulated labels lab, instruct the ideal functionality to deliver output to the honest $\mathcal{T}$. Else, instruct $\mathcal{F}$ to output $\perp$ to the honest terminal.

We now show that the above simulation strategy is successful via a series of computationally indistinguishable hybrids where the first hybrid Hyb$_0$ corresponds to the real world and the last hybrid Hyb$_1$ corresponds to the ideal world. Hyb$_0$: Real world. In this hybrid, consider a simulator SimHyb that plays the role of the honest service provider and terminal as in the real world. Hyb$_1$: Run the Extractor. In this hybrid, SimHyb runs the extractor ZK.Ext for the zero knowledge protocol $\Pi_{ptxt-knwldg}$ as done by Sim in the ideal world to extract witness $\vec{u}$=($u_1, \ldots, u_\ell$). It also queries the ideal functionality in the enrollment phase as done by Sim. Hyb$_2$: Special Abort for signature forgery. In this hybrid, in round 2 of the matching phase, SimHyb outputs "Special Abort" if Verify(vk, (epk, [[ $u_1^*$ ]], ..., [[ $u_t^*$ ]]), $\sigma$)=1 (AND) (epk, [[ $u_1^*$ ]], ..., [[ $u_t^*$ ]], $\sigma$) is not the tuple sent to $\mathcal{A}$ in the Enrollment phase, as done by Sim in the ideal world. Hyb$_3$: Simulate OT. In round 4 of the matching phase, SimHyb computes the OT sender message by using the simulator OT.Round$_2$. Sim(•). That is, ot$^{sen}$=OT.Round$_2$. Sim(lab$_{X,Y}$, ot$^{rec}$) where lab$_{X,Y}$ are the labels for the inputs (X, Y) to be used by A as input to the garbled circuit.

Hyb$_4$: Simulate garbled circuit. In round 4 of the matching phase, SimHyb computes a simulated garbled circuit and simulated labels. That is, ($\tilde{C}$, lab)=Garble. Sim(y). Hyb$_5$: Switch Ciphertexts. In this hybrid, SimHyb computes the ciphertexts in the matching phase as follows: Pick a random value IP satisfying the following: IP<T if y=0 and T≤IP≤IP$_{Max}$ if y=1; Pick random strings a$\in \mathbb{Z}_\lambda$, b$\in \mathbb{Z}_{(\lambda \cdot \log IP_{Max}+\lambda)}$, pad $\in \mathbb{Z}_{\log IP_{Max}+\lambda}$. Pick 2n random strings $X_1, \ldots, X_n, Y_1, \ldots, Y_n$ such that $(X_1 + \ldots + X_n)$=(IP+pad) and $(Y_1 + \ldots + Y_n)$=(a·IP+b); Compute [[ $\tilde{z}_0$ ]] [[ $\tilde{z}_1$ ]] using the algorithm Plr.Enc where $\tilde{z}_0$=Encode$_2(X_1, \ldots, X_n)$ and $\tilde{z}_1$=Encode$_2(Y_1, \ldots, Y_n)$; Pick 2n random strings $\rho_1, \ldots, \rho_{2n}$ such that $(\rho_1 + \ldots + \rho_n)$=0, $(\rho_{n+1} + \ldots + \rho_{2n})$=0 and $\forall i$, $\rho_i \in \mathbb{Z}_{2^k}$. Let $\tilde{\rho}_0$=Encode$_2(\rho_1, \ldots, \rho_n)$ and $\rho_1$=Encode$_2(\rho_{n+1}, \ldots, \rho_{2n})$; and Send [[ $\tilde{X}$ ]] =[[ Mask($\tilde{z}_0+\tilde{\rho}_0$)]], [[ $\tilde{Y}$ ]] =[[ Mask($\tilde{z}_1+\tilde{\rho}_1$)]] to $\mathcal{A}$.

Hyb$_6$: Masking Simulator. In this hybrid, SimHyb runs the simulator Mask.Sim of the packing scheme to compute [[ $\tilde{X}$ ]], [[ $\tilde{Y}$ ]] in round 2 instead of running the honest masking algorithm. Hyb$_7$: Ideal world. In this hybrid, SimHyb instructs the ideal functionality to either deliver output $\perp$ or the real output to the honest terminal as done by Sim after round 5. This hybrid corresponds to the ideal world.

We now show that every pair of successive hybrids is computationally indistinguishable. Lemma 14: Assuming the proof of knowledge property for protocol $\Pi_{ptxt-knwldg}$ and soundness of protocols $\Pi_{epk}$, $\Pi_{zk-L2}$, Hyb$_0$ is computationally indistinguishable from Hyb$_1$. Proof. This is identical to the proof of Lemma 6.

Lemma 15: Assuming the unforgeability of the signature scheme, Hyb$_1$ is computationally indistinguishable from Hyb$_2$. Proof. This is identical to the proof of Lemma 7.

Lemma 16: Assuming the security of the oblivious transfer protocol against a malicious receiver, $Hyb_2$ is computationally indistinguishable from $Hyb_3$. Proof. The only difference between the two hybrids is the way the OT sender's message in round 4 of the matching phase are generated. In $Hyb_2$, SimHyb generates the OT sender's message honestly using the labels for the values (X, Y). In $Hyb_3$, the OT sender's messages are also generated using the simulator OT.Round$_2$.Sim(•). It is easy to see that if there exists an adversary $\mathcal{A}$ that can distinguish between these two hybrids with non-negligible probability, we can design a reduction $\mathcal{A}_{OT}$ that can break the security of the oblivious transfer protocol against a malicious receiver which is a contradiction.

Lemma 17 Assuming the security of the garbling scheme, $Hyb_3$ is computationally indistinguishable from $Hyb_4$. Proof. The only difference between the two hybrids is the way the garbled circuit and the associated labels are generated. In $Hyb_3$, SimHyb computes them honestly as follows: ($\tilde{C}$, lab)=Garble($C$) where circuit $C$ is described in FIG. 13. In $Hyb_4$, SimHyb simulates them both as follows: ($\tilde{C}$, lab)=Garble. Sim(y) where y is the output from the ideal functionality. It is easy to see that if there exists an adversary $\mathcal{A}$ that can distinguish between these two hybrids with non-negligible probability, we can design a reduction $\mathcal{A}_{\tilde{C}}$ that can break the security of the garbling scheme which is a contradiction.

Lemma 18: Assuming the circuit privacy of Paillier encryption, $Hyb_4$ is computationally indistinguishable from $Hyb_5$. Proof. This is identical to the proof of Lemma 3.

Lemma 19 Assuming the security of the packing scheme, $Hyb_5$ is statistically indistinguishable from $Hyb_6$. Proof. This is identical to the proof of Lemma 4.

Lemma 20: $Hyb_6$ is statistically indistinguishable from $Hyb_7$. Proof. The difference between the two hybrids is that in $Hyb_7$, the honest terminal gets its output via the ideal functionality. In more detail, SimHyb instructs the ideal functionality to deliver either the actual output bit y or ⊥ based on its computation after round 5 of the matching phase. Similar to the proof of Lemma 10, the strings a, b, pad are picked by SimHyb uniformly at random in round 2, and the adversary only learns X=(IP+pad) and Y=(a·IP+b). Observe that in both hybrids, if the adversary uses input strings (X', Y') to evaluate the garbled circuit such that (a·(X'−pad)+b)≠Y', the honest terminal would end up outputting ⊥. The only difference between the two hybrids is if the adversary can input a pair of strings (X', Y')≠(X, Y) such that (a·(X'−pad)+b)=Y' and either of the following happens: (i) (X'−pad)≤T but T≤(X−pad) (or) (ii) T≤(X'−pad) but (X−pad)≤T. However, since (a, b, pad) are picked uniformly at random, the probability that this can occur is negligible and this completes the proof.

2. Corrupt Provider, Terminal

Consider a semi-honest adversary $\mathcal{A}$ that jointly corrupts the service provider $\mathcal{SP}$ and terminal $\mathcal{T}$. We now describe the simulator Sim. Let ZK.Sim, ZK.Sim$_1$, ZK.Sim$_2$ denote the simulator for the zero knowledge protocols $\Pi_{epk}$, $\Pi_{ptxt-knwldg}$ and $\Pi_{zk-L2}$ respectively.

Enrollment Phase: Sim does the following: Pick vector $\vec{u}=(u_1, \ldots, u_\ell)$ uniformly at random; Compute (esk, epk)←Plr.Setup($1^\lambda$) and send (epk, $[\![u_1]\!], \ldots, u_\ell$) to $\mathcal{A}$; Run the simulators ZK.Sim, ZK.Sim$_1$, ZK.Sim$_2$ for the zero knowledge protocols $\Pi_{epk}$, $\Pi_{ptxt-knwldg}$ and $\Pi_{zk-L2}$ from Section 8 where $\mathcal{A}$ is the verifier. epk is the statement for the first proof and (epk, $[\![u_1]\!], \ldots, u_\ell$) is the statement for the next two; and Receive σ from $\mathcal{A}$.

Matching Phase: Before the phase begins, Sim gets input ($\vec{w}$, ρ, y) where $\vec{w}$ is $\mathcal{A}$'s input, ρ is $\mathcal{A}$'s randomness and y is the output bit. Sim does the following: Round 1: Send (σ, epk, $\{u_i^*\}_{i\in[\ell]}$) to $\mathcal{A}$; Round 2: Receive ($[\![\tilde{X}]\!]$, $[\![\tilde{Y}]\!]$) from $\mathcal{A}$; Round 3: Send $ot^{rec}$←OT.Round$_1$((X, Y); $\rho^{ot}$) to $\mathcal{A}$ where X, Y are picked uniformly at random; Round 4 Receive ($\tilde{C}$, lab$_{pad}$, lab$_a$, lab$_b$, $ot^{sen}$) from $\mathcal{A}$; and Round 5: From $\mathcal{A}$'s randomness ρ, extract the label lab$_y$ of the garbled circuit corresponding to the output bit y. Send lab$_y$ to $\mathcal{A}$.

We show that the above simulation strategy is successful via a series of computationally indistinguishable hybrids where the first hybrid $Hyb_0$ corresponds to the real world and the last hybrid $Hyb_4$ corresponds to the ideal world. $Hyb_0$: Real world. In this hybrid, consider a simulator SimHyb that plays the role of the honest device as in the real world. $Hyb_1$: Simulate Proofs. In this hybrid, SimHyb runs the simulators ZK.Sim, ZK.Sim$_1$, ZK.Sim$_2$ for the zero knowledge protocols $\Pi_{epk}$, $\Pi_{ptxt-knwldg}$ and $\Pi_{zk-L2}$ as done by Sim in the enrollment phase of the ideal world. $Hyb_1$: Change computation of output label. In this hybrid, in round 5 of the matching phase, SimHyb no longer evaluates the garbled circuit $\tilde{C}$ to compute the output label lab$_y$. Instead, lab$_y$ is extracted from the adversary' randomness ρ corresponding to the output y as done by Sim in the ideal world. $Hyb_3$: Switch OT receiver inputs. In this hybrid, in round 3 of the matching phase, SimHyb generates the OT receiver's message by picking its inputs X, Y uniformly at random as done by Sim. $Hyb_4$: Switch Ciphertexts. In this hybrid, SimHyb picks input vector $\vec{u}$ uniformly at random as done by Sim. This hybrid corresponds to the ideal world.

We now show that every pair of successive hybrids is computationally indistinguishable. Lemma 21: Assuming the zero knowledge property for protocols $\Pi_{epk}$, $\Pi_{ptxt-knwldg}$ and $\Pi_{zk-L2}$, $Hyb_0$ is computationally indistinguishable from $Hyb_1$. Proof. This is identical to the proof of Lemma 11.

Lemma 22: $Hyb_1$ is identical to $Hyb_2$. Proof. In $Hyb_2$, SimHyb computes the output label lab$_y$ corresponding to output bit y from the randomness used to generate the garbled circuit $\tilde{C}$. This randomness is extracted from the adversary' randomness ρ. In $Hyb_1$, SimHyb evaluates the garbled circuit using the labels obtained as output of the OT protocol (with input X, Y) to generate the label lab$_y$. Since $\mathcal{A}$ is honest, the garbled circuit, OT sender messages in round 4 and the ciphertexts in round 2 are honestly generated and so, notice that even in $Hyb_1$, lab$_y$ in fact indeed corresponds to the label for the output bit of the protocol—y. Hence, the two hybrids are identically distributed.

Lemma 23 Assuming the security of the oblivious transfer protocol against a semi-honest sender, $Hyb_2$ is computationally indistinguishable from $Hyb_3$. Proof. The only difference between the two hybrids is the way the OT receiver's message is generated in round 3 of the matching phase. In $Hyb_2$, SimHyb generates them using the receiver's inputs (X, Y) computed by decrypting and decoding the ciphertexts received from the sender in round 2 while in $Hyb_3$, the receiver's inputs (X, Y) are picked uniformly at random. Thus, if there exists an adversary $\mathcal{A}$ that can distinguish between these two hybrids with non-negligible probability, we can design a reduction $\mathcal{A}_{OT}$ that can break the security of the oblivious transfer protocol against a semi-honest sender which is a contradiction.

Lemma 24: Assuming the semantic security of Paillier encryption, $Hyb_3$ is computationally indistinguishable from $Hyb_4$. Proof. This is identical to the proof of Lemma 5.

E. Zero Knowledge

1. Proof: Knowledge of Plaintexts

Proof. Completeness is easy to observe. We now prove honest verifier zero knowledge and the proof of knowledge.

Honest Verifier Zero Knowledge. Consider a honest-verifier $\mathcal{A}$. The strategy of the simulator Sim on input the verifier's randomness $(e_1, \ldots, e_n)$ (each of which are randomly chosen in $\mathbb{Z}_N$) is as follows:

Sample $w \leftarrow \mathbb{Z}_N$, $z \leftarrow \mathbb{Z}_{N^2}$.

Define $[\![s; u]\!] := g^w z^N / \prod_i c_i^{e_i}$

Send $[\![s; u]\!]$ in round 1 and $(w, z)$ in round 3 to $\mathcal{A}$.

Lemma 25: Assuming the semantic security of Paillier encryption, the above simulation strategy is successful. Proof Observe that the checks performed by $\mathcal{A}$ at the end of the protocol succeed in both the real execution and the simulated one. Therefore, the only difference between the two hybrids is the way the ciphertext s; u is computed. The rest of the proof is identical to the proof of Lemma 5.

Proof of knowledge. Consider a malicious prover $\mathcal{A}$. We first describe the strategy of the extractor ZK.Ext below:

Receive the first message a from Adv.

Send random $\vec{e}_0 = (e_{0,1}, \ldots, e_{0,n})$ in round 2 to receive output $(w_0, z_0)$ in round 3 from For each $i \in [n]$, do the following:
1) Rewind the adversary to the beginning of round 2.
2) Send $\vec{e}_i = (e_{0,1}, \ldots, e_{0,i}+1, e_{0,i+1}, \ldots, e_{0,n})$ in round 2 to receive output $(w_i, z_i)$ in round 3 from $\mathcal{A}$.
3) Compute the $i^{th}$ plaintext as $x_i = (w_i - w_0)$ and the corresponding randomness as $$r_i = \frac{z_i}{z_0}.$$

Output $\{(x_i, r_i)\}_{i \in [n]}$.

We now argue that the above extractor successfully extracts a witness $\{(x_i, r_i)\}_{i \in [n]}$ with overwhelming probability. We will prove this by reaching a contradiction. Lets assume that there exists a PPT cheating prover $\mathcal{A}$ such that it succeeds in generating accepting proofs even though the extraction of the witness fails. Since the adversary generates accepting proofs, for all $0 \le i \le n$ it must be the case that:

$$g^{w_i} z_i^N = a \cdot \prod_j c_j^{e_{i,j}}$$

Therefore, for all $1 \le i \le n$:

$$\frac{g^{w_i} z_i^N}{g^{w_0} z_0^N} = \frac{a \cdot \prod_j c_j^{e_{i,j}}}{a \cdot \prod_j c_j^{e_{i,j}}}$$

This implies $$g^{w_i - w_0} \left(\frac{z_i}{z_0}\right)^N = c_i$$

based on the way we pick $\vec{e}_i$. This implies that $c_i$ is of the form $g^{x_i} r_i^N$ where $x_i = (w_i - w_0)$ and $$r_i = \frac{z_i}{z_0}.$$

This exactly corresponds to a valid Paillier ciphertext and is indeed the tuple output by the extractor ZK. Ext for each index i. Thus, the above extractor successfully extracts a witness $\{(x_i, r_i)\}_{i \in [n]}$ with overwhelming probability and this completes the proof.

2. Proof: L2 Norm

In this section, we formally prove Lemma 2, referring to the protocol in FIG. 6. Proof Completeness for the first check that $z = y\alpha^2 + \beta$ and $\Pi_{range}$ is easy to observe. For the second check, the core observation is that the underlying computation never wraps around the Paillier modulus N. Consider the following equalities:

$$\hat{z} = \sum_i \hat{w}_i^2 + \hat{v} \tag{1}$$

$$= \sum_i a^2 x_i^2 + 2ax_i\rho_i + \rho_i^2 - c_i x_i + d + \hat{\beta} \tag{2}$$

$$\equiv_{\hat{N}} \sum_i a^2 x_i^2 + 2ax_i\rho_i + \rho_i^2 - 2a\rho_i x_i - \rho_i^2 + \hat{\beta} \tag{3}$$

$$= \sum_i a^2 x_i^2 + \hat{\beta} \tag{4}$$

Equality (2) holds since $w_i = \alpha x_i + \rho_i$ and $\hat{v} = (\Sigma_i c_i x_i) + d + \hat{\beta}$ holds over the integers with overwhelming probability. In particular, $\hat{v} \ne (\Sigma_i c_i x_i) + d + \hat{\beta}$ requires $N - \hat{N} \le \hat{\beta} < N$ which is negligible. Equivalency (3) holds due to $c_i$, d being defined modulo N'. The final equality holds trivially. Therefore the verifier will always accept for an honest prover.

We now prove honest verifier zero knowledge and the soundness. Honest Verifier Zero Knowledge. Consider a honest-verifier $\mathcal{A}$. The strategy of the simulator Sim is described below. Sim takes as input the statement $[\![x_1]\!], \ldots, [\![x_n]\!]$, pk and the randomnness $(\alpha, \alpha, \beta, \hat{\beta}, \rho_1, \ldots, \rho_n, \rho_1, \ldots, \rho_n)$ which the verifier will use.

Compute and send $(z = y\alpha^2 + \beta, \hat{z} = y\alpha^2 + \hat{\beta})$ to $\mathcal{A}$.

We show that the above simulation strategy is successful. $Hyb_0$: Real world. In this hybrid, consider a simulator SimHyb that plays the role of the honest prover. $Hyb_1$: Switch $(z, \hat{z})$. In this hybrid, simulator SimHyb computes $z = (y\alpha^2 + \beta)$ and $\hat{z} = (y\alpha^2 + \hat{\beta})$. This now corresponds to the simulated execution.

We now show that every pair of successive hybrids is computationally indistinguishable. Lemma 26: $Hyb_0$ is identical to $Hyb_1$. Proof In $Hyb_1$, SimHyb computes and sends $z = (y\alpha^2 + \beta)$ and $\hat{z} = (y\alpha^2 + \hat{\beta})$ where $(\alpha, \beta, bb)$ are extracted from the adversary's randomness. In $Hyb_0$, SimHyb decrypts $\{w_i\}_{i \in [n]}, [\![v]\!]$ to compute $(z, \hat{z})$. Since $\mathcal{A}$ is honest, notice that even in $Hyb_0$, $z = \hat{z} = (y\alpha^2 + \beta)$ and $\hat{z} = (y\alpha^2 + \hat{\beta})$. Hence, the two hybrids are identically distributed.

Soundness. Consider a malicious prover $\mathcal{A}$ that produces accepting proof transcripts but $\Sigma_{i \in [n]} x_i^2 \neq y$. We will show that this event can happen only with negligible probability. Since the verification succeeds, it implies that:

$$z = y a^2 + \beta \text{ and } y = \sum_i x_i^2 + e$$

for some $e \in \mathbb{Z}_N^*$. This means that $$z = a^2 \sum_i x_i^2 + \beta + a^2 e = \gamma + a^2 e \bmod N$$

where $\gamma := \alpha^2 \Sigma_i x_i^2 + \beta$. Note that e is known to the prover. $\gamma$ is also known to the prover—it decrypts the ciphertexts from the verifier and can compute $\gamma = v + \Sigma_{i \in [n]} w_i^2$. If the prover can compute $z = \gamma + \alpha^2 e$, this implies that the prover knows $\alpha$ and hence, can also deduce $\beta$ (since $\gamma$ is essentially $\alpha^2 \Sigma_i x_i^2 + \beta$). However, $\beta$ is a uniformly random value chosen by the verifier and only included in the string v (that is encrypted). Thus, the probability that the prover learns $\beta$ should be negligible which is a contradiction. Hence, the probability that the prover can compute $z = \gamma + \alpha^2 e$ is negligible which implies that e=0. That is, we can conclude that $z = (\alpha^2 \Sigma_i x_i^2 + \beta \bmod N)$.

Similarly, since the verification succeeds, the second equation $\hat{z} \equiv_{\hat{N}} y \alpha^2 + \hat{\beta}$ also holds. Then, for the same reason as above, it must hold that $\hat{z} = (\alpha^2 \Sigma_i x_i^2 + \hat{\beta} \bmod \hat{N})$.

$$\sum_i x_i^2 \equiv_N \frac{z - \beta}{\alpha^2} \equiv_N y \quad \exists t \in \mathbb{Z}^*, \sum_i x_i^2 = y + Nt$$

$$\sum_i x_i^2 \equiv_{N'} \frac{\hat{z} - \hat{\beta}}{\alpha^2} \equiv_{N'} y \quad \exists s \in \mathbb{Z}^*, \sum_i x_i^2 = y + N's$$

Rewriting the implication we obtain Nt=N's. This means that the prover must choose t to be a multiple of N'. However, since N' is prime and chosen after all of the $x_i$ are fixed, the prover can only do this with negligible probability.

XI. Computer System

Figure 16:
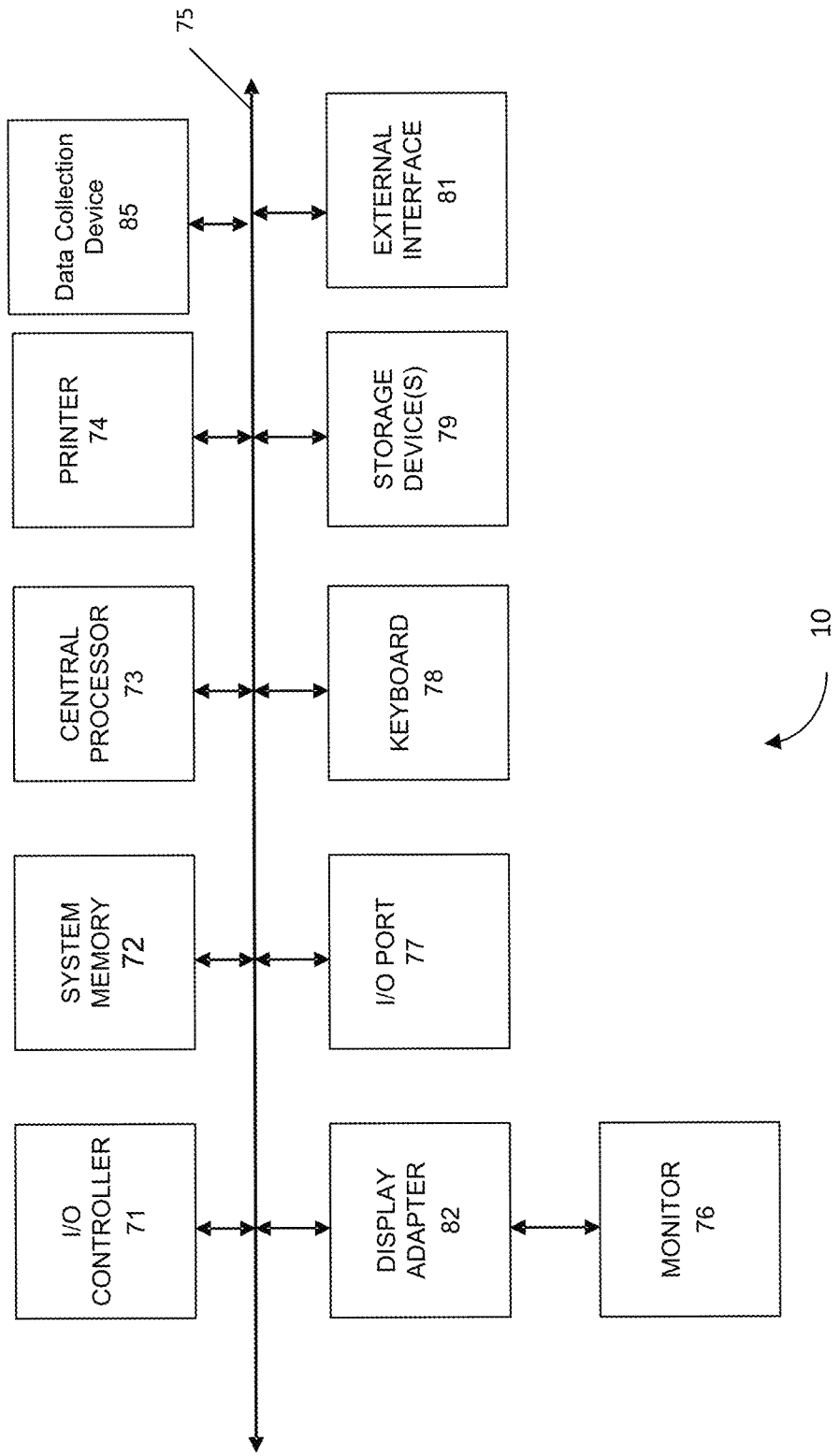
FIG. 16 shows a block diagram of an example computer system usable with systems and methods according to embodiments of the present disclosure.

Any of the computer systems mentioned herein may utilize any suitable number of subsystems. Examples of such subsystems are shown in FIG. 16 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 16 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

XII. References

[1] About Face ID advanced technology. support.apple.com/en-us/HT208108.
[2] About Touch ID advanced technology. support.apple.com/en-us/HT204587.
[3] Android Biometrics. source.android.com/security/biometric.
[4] Nearby Connections API. developers.google.com/nearby/connections/overview.
[5] Samsung Pass. www.samsung.com/global/galaxy/apps/samsung-pass/
[6] Major breach found in biometrics system used by banks, UK police and defence firms. www.theguardian.com/technology/2019/aug/14/major-breachfound-in-biometrics-system-used-by-banks-uk-police-and-defence-firms, August 2019.
[7] Passenger Questions JetBlue Facial-Recognition System. www.wbur.org/hereandnow/2019/05/02/jetblue-facial-recognition-check-in, May 2019.
[8] U.S. Customs and Border Protection says photos of travelers were taken in a data breach. www.washingtonpost.com/technology/2019/06/10/us-customsborder-protection-says-photos-travelers-into-out-country-were-recentlytaken-data-breach/, June 2019.
[9] M. Blanton and P. Gasti, *Computer Security—ESORICS 2011—16th European Symposium on Research in Computer Security*, Leuven, Belgium, Sep. 12-14, 2011. *Proceedings*, volume 6879 of Lecture Notes in Computer Science, pages 190-209. Springer, 2011.
[10] X. Boyen, In *Proceedings of the 11$^{th}$ ACM Conference on Computer and Communications Security*, CCS '04, page 82-91, New York, N.Y., USA, 2004. Association for Computing Machinery.
[11] R. Chatterjee et al., In *Proceedings of the 2019 ACM SIGSAC Conference on Computer and Communications Security*, CCS '19, page 1171-1186, New York, N.Y., USA, 2019. Association for Computing Machinery.
[12] W. Chongchitmate and R. Ostrovsky, *Public-Key Cryptography—PKC 2017-20th IACR International Conference on Practice and Theory in Public-Key Cryptography*, Amsterdam, The Netherlands, Mar. 28-31, 2017, Proceedings, Part II, volume 10175 of Lecture Notes in Computer Science, pages 241-270. Springer, 2017.
[13] T. Chou and C. Orlandi, *Progress in Cryptology LATINCRYPT 2015-4th International Conference on Cryptology and Information Security in Latin America*, Guadalajara, Mexico, Aug. 23-26, 2015, Proceedings, volume 9230 of Lecture Notes in Computer Science, pages 40-58. Springer, 2015.
[14] R. Cramer, I. Damgard, and J. B. Nielsen, *Advances in Cryptology—EUROCRYPT 2001, International Conference on the Theory and Application of Cryptographic Techniques*, Innsbruck, Austria, May 6-10, 2001, Proceeding, volume 2045 of Lecture Notes in Computer Science, pages 280-299. Springer, 2001.
[15] I. Damgard, M. Geisler, and M. Krøigaard, *Information Security and Privacy*, pages 416-430, Berlin, Heidelberg, 2007. Springer Berlin Heidelberg.
[16] Y. Dodis, L. Reyzin, and A. D. Smith, *Advances in Cryptology—EUROCRYPT 2004, International Conference on the Theory and Applications of Cryptographic Techniques*, Interlaken, Switzerland, May 2-6, 2004, Proceedings, volume 3027 of *Lecture Notes in Computer Science*, pages 523-540. Springer, 2004.
[17] Z. Erkin et al., *Privacy Enhancing Technologies, 9th International Symposium, PETS* 2009, *Seattle, Wash., USA, Aug. 5-7, 2009. Proceedings*, volume 5672 of *Lecture Notes in Computer Science*, pages 235-253. Springer, 2009.
[18] C. Hazay, G. L. Mikkelsen, T. Rabin, and T. Toft, *Topics in Cryptology—CT-RSA 2012—The Cryptographers' Track at the RSA Conference 2012, San Francisco, Calif., USA, Feb. 27-Mar. 2, 2012. Proceedings, volume 7178 of Lecture Notes in Computer Science*, pages 313-331. Springer, 2012.
[19] C. Hazay, G. L. Mikkelsen, T. Rabin, T. Toft, and A. A. Nicolosi, *J. Cryptology*, 32(2):265-323, 2019.
[20] Y. Huang, L. Malka, D. Evans, and J. Katz, In *Proceedings of the Network and Distributed System Security Symposium, NDSS* 2011, San Diego, Calif., USA, 6 Feb. -9 Feb. 2011. The Internet Society, 2011.
[21] F. Kerschbaum, M. J. Atallah, D. M'Raïhi, and J. R. Rice, *Biometric Authentication, First International Con-* ference, *ICBA* 2004, Hong Kong, China, Jul. 15-17, 2004, *Proceedings*, volume 3072 of Lecture Notes in Computer Science, pages 387-394. Springer, 2004.

[22] T. A. M. Kevenaar et al., In *Proceedings of the Fourth IEEE Workshop on Automatic Identification Advanced Technologies (AutoID 2005)*, 16-18 Oct. 2005, Buffalo, N.Y., USA, pages 21-26. IEEE Computer Society, 2005.

[23] Y. Lindell, *Advances in Cryptology—CRYPTO 2017—37th Annual International Cryptology Conference*, Santa Barbara, Calif., USA, Aug. 20-24, 2017, *Proceedings*, Part II, volume 10402 of *Lecture Notes in Computer Science*, pages 613-644. Springer, 2017.

[24] W. Liu et al., *In 2017 IEEE Conference on Computer Vision and Pattern Recognition, CVPR*, pages 6738-6746. IEEE Computer Society, 2017.

[25] M. Osadchy, B. Pinkas, A. Jarrous, and B. Moskovich, In 31st *IEEE Symposium on Security and Privacy, S&P 2010*, 16-19 May 2010, Berleley/Oakland, Calif., USA, pages 239-254. IEEE Computer Society, 2010.

[26] P. Paillier, *Advances in Cryptology—EUROCRYPT '99, International Conference on the Theory and Application of Cryptographic Techniques*, Prague, Czech Republic, May 2-6, 1999, *Proceeding*, volume 1592 of Lecture Notes in Computer Science, pages 223-238. Springer, 1999.

[27] A. Sadeghi, T. Schneider, and I. Wehrenberg, *Information, Security and Cryptology—ICISC 2009, 12th International Conference*, Seoul, Korea, Dec. 2-4, 2009, *Revised Selected Papers*, volume 5984 *of Lecture Notes in Computer Science*, pages 229-244. Springer, 2009.

[28] B. Schoenmakers and P. Tuyls, In *Security with Noisy Data*, pages 141-149. Springer London, 2007.

[29] F. Schroff, D. Kalenichenko, and J. Philbin, In *IEEE Conference on Computer Vision and Pattern Recognition, CVPR 2015*, pages 815-823. IEEE Computer Society, 2015.

[30] M. A. Turk and A. Pentland, In *IEEE Computer Society Conference on Computer Vision and Pattern Recognition, CVPR 1991*, 3-6 Jun. 1991, Lahaina, Maui, Hi., USA, pages 586-591. IEEE, 1991.

[31] H. Wang et al., In 2018 *IEEE Conference on Computer Vision and Pattern Recognition, CVPR*, pages 5265-5274. IEEE Computer Society, 2018.

What is claimed is:

1. A method of registering a biometric stored on a user device with a verifier device using a first modulus N and a second modulus $\hat{N}$, the method comprising performing by the user device:

providing, to the verifier device, an encrypted biometric vector c stored on the user device, the encrypted biometric vector c generated by encrypting a biometric vector x using a user public key, wherein the user public key includes the first modulus N, wherein a user secret key corresponds to the user public key;

receiving, from the verifier device, a challenge message including a masked encrypted biometric vector $|w|$, an encrypted first cancellation value $|v|$, an encrypted second cancellation value $|\hat{v}|$, and the second modulus $\hat{N}$, wherein the first cancellation value v is an aggregation of first terms, including values of the encrypted biometric vector c and at least with a first random value $\beta$, and wherein the second cancellation value $\hat{v}$ is an aggregation of second terms, including values of the encrypted biometric vector c and at least a second random value $\hat{\beta}$, and wherein the encrypted second cancellation value $|\hat{v}|$ is generated using the second modulus $\hat{N}$;

decrypting, using the user secret key, the masked encrypted biometric vector $|w|$, to obtain a masked biometric vector w, the encrypted first cancellation value $|v|$ to obtain a first cancellation value v, and the encrypted second cancellation value $|\hat{v}|$ to obtain a second cancellation value $\hat{v}$;

generating a first challenge response z using the first cancellation value v and a first function of the masked biometric vector w, the first function including a modulus N;

generating a second challenge response $\hat{z}$ using the second cancellation value $\hat{v}$ and a second function of the masked biometric vector w, the second function including the second modulus $\hat{N}$; and providing, to the verifier device, the first challenge response z and the second challenge response $\hat{z}$, thereby enabling the verifier device to validate that the first challenge response z matches a public value y using the first modulus N and to validate that the second challenge response $\hat{z}$ matches the public value y using the second modulus $\hat{N}$.

2. The method of claim 1, wherein each value of the masked encrypted biometric vector $|w|$ is generated by applying a respective masking function to a corresponding value of the encrypted biometric vector c.

3. The method of claim 2, wherein the respective masking function is a linear function and includes a random authenticating value $\alpha$ that scales the corresponding value of the encrypted biometric vector c and an offset random value of a random vector $\rho$.

4. The method of claim 1, wherein the first function results in one or more first cross terms, wherein a portion of the first cancellation value v cancels out the one or more first cross terms, and wherein the second function results in one or more second cross terms, wherein a portion of the second cancellation value $\hat{v}$ cancels out the one or more second cross terms.

5. The method of claim 1, wherein the first challenge response z matches a first combination of the public value y, a random authenticating value $\alpha$, and a first random value $\beta$, the first combination being determined mod N, and wherein the second challenge response $\hat{z}$ matches a second combination of the public value y, the random authenticating value $\alpha$, and a second random value $\hat{\beta}$, the second combination being determined mod $\hat{N}$.

6. The method of claim 1, wherein the second modulus $\hat{N}$ is a prime number that is less than the first modulus N.

7. The method of claim 1, further comprising:
receiving a signature of the encrypted biometric vector c; and
providing, to an access device having a biometric sensor, the signature as part of a matching phase with the access device to obtain access to a resource.

8. The method of claim 7, further comprising, as part of the matching phase:
sending the user public key and the encrypted biometric vector c to the access device;
receiving a first message from the access device, the first message including an encrypted similarity metric, the encrypted similarity metric computed with the encrypted biometric vector c and a biometric measurement using homomorphic encryption with the user public key, the encrypted similarity metric corresponding to a similarity metric encrypted with the user public key, the biometric measurement obtained by the biometric sensor;

decrypting the encrypted similarity metric to obtain a decrypted similarity metric; and sending a response message to the access device, the response message indicating whether the decrypted similarity metric exceeds a threshold.

9. The method of claim 1, further comprising:

encrypting, using the user public key, a random value s using a random value u to obtain an encrypted mask |s;u|, wherein the encrypted biometric vector c is generated using a random vector r;

sending, to the verifier device, the encrypted mask |s;u|;

receiving, from the verifier device, a random challenge vector e;

determining a first response by aggregating the random value s and an inner product of the biometric vector x and the random challenge vector e;

determining a second response using the random vector r, the random challenge vector e, a generator g of the user public key, the first modulus N, and the first response; and sending the first response and the second response to the verifier device.

10. A method of registering a biometric of a user device with a verifier device using a first modulus N and a second modulus $\hat{N}$, the method comprising performing by the verifier device:

receiving, from the user device, an encrypted biometric vector c, the encrypted biometric vector c generated by encrypting a biometric vector x using a user public key, wherein the user public key includes the first modulus N;

generating a masked encrypted biometric vector |w| by applying a respective masking function to each value of the encrypted biometric vector c;

generating an encrypted first cancellation value |v| by aggregating first terms, including values of the encrypted biometric vector c and a first mask value;

generating an encrypted second cancellation value |$\hat{v}$| by aggregating second terms, including values of the encrypted biometric vector c and a second mask value;

sending, to the user device, a challenge message including the masked encrypted biometric vector |w|, the encrypted first cancellation value |v|, and the encrypted second cancellation value |$\hat{v}$|;

receiving, from the user device, a first challenge response z and a second challenge response $\hat{z}$;

validating that the first challenge response z matches a public value y using the first modulus N; and validate that the second challenge response $\hat{z}$ matches the public value y using the second modulus $\hat{N}$.

11. The method of claim 10, wherein each value of the masked encrypted biometric vector |w| is generated by applying a respective masking function to a corresponding value of the encrypted biometric vector c.

12. The method of claim 11, wherein the respective masking function is a linear function and includes a random authenticating value $\alpha$ that scales the corresponding value of the encrypted biometric vector c and an offset random value of a random vector $\rho$.

13. The method of claim 10, wherein generating the encrypted first cancellation value |v| includes encrypting, using the user public key, the first mask value $\beta$, and wherein generating the encrypted second cancellation value |$\hat{v}$| includes encrypting, using the user public key, the second mask value $\hat{\beta}$.

14. The method of claim 13, wherein generating the encrypted first cancellation value |v| further includes using a random authenticating value $\alpha$ and a random vector $\rho$ that are used in the respective masking functions, and wherein generating the encrypted second cancellation value |$\hat{v}$| further includes using the random authenticating value $\alpha$ and the random vector $\rho$.

15. The method of claim 14, wherein at least one of the second terms for determining the encrypted second cancellation value |$\hat{v}$| are subjected to mod $\hat{N}$ before aggregating.

16. The method of claim 10, wherein the first challenge response z matches a first combination of the public value y, a random authenticating value $\alpha$, and a first random value $\beta$, the first combination being determined mod N, and wherein the second challenge response $\hat{z}$ matches a second combination of the public value y, the random authenticating value $\alpha$, and a second random value $\hat{\beta}$, the second combination being determined mod $\hat{N}$.

17. The method of claim 10, further comprising:

responsive to validating the first challenge response z and the second challenge response $\hat{z}$, generating, using a verifier private key of the verifier device, a signature of the encrypted biometric vector c; and sending the signature to the user device.

18. The method of claim 17, further comprising:

providing, to an access device having a biometric sensor, a verifier public key corresponding to the verifier private key, thereby enabling the access device to verify the signature as part of a matching phase between the access device and the user device.

19. The method of claim 10, wherein the encrypted biometric vector c is generated using a random vector r, the method further comprising:

receiving, from the user device, an encrypted mask |s;u|;

generating a random challenge vector e;

sending, to the user device, the random challenge vector e;

receiving, from the user device, a first response and a second response;

encrypting, using the user public key, the first response using a randomness defined by the second response to obtain an encrypted response; and confirming the encrypted response matches the encrypted mask |s;u| and a product of elements $r^e$ from the random vector r and the random challenge vector e.

* * * * *